US010133662B2

(12) United States Patent
Peterson et al.

(10) Patent No.: US 10,133,662 B2
(45) Date of Patent: Nov. 20, 2018

(54) SYSTEMS, METHODS, AND INTERFACES FOR MANAGING PERSISTENT DATA OF ATOMIC STORAGE OPERATIONS

(75) Inventors: James G. Peterson, San Jose, CA (US); Ashish Batwara, Fremont, CA (US); Nisha Talagala, Livermore, CA (US); Michael Zappe, Arvada, CO (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 495 days.

(21) Appl. No.: 13/539,235

(22) Filed: Jun. 29, 2012

(65) Prior Publication Data
US 2014/0006685 A1 Jan. 2, 2014

(51) Int. Cl.
*G06F 12/02* (2006.01)
*G06F 3/06* (2006.01)

(52) U.S. Cl.
CPC ........ *G06F 12/0238* (2013.01); *G06F 3/0608* (2013.01); *G06F 3/0638* (2013.01); *G06F 3/0688* (2013.01); *G06F 2212/7205* (2013.01)

(58) Field of Classification Search
CPC .................................................... G06F 12/02
USPC ........................................................ 711/150
See application file for complete search history.

(56) References Cited

U.S. PATENT DOCUMENTS 5,414,840 A * 5/1995 Rengarajan ....... G06F 17/30362
5,832,515 A 11/1998 Ledain et al.
6,236,593 B1 5/2001 Hong et al.
6,311,290 B1 10/2001 Hashbun et al.
6,480,933 B1 11/2002 Cargemel et al.
6,751,155 B2 6/2004 Gorobets
6,973,551 B1 12/2005 Walton
7,010,662 B2 3/2006 Aasheim et al.
7,076,599 B2 7/2006 Aasheim et al.
7,082,495 B2 7/2006 DeWhitt et al.
7,082,512 B2 7/2006 Aasheim et al.
7,093,101 B2 8/2006 Aasheim et al.
7,215,580 B2 5/2007 Gorobets
7,310,711 B2 12/2007 New et al.
7,395,384 B2 7/2008 Sinclair (Continued)

OTHER PUBLICATIONS

IEEE Dictionary, "Atomic transaction," 7th edition, Published in 2000, Last updated Feb 27, 2007.

(Continued)

*Primary Examiner* — Gautam Sain
(74) *Attorney, Agent, or Firm* — Kunzler, PC

(57) ABSTRACT

A storage controller is configured to implement an atomic storage operation comprising a plurality of separate storage operations on a non-volatile storage medium. The storage controller may store persistent indicators to identify data that pertains to the atomic storage operation. An invalid shutdown may occur before the atomic storage operation is complete. A restart and recovery operation comprises a first scan of the non-volatile storage medium to identify data of the failed atomic storage operation. A physical trim note is stored on the non-volatile storage medium to identify the data of the failed atomic storage operation. The data may be identified by media address. Storage metadata is reconstructed in a second scan, which excludes the data and/or operations of the failed atomic storage operation.

21 Claims, 26 Drawing Sheets

(56) References Cited

U.S. PATENT DOCUMENTS

| | | | |
|---|---|---|---|
| 7,516,267 | B2 | 4/2009 | Coulson et al. |
| 7,529,905 | B2 | 5/2009 | Sinclair |
| 7,603,532 | B2 | 10/2009 | Rajan et al. |
| 7,610,348 | B2 | 10/2009 | Kisley et al. |
| 7,873,782 | B2 | 1/2011 | Terry |
| 8,205,060 | B2 | 6/2012 | Hahn et al. |
| 8,417,901 | B2 | 4/2013 | Lin |
| 8,607,028 | B2 | 12/2013 | Kale et al. |
| 8,904,091 | B1 | 12/2014 | Guda et al. |
| 9,015,209 | B2 | 4/2015 | Hahn et al. |
| 2002/0069318 | A1 | 6/2002 | Chow et al. |
| 2003/0028726 | A1 | 2/2003 | Gaertner et al. |
| 2004/0044840 | A1 | 3/2004 | Wong |
| 2004/0128470 | A1 | 7/2004 | Hetzler |
| 2004/0236798 | A1* | 11/2004 | Srinivasan ............ G06F 17/302 |
| 2005/0120177 | A1 | 6/2005 | Black |
| 2005/0267882 | A1 | 12/2005 | Aupperlee et al. |
| 2006/0129778 | A1 | 6/2006 | Clark et al. |
| 2006/0153026 | A1 | 7/2006 | Blacquiere et al. |
| 2006/0294300 | A1 | 12/2006 | Lubbers |
| 2007/0043915 | A1 | 2/2007 | Moir et al. |
| 2007/0083530 | A1* | 4/2007 | Lakshminath et al. ....... 707/100 |
| 2007/0143561 | A1 | 6/2007 | Gorobets |
| 2007/0169030 | A1 | 7/2007 | Tarditi, Jr. et al. |
| 2007/0276994 | A1 | 11/2007 | Caulkins et al. |
| 2007/0294474 | A1 | 12/2007 | Panabaker et al. |
| 2008/0163220 | A1 | 7/2008 | Wang et al. |
| 2008/0195798 | A1 | 8/2008 | Lee et al. |
| 2008/0228992 | A1 | 9/2008 | Dumitru et al. |
| 2008/0288819 | A1 | 11/2008 | Heller, Jr. |
| 2008/0320209 | A1 | 12/2008 | Lee et al. |
| 2008/0320253 | A1 | 12/2008 | Tomlin et al. |
| 2009/0132760 | A1 | 5/2009 | Flynn et al. |
| 2009/0150605 | A1 | 6/2009 | Flynn et al. |
| 2010/0005255 | A1 | 1/2010 | Kaushik et al. |
| 2010/0082529 | A1 | 4/2010 | Mace et al. |
| 2010/0153660 | A1 | 6/2010 | Lasser |
| 2010/0205335 | A1 | 8/2010 | Phan et al. |
| 2011/0119446 | A1 | 5/2011 | Blumrich et al. |
| 2011/0208915 | A1 | 8/2011 | Bannon et al. |
| 2011/0296133 | A1* | 12/2011 | Flynn et al. .................. 711/171 |
| 2012/0011340 | A1* | 1/2012 | Flynn .................. G06F 12/0246 711/171 |
| 2012/0030408 | A1 | 2/2012 | Flynn et al. |
| 2012/0059978 | A1 | 3/2012 | Rosenband et al. |
| 2013/0155855 | A1 | 6/2013 | Batwara et al. |
| 2013/0166829 | A1 | 6/2013 | Dumitru |

OTHER PUBLICATIONS

Randal, Paul S., "Understanding Logging and Recovery in SQL Server," Published Feb. 2009; URL https:// technet.microsoft.com/en-us/magazine/2009.02.logging.aspx; accessed Sep. 11, 2015.

Russinovich, Mark E., "Windows Internals, Fifth Edition," Chapters 11-12: "Common Log File System," "NTFS Design Goals and Features," Published Jun. 17, 2009.

United States Patent Office, Final Office Action, U.S. Appl. No. 13/193,559, dated Dec. 16, 2014.

United States Patent Office, Final Office Action, U.S. Appl. No. 14/087,297, dated Nov. 26, 2014.

United States Patent Office, Non-Final Office Action, U.S. Appl. No. 13/107,820, dated Feb. 22, 2014.

United States Patent Office, Non-Final Office Action, U.S. Appl. No. 13/335,922, dated Aug. 29, 2013.

United States Patent Office, Non-Final Office Action, U.S. Appl. No. 13/725,728, dated May 21, 2015.

United States Patent Office, Non-Final Office Action, U.S. Appl. No. 14/087,297, dated Aug. 14, 2014.

United States Patent Office, Non-Final Office Action, U.S. Appl. No. 14/087,297, dated Mar. 11, 2015.

United States Patent Office, Pre-Interview Communication, U.S. Appl. No. 13/193,559, dated Jul. 8, 2014.

Weissel, Andreas, "Revisiting Log-Structured File Systems for Low-Power Portable Storage," Published Mar. 2005; Accessed at URL: <https://www4.cs.fau.de/weissei/Publications/Papers/IWSSPS05.pdf>.

Wikipedia, "Journaling File System," Published on Jul. 4, 2009; URL: <https://en.wikipedia.org/wiki/Journaling_file_system>.

Wikipedia, "Transaction log," Published on Jul. 4, 2009; URL: <https://en.wikipedia.org/wiki/Transaction_log>.

Notice of Allowance and Fee(s) Due for U.S. Appl. No. 13/725,728 filed Dec. 21, 2012, and mailed from the USPTO dated Oct. 19, 2015, 23 pgs.

International Search Report and Written Opinion dated Apr. 6, 2012 for international application PCT/US2011/045801.

Yehuda, et al., Atomicity of Restful Radosgw Operations, The Ceph Blog, Nov. 7, 2011, (Nov. 7, 2011), XP055148638, Retrieved from the Internet: URL:http://ceph.com/dev-notes/atomicity-of-resfful-radosgw-operations/, [retrieved on Feb. 23, 2016], 3 pgs.

Adaptec, "Understanding Read and Write Caching," <http://ask.adaptec.com/app/answers/detail/a_id/2046/—/understanding-read-and-write-caching>, 2 pgs. Published Mar. 12, 2001.

Non-Final Office Action for U.S. Appl. No. 13/837,628 filed Mar. 15, 2013, and mailed from the USPTO dated Oct. 19, 2015, 47 pgs.

* cited by examiner

SYSTEMS, METHODS, AND INTERFACES FOR MANAGING PERSISTENT DATA OF ATOMIC STORAGE OPERATIONS

TECHNICAL FIELD

The disclosure relates to persistent data storage and, more particularly, to systems, methods, interfaces, and apparatus for managing persistent data of atomic storage operations.

BRIEF DESCRIPTION OF THE DRAWINGS

This disclosure includes and references the accompanying drawings, which provide a more particular description of the embodiments disclosed herein. The disclosure, however, is not limited to the particular, embodiments depicted in the figures. The teachings of the disclosure may be utilized and/or adapted to other embodiments and/or changes may be made to the disclosed embodiments, without departing from the scope of the disclosure.

DETAILED DESCRIPTION

Figure 1A:
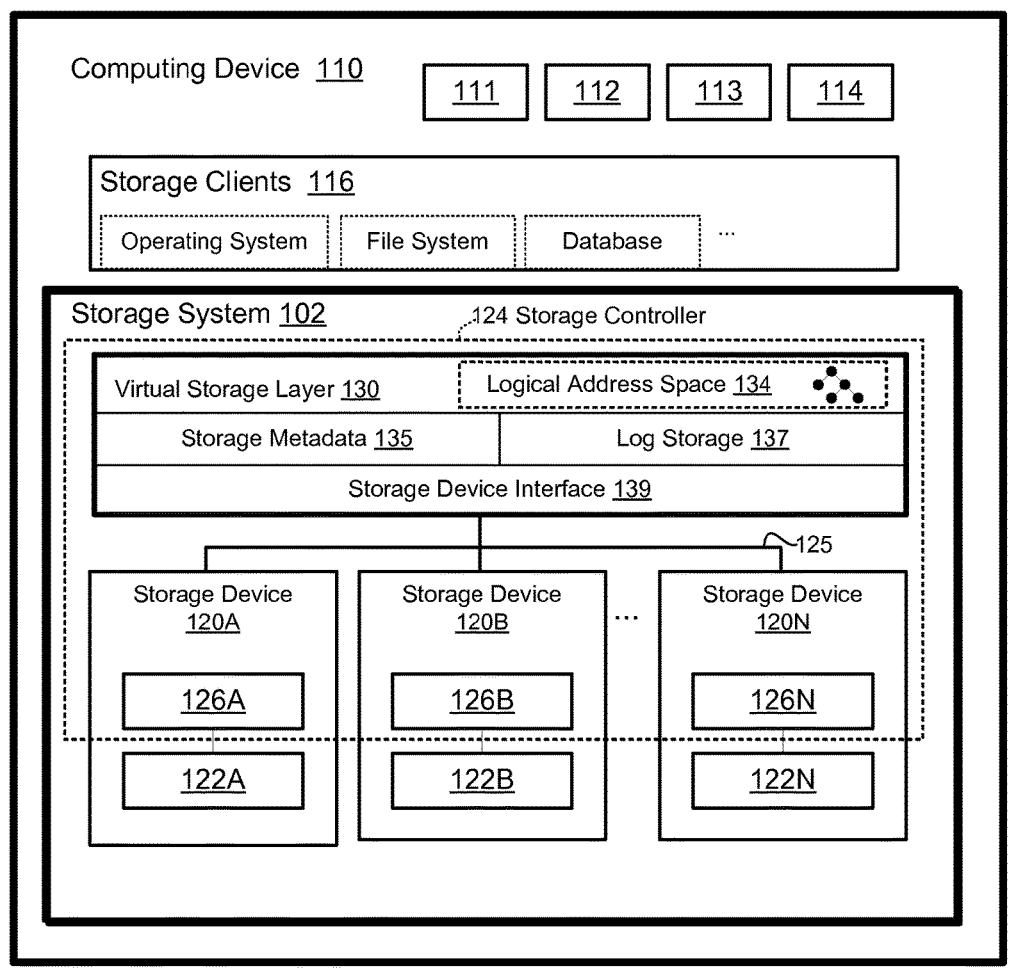
FIG. 1A is a block diagram of one embodiment of a storage system comprising a storage controller and a virtual storage layer.

According to various embodiments, a storage controller manages a non-volatile storage medium and/or device. The non-volatile storage medium may be partitioned and/or arranged into a plurality of addressable, media storage locations or units. As used herein, a "media storage location" or "media storage unit" refers to a quantum of persistent, physical storage. Media storage locations may include, but are not limited to: sectors, blocks, pages, storage divisions, erase blocks, sets and/or groups of media storage units (e.g., such as logical pages, logical erase blocks, and so on, as described below), and the like. A media storage location may be addressable by use of a media address. As used herein, a "media address" refers to any address (or reference) to a media storage location; a media address may include, but is not limited to: a link, a physical address, a device address, a column and/or row address, a distinguished name, cylinder/head/sector ("CHS") address, or the like. A media address may be unique to a particular storage controller, storage device, and/or storage medium. Alternatively, or in addition, a media address may be globally unique within a particular group or cluster of storage controllers, storage devices, storage media, and/or other namespace.

In some embodiments, the storage controller may be configured to manage a logical storage element (e.g., a set or groups of solid-state storage elements, planes, die, or the like). As used herein, a logical storage element refers to a set of two or more non-volatile storage elements that are or are capable of being managed and/or accessed in parallel by the storage controller (e.g., via respective I/O and/or control buses). A logical storage element may comprise a plurality of logical storage locations formed by combining media storage locations of the two or more non-volatile storage elements (e.g., logical sectors, blocks, pages, erase blocks, storage divisions, and so on).

The storage controller may comprise a virtual storage layer ("VSL"), which may present a logical address space to one or more storage clients. As used herein, a "logical address space" refers to a logical representation of a storage resource. A logical address space may comprise a plurality (e.g., range) of logical identifiers. As used herein, a "logical identifier" refers to any identifier for referencing persistent data and may include, but is not limited to: a logical address, a media address, a logical block address ("LBA"), a file name, a distinguished name, an object identifier, an inode, a Universally Unique Identifier ("UUID"), a Globally Unique Identifier ("GUID"), a hash code, a signature, an index entry, a range, an extent, or the like.

The storage controller may maintain storage metadata pertaining to data stored on the non-volatile medium and/or media storage locations of the non-volatile storage medium. The storage metadata may include a forward index comprising arbitrary, "any-to-any" mappings between logical identifiers and media storage locations, such that any logical identifier may be mapped to any media storage location (and vice versa).

The storage controller may be configured to write data out-of-place (e.g., store updated data on different media storage locations as opposed to overwriting the data in place), which may result in "obsolete" or "invalid" data remaining on the non-volatile storage medium. For example, overwriting data X with updated data Y may comprise storing Y on a new storage division (rather than overwriting X in place), and updating the "any-to-any" mappings of the forward index to identify Y as the valid, up-to-date version of the data. The obsolete version of the data X may be marked as "invalid," but may not be immediately removed (e.g., erased), since, as discussed above, erasing X may involve erasing an entire storage division, which is a time-consuming operation and may result in write amplification. Similarly, data that is no longer in use (e.g., deleted or trimmed data) may not be immediately removed.

In some embodiments, the storage controller comprises a groomer module configured to reclaim storage divisions (erase blocks) for reuse. As used herein, reclaiming a storage division refers to erasing the storage division so that new data may be stored/programmed thereon. Reclaiming a storage division may comprise relocating valid data on the storage division to a different storage division (and erasing data that does not need to be preserved). The groomer may identify storage divisions for reclamation based upon one or more factors, which may include, but are not limited to: the amount of invalid data in the storage division, the amount of valid data in the storage division, wear on the storage division (e.g., number of erase cycles) since the storage division was programmed or refreshed, and so on.

The storage controller may be configured to store data with self-describing, persistent metadata (e.g., a contextual format). As used herein, a "contextual format" refers to a data format in which data is stored with self-descriptive, persistent metadata on the non-volatile storage medium. Persistent metadata may include, but is not limited to: a logical identifier (or other identifier), security controls, a data type, data attributes, an operation, and an order of a sequence of operations performed on the data, reference(s) to other data (e.g., an indicator that the data is associated with other data and/or is part of a particular storage operation), a relative position or offset of the data with respect to other data (e.g., file offset, etc.), data size and/or range, and so on. The contextual format data format may comprise a packet format that combines a data segment with corresponding self-descriptive metadata (e.g., in one or more headers or fields of the packet). Alternatively, a contextual data format may associate data with self-descriptive metadata in other ways (e.g., in a dedicated index on the non-volatile storage media, a storage division index, or the like).

The storage controller may be further configured to store data in a log format. As used herein, a "log format" refers to a data format that defines and/or preserves an ordered sequence of storage operations on the non-volatile storage media. In some embodiments, the log format comprises "appending" data to sequentially ordered media storage locations (e.g., sequentially within pages and/or erase blocks). The log format may further comprise associating data (e.g., each packet or data segment) with respective sequence indicators. The sequence indicators may be applied to individual data segments (e.g., applied to each data packet) and/or to data stored within particular media boundaries (e.g., packets stored sequentially within a storage division, such as an erase block and/or logical erase block). In some embodiments, sequence indicators may be applied to storage divisions when the storage divisions are initialized (e.g., when reclaimed, erased, groomed, formatted, or the like) and/or as data is being appended to the storage divisions.

The log format described herein may allow valid data to be distinguished from invalid data based upon the contents of the non-volatile storage media, and independently of other storage metadata. Invalid or obsolete data may not be removed from the storage media until the storage division comprising the data is reclaimed. Therefore, multiple "versions" of data having the same context may exist on the non-volatile storage medium (e.g., multiple versions of data having the same logical interface and/or same logical identifier). The sequence indicators associated with the data may be used to distinguish "invalid" versions of data from the current, up-to-date version of the data; the data that is the most recent in the log is the current version, and all previous versions may be identified as invalid.

In some embodiments, the contextual format may allow data context to be determined (and/or reconstructed) from the contents of the non-volatile storage medium, and independently of other storage metadata. For example, the contextual data format may allow the logical identifier associated with the data to be determined based only upon the contents of the non-volatile storage media (e.g., reconstruct the "any-to-any" mappings for the forward index, as described above). Moreover the storage controller may leverage the log format of the data to distinguish valid, up-to-date data from invalid and/or obsolete data.

In some embodiments, the storage controller may be configured to implement atomic storage operations. As used herein, an "atomic storage operation," refers to a operation that either succeeds or fails as a whole (as a single "transaction"). An atomic storage operation may comprise a plurality of separate operations (e.g., "sub-operations"); if any of the sub-operations cannot be completed, the entire atomic storage operation "fails." In response to a failure, the storage controller may be configured to undo or "rollback" any changes made while the operation was in process.

In some embodiments, the storage controller is configured to store persistent indicators to identify data pertaining to atomic storage operations. For example, the storage controller may be configured to set a persistent metadata flag (or other indicators) to identify data pertaining to an atomic storage operation that is "in progress," but is not complete (e.g., a persistent atomicity indicator). The storage controller may set another persistent metadata flag (or indicator) to indicate successful completion of the atomic storage operation (e.g., a persistent completion indicator), which may identify the "endpoint" of the atomic storage operation. Alternatively, or in addition, the storage controller may identify data of an atomic storage operation using other persistent indicators, such as persistent notes, packets, or the like. A first persistent note may indicate the beginning of an atomic storage operation, and a second note may indicate that the atomic storage operation is complete.

The storage controller may experience an invalid shutdown while performing an atomic storage operation, and as a result, data of the failed atomic storage operation may remain on the non-volatile storage media. The storage controller may implement a restart recovery process to recover storage metadata and/or to identify data of the failed atomic storage operation. As used herein, a "restart recovery" comprises the act of a system, apparatus, or computing device, commencing processing after an event that can cause the loss of data stored within volatile memory of the system, apparatus, or computing device, (e.g., a power loss, reset, etc.). Restart recovery may also comprise power cycle recovery, such as commencing processing after an invalid shutdown, hard reset, or disconnection or separation of the powered device from a power supply (such as physically disconnecting a power supply for the device).

The storage controller may be configured to identify the data of the failed atomic storage request so that the failed atomic storage request can be "rolled back." The storage controller may identify data of a failed atomic storage operation in a first scan of the non-volatile storage media. The storage controller may be further configured to store a physical trim note on the non-volatile storage medium that identifies the data of the failed storage request. As used herein, a "physical trim note" refers to a persistent note that identifies media storage locations comprising data that does not need to be preserved on the non-volatile storage media (e.g., is invalid, obsolete, or the like). In some embodiments, the physical trim note may coalesce (e.g., combine) the contents of other physical trim notes. Coalescing physical trim notes may comprise combining the data identifiers of one or more other physical trim note(s) into a new, updated physical trim note along with identifiers of data of failed atomic storage operation(s).

The storage controller may be further configured to reconstruct the storage metadata (e.g., forward index) from the contents of the non-volatile storage medium. In some embodiments, the storage metadata is reconstructed by performing a second scan of the non-volatile medium (after completion of the first scan). The storage controller may reconstruct mappings between logical identifiers and media addresses on the non-volatile storage medium during the second scan. The storage module may exclude data of failed atomic storage operations from the forward index, which may comprise excluding media address(es) of the data from association with logical identifiers in the forward index.

As described above, the storage controller may further comprise a groomer configured to reclaim storage divisions of the non-volatile storage media. The groomer may be configured to remove the data of the failed atomic storage operation in one or more grooming operations. The groomer may be further configured to remove the physical trim note from the non-volatile storage media in response to determining that the data identified by the physical trim note is no longer stored on the non-volatile storage medium and/or the data is identified in another, more up-to-date physical trim note.

Disclosed herein are embodiments of a storage controller comprising a recovery module configured to perform a first scan of the non-volatile storage medium. The storage controller may comprise an invalid data identification module configured to identify data of failed atomic storage operation (s) during the first scan. The storage controller may further comprise a note storage module configured to store a physical trim note on the non-volatile storage medium that identifies the data of the failed atomic storage operation(s).

The recovery module may be configured to scan the non-volatile storage medium according to a log order of the data. In some embodiments, the recovery module is configured to scan the non-volatile storage medium in a reverse log order.

The storage controller may further comprise a data invalidation module configured to invalidate data of the identified data on the non-volatile storage medium. Invalidating the data may comprise excluding the data from the forward index, marking the data invalid in the reverse index and/or validity bitmap, or the like.

The physical trim note may identify the data using a media address of the data (e.g., a physical storage location of the data).

The storage controller may further comprise a storage request receiver module configured to defer storage requests directed to the storage controller until completion of the first scan and/or until the physical trim note is stored on the non-volatile storage medium.

The data invalidation module may be configured to identify data of a failed atomic storage request based upon the persistent metadata of one or more data packets stored on the non-volatile storage medium. For example, the invalid data identification module may be configured to identify data of the failed atomic storage operation in response to identifying a data packet comprising a persistent metadata flag that indicates that the data packet is part of an atomic storage operation and failing to identify a data packet comprising a persistent metadata flag that indicates that the atomic storage operation was completed. The invalid data identification module may be configured to deduce that the data is part of a failed storage operation based upon persistent metadata of the data stored on the non-volatile storage medium (e.g., deduce that the data does not satisfy a pre-determined size or length criteria).

The storage controller may further comprise an index reconstruction module configured to perform a second scan of the non-volatile storage medium in response to completion of the first scan. The index reconstruction module may be configured to reconstruct a forward index comprising mappings between logical identifiers and media addresses of data associated with the logical identifiers based upon persistent metadata stored with the data on the non-volatile storage medium.

The storage controller may further comprise an exclusion module configured to exclude the data of failed atomic storage operation(s) from the forward index. Excluding the data may comprise excluding a media address (e.g., physical storage location) of the data from association with a logical identifier in the forward index.

The first scan may be performed in response an invalid shutdown. The recovery module may be configured to detect an invalid shutdown by accessing the non-volatile storage medium (e.g., accessing the non-volatile storage media to determine whether a clean shutdown indicator was stored, or the like).

The storage controller may further comprise a groomer that is configured to erase the physical trim note from the non-volatile storage media in response to determining that the data identified by the physical trim note is no longer stored on the non-volatile storage media.

Disclosed herein is a method comprising accessing data stored with self-describing, persistent metadata on a the non-volatile storage medium in a first scan of the non-volatile storage medium and in response to detecting an invalid shutdown; identifying data of a failed atomic storage operation during the first scan based upon the self-describing, persistent metadata stored on the non-volatile storage medium; storing a physical trim note that identifies the data of the failed atomic storage operation on the non-volatile storage medium by one or more of a media address and a logical identifier; reconstructing a forward index comprising any-to-any mappings between logical identifiers and media addresses of data associated with the respective logical identifiers in a second scan of the non-volatile storage medium; excluding references to the identified data of the failed atomic storage operation from the forward index; and locking access to the non-volatile storage medium in response during the first scan and/or reconstruction of the forward index.

The method may further comprise reconstructing the forward index by accessing the data in the second scan in a log order determined by sequence indicators stored on storage divisions of the non-volatile storage medium and an ordered sequence of media storage locations within the respective storage divisions.

Identifying data of the failed atomic storage operation may comprise accessing a data packet having self-descriptive metadata that indicates the data packet is part of an atomic storage operation; and completing the first scan without accessing a data packet having self-descriptive metadata that indicates the atomic storage operation was successfully completed. Alternatively, or in addition, identifying data of the failed atomic storage operation may comprise deducing that a data packet is part of a atomic storage operation based on self-describing metadata stored with the data packet on the non-volatile storage medium; and completing the first scan without accessing a data packet that indicates the atomic storage operation was successfully completed.

FIG. 1A is a block diagram of one embodiment a system 100 comprising a storage system 102 that includes a storage controller 124 and a virtual storage layer (VSL) 130. Portions of the storage controller 124, such as the VSL 130, may operate on a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 (and/or storage controller 124) to a communication network, such as a Internet Protocol network, a Storage Area Network, or the like. The computing device 110 may further comprise a non-transitory, machine-readable storage media 114. The machine-readable storage media 114 may comprise machine-executable instructions configured to cause the computing device 110 (e.g., processor 111) to perform steps of one or more of the methods disclosed herein. Alternatively, or in addition, the VSL 130 and/or one or more modules thereof may be embodied as one or more machine-readable instructions stored on the non-transitory storage media 114.

The virtual storage layer 130 may be configured to provide storage services to one or more storage clients 116. The storage clients 116 may include local storage clients 116 operating on the computing device 110 and/or remote, storage clients 116 accessible via the network (and network interface 113). The storage clients 116 may include, but are not limited to: operating systems, file systems, database applications, server applications, kernel-level processes, user-level processes, applications, and the like.

The virtual storage layer 130 comprises and/or is communicatively coupled to one or more storage devices 120A-N. The storage devices 120A-N may include different types of storage devices including, but not limited to: solid-state storage devices, hard drives, SAN storage resources, or the like. The storage devices 120A-N may comprise respective controllers 126A-N and non-volatile storage media 122A-N.

The VSL 130 may provide storage services through one or more interfaces, which may include, but are not limited to: a block I/O interface, an extended virtual storage layer interface, a cache interface, and the like. The VSL 130 may present a logical address space 134 to the storage clients 116 through one or more of the interfaces. As discussed above, the logical address space 134 may comprise a plurality of logical identifiers, each corresponding to respective media storage locations on one or more of the storage devices 120A-N (e.g., storage media 122A-N). The VSL 130 may maintain storage metadata 135 comprising "any-to-any" mappings between logical identifiers and media storage locations, as described above.

The VSL 130 may further comprise a log storage module 137 that is configured to store data in a contextual, log format. The contextual, log data format may comprise storing data with persistent, self-describing metadata, described above. The log storage module 137 may be further configured to store data in a log, which may comprise storing the data in sequentially ordered media storage locations (e.g., at an append point) and/or associating the data with respective sequence indicators on the non-volatile storage media 122. The log format may define an ordered sequence of storage operations performed on the storage devices 120A-N, as described above.

The VSL 130 may further comprise a storage device interface 139 configured to transfer data, commands, and/or queries to the storage devices 120A-N over a bus 125. The bus 125 which may comprise, but is not limited to: a peripheral component interconnect express ("PCI Express" or "PCIe") bus, a serial Advanced Technology Attachment ("ATA") bus, a parallel ATA bus, a small computer system interface ("SCSI"), FireWire, Fibre Channel, a Universal Serial Bus ("USB"), a PCIe Advanced Switching ("PCIe-AS") bus, a network, Infiniband, SCSI RDMA, or the like. The storage device interface 139 may communicate with the storage devices 120A-N using input-output control ("IO-CTL") command(s), IO-CTL command extension(s), remote direct memory access, or the like.

Figure 1B:
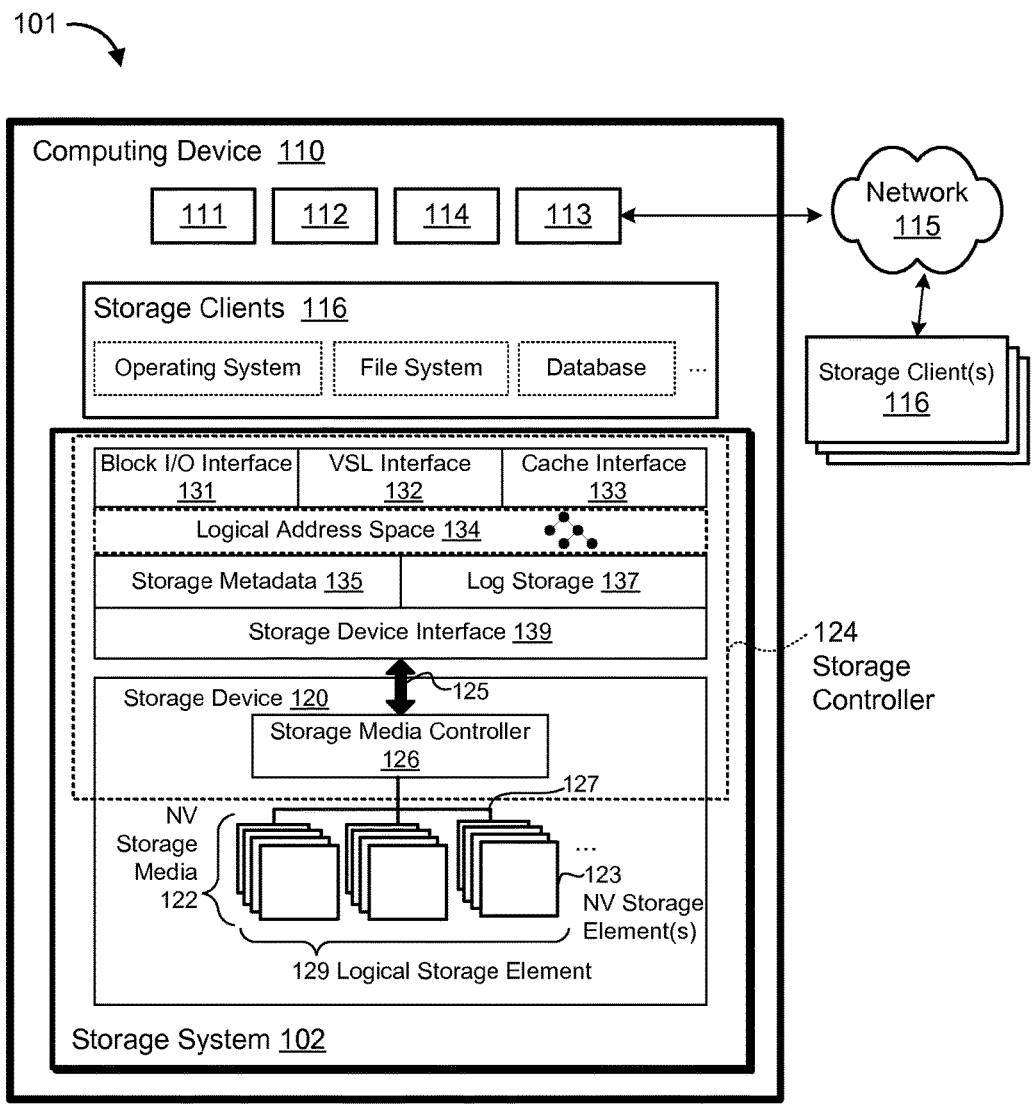
FIG. 1B is a block diagram of another embodiment of a storage system comprising a storage controller and a virtual storage layer.

FIG. 1B is a block diagram of another embodiment a system 101 comprising a storage controller 124 and virtual storage layer 130. The VSL 130 may operate on a computing device 110, which, as discussed above, may comprise a processor 111, volatile memory 112, communication interface 113, and non-transitory, machine-readable storage media 114. The communication interface 113 may comprise one or more network interfaces configured to communicatively couple the computing device 110 (and/or storage controller 124) to a network 115 and/or to one or more remote, network-accessible storage clients 116.

The storage controller 124 is configured to provide storage services to the storage clients 116. The storage clients 116 may include local storage clients 116 operating on the computing device 110 and/or remote storage clients 116 accessible via the network 115 (and network interface 113). Although FIG. 1B depicts a single storage device 120, the disclosure is not limited in this regard and could be adapted to incorporate any number of storage devices 120. Moreover, although certain embodiments are described in conjunction with solid-state storage device and/or media, the disclosure is not limited in this regard, and may be applied to any non-volatile storage medium and/or any "write anywhere" storage controller.

The non-volatile storage device 120 may comprise non-volatile storage media 122, which may include but is not limited to: NAND flash memory, NOR flash memory, nano random access memory ("nano RAM or NRAM"), magneto-resistive RAM ("MRAM"), dynamic RAM ("DRAM"), phase change RAM ("PRAM"), magnetic storage media (e.g., hard disk, tape), optical storage media, or the like. The non-volatile storage media 122 may be comprised of one or more storage elements 123, which may include, but are not limited to: chips, packages, planes, die, and the like. A storage media controller 126 may be configured to manage storage operations on the storage media 122, and may comprise one or more processors, programmable processors (e.g., field-programmable gate arrays), or the like. In some embodiments, the storage media controller 126 is configured to store data on (and read data from) the storage media 122 in the contextual, log format described above, and to transfer data to/from the non-volatile storage device 120, and so on.

The storage media controller 126 may be communicatively coupled to the non-volatile storage media 122 by way of a bus 127. The bus 127 may comprise a storage I/O bus for communicating data to/from the non-volatile storage elements 123. The bus 127 may further comprise a control I/O bus for communicating addressing and other command and control information to the non-volatile storage elements 123. In some embodiments, the bus 127 may communicatively couple the non-volatile storage elements 123 to the storage media controller 126 in parallel. This parallel access may allow the elements 123 to be managed as a group, forming a logical storage element 129. As discussed above, the logical storage element may be partitioned into respective logical storage units (e.g., logical pages) and/or logical storage divisions (e.g., logical erase blocks). The logical storage units may be formed by logically combining physical storage units of each of the non-volatile storage elements. For example, if the solid state storage media 122 comprises twenty-five (25) non-volatile storage elements, each logical storage unit may comprise twenty-five (25) pages (a page of each of element 122).

The storage controller 124 and/or VSL 130 may comprise one or more drivers, kernel-level applications, user-level applications, or the like. The storage controller 124 and/or VSL 130 may operate within an operating system, a virtual operating system, or the like. In some embodiments, the VSL 130 provides a block-device I/O interface 131 through which storage clients 116 perform block-level I/O operations. Alternatively, or in addition, the VSL 130 may provide a virtual storage layer (VSL) interface 132, which may provide other storage services to the storage clients 116. In some embodiments, the VSL interface 132 may comprise extensions to the block device interface 131 (e.g., storage clients 116 may access the VSL interface 132 through extensions to the block device interface 131). Alternatively, or in addition, the VSL interface 132 may be provided as a separate API, service, and/or library. The VSL 130 may be further configured to provide a cache interface 133 for caching data. The cache interface 133 may expose cache-specific features accessible via the virtual storage layer. Examples of such cache-specific features are disclosed U.S. patent application Ser. No. 12/877,971, filed Sep. 8, 2010, and entitled, "Apparatus, System, and Method for an Improved Nonvolatile Caching Device," which is hereby incorporated by reference. The interfaces 131, 132, and/or 133 may comprise interfaces for performing atomic storage operations. The storage metadata 135 may be used to manage and/or track storage operations performed any of the Block I/O interface 131, VSL interface 132, cache interface 133, or other, related interfaces.

As described above, the VSL 130 may present a logical address space 134 to the storage clients 116 (through the interfaces 131, 132, and/or 133). The VSL 130 may maintain storage metadata 135 comprising "any-to-any" mappings between logical identifiers in the logical address space 134 and media storage locations on the non-volatile storage media 122. The storage system 102 may further comprise a log storage module 137, which, as described above, may be configured to store data on the storage media 122 in a contextual, log format. The contextual, log data format may comprise associating data with a logical interface (e.g., logical identifier) on the non-volatile storage media 122. The contextual, log format may further comprise associating data with respective sequence identifiers on the non-volatile storage media 122, which define an ordered sequence of storage operations performed on the non-volatile storage media 122, as described above. The storage controller 124 may further comprise a storage device interface 139 that is configured to transfer data, commands, and/or queries to the storage media controller 126 over a bus 125, as described above.

Figure 2:
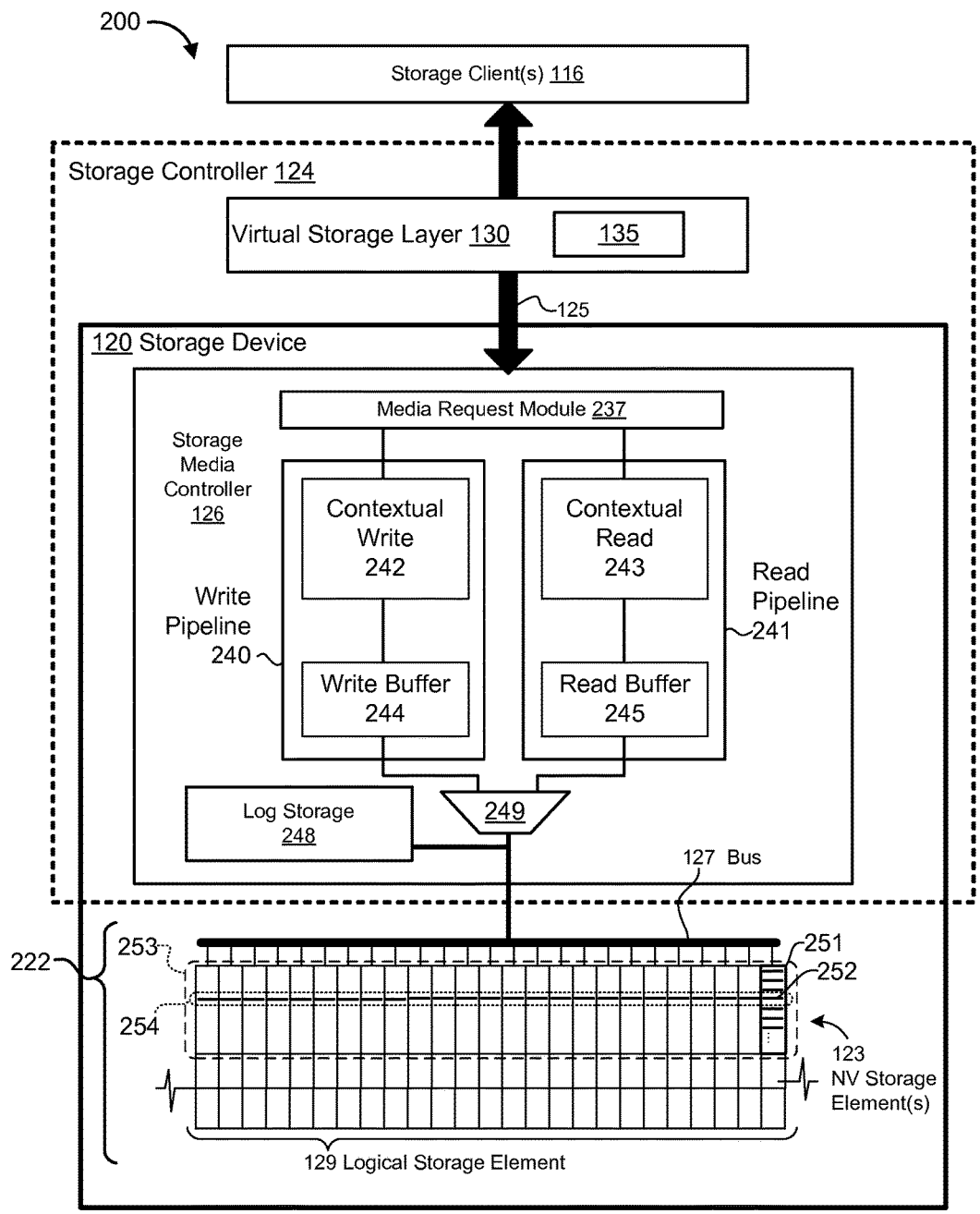
FIG. 2 is a block diagram that depicts another embodiment of a storage system comprising a storage controller and a virtual storage layer.

FIG. 2 is a block diagram 200 depicting another embodiment of a storage controller 124. The storage controller 124 may be communicatively coupled to a non-volatile storage medium 222 (via a storage media controller 126 and bus 127). As illustrated in FIG. 2, the non-volatile storage medium may comprise a plurality of solid-state storage elements 123, each of which may be partitioned into storage divisions (e.g., erase blocks) 251. Each storage division 251 may be partitioned into a physical storage units (e.g., pages) 252. An exemplary physical storage unit 251 may be capable of storing 2048 bytes ("2 kB"). Each non-volatile storage element 123 may further comprise one or more registers for buffering data to be written to a page 251 and/or data read from a page 251. In some embodiments, the non-volatile storage elements 123 may be further arranged into a plurality of independent banks (not shown).

The storage media controller 126 may manage the non-volatile storage elements 123 as a logical storage element 129. The logical storage element 129 may be formed by coupling the non-volatile storage elements 123 in parallel using the bus 127. Accordingly, storage operations may be performed on the non-volatile storage elements 123 concurrently, and in parallel (e.g., data may be written to and/or read from the non-volatile storage elements 123 in parallel). The logical storage element 129 may comprise a plurality of logical storage divisions (e.g., logical erase blocks) 253; each comprising a respective storage division of the non-volatile storage elements 123. The logical storage divisions 254 may comprise a plurality of logical storage units (e.g., logical pages) 254; each comprising a respective physical storage unit of the non-volatile storage elements 123. The storage capacity of a logical storage unit 253 may be a multiple of the number of parallel non-volatile storage elements 123 comprising the logical storage unit 253; for example, the capacity of a logical storage element comprised of 2 kb pages on twenty-five (25) non-volatile storage elements 123 is 50 kb.

Although FIG. 2 depicts one example of a logical storage element 129, the disclosure is not limited in this regard and could be adapted to differently sized logical storage elements 129 comprising any number of non-volatile storage elements 123. The size and number of erase blocks, pages, planes, or other logical and physical divisions within the non-volatile storage elements 123 are expected to change over time with advancements in technology; it is to be expected that many embodiments consistent with new configurations are possible and are consistent with the embodiments disclosed herein.

The storage media controller 126 may comprise a media request module 237 that is configured to receive storage requests from the VSL 130 via a bus 125. The media request module 237 may be further configured to transfer data to/from the VSL 130 and/or storage clients 116 via the bus 125. Accordingly, the media request module 240 may comprise one or more direct memory access ("DMA") modules, remote DMA modules, bus controllers, bridges, buffers, and so on.

The storage media controller 126 may comprise a write pipeline 240 that is configured to store data on the non-volatile storage medium 222 in the contextual, log format described above. The requests may include and/or reference data to be stored on the non-volatile storage media 222, may include logical interface of the data (e.g., logical identifier(s) of the data), and so on. The write pipeline may comprise a contextual write module 242 and a write buffer 244. As described above, the contextual format may comprise storing self-describing, persistent metadata in association with the data on the non-volatile storage medium 222. For example, the contextual write module 242 may be configured to format data into packets, and may include the self-describing, persistent metadata in one or more packet headers (or other packet fields). The write buffer 244 may be configured to buffer data for storage on the non-volatile storage medium 222. In some embodiments, the write buffer 244 may comprise one or more synchronization buffers to synchronize a clock domain of the storage media controller 126 with a clock domain of the non-volatile storage medium 122 (and/or bus 127).

The log storage module 248 may be configured to select media storage location(s) for the data and may provide addressing and/or control information to the non-volatile storage elements 123 via the bus 127. In some embodiments, the log storage module 248 is configured to store data sequentially in a log format within the media address space of the non-volatile storage media. The log storage module 248 may be further configured to groom the non-volatile storage media, as described above.

Upon writing data to the non-volatile storage media, the storage controller 124 may be configured to update storage metadata 135 (e.g., a forward index) to associate the logical interface of the data (e.g., the logical identifiers of the data) with the media address(es) of the data on the non-volatile storage medium 222. Portions of the storage metadata 135 may be maintained on the non-volatile storage medium 222, on a volatile memory (not shown), or the like. Alternatively, or in addition, the storage metadata 135 may be maintained within the VSL 130 (e.g., on a volatile memory 112 of the computing device 110 of FIGS. 1A and 1B). In some embodiments, the storage metadata 135 may be maintained in a volatile memory by the VSL 130, and may be periodically stored on a persistent storage medium (e.g., the non-volatile storage medium 222).

The storage media controller 126 may further comprise a read pipeline 241 that is configured to read contextual data from the non-volatile storage media 122 in response to requests received via the request module 240. The requests may comprise a logical identifier of the requested data, a media address of the requested data, and so on. The contextual read module 243 may be configured to read data stored in a contextual format from the non-volatile storage media 122 and to provide the data to the VSL 130 and/or a storage client 116. The contextual read module 243 may be configured to determine the media address of the data using a logical interface of the data and the storage metadata 135. Alternatively, or in addition, the VSL 130 may determine the media address of the data and may include the media address in the request. The log storage module 248 may provide the media address to the non-volatile storage elements 123, and the data may stream into the read pipeline 241 via the read buffer 245. The read buffer 245 may comprise one or more read synchronization buffers for clock domain synchronization, as described above.

The storage media controller 126 may further comprise a multiplexer 249 that is configured to selectively route data and/or commands to/from the write pipeline 240 and the read pipeline 241. In some embodiments, storage media controller 126 may be configured to read data while filling the write buffer 244 and/or may interleave one or more storage operations on one or more banks of non-volatile storage media 222.

Figure 3:
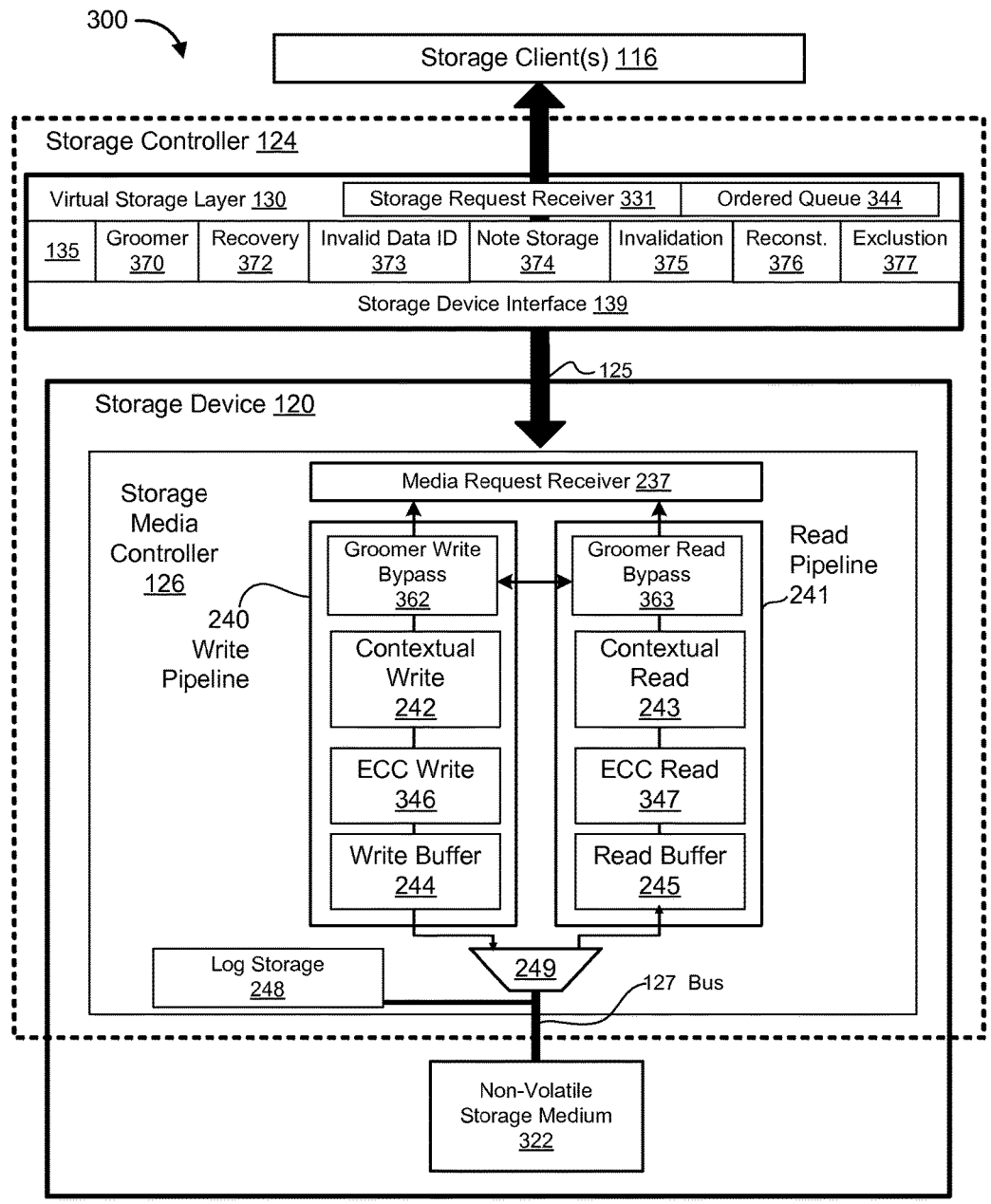
FIG. 3 is a block diagram that depicts another embodiment of a storage system comprising a storage controller and a virtual storage layer.

FIG. 3 is a block diagram 300 depicting another embodiment of a storage controller 124. The storage controller 124 may be communicatively coupled to a non-volatile storage media 322 via a storage media controller 126 and bus 127. The non-volatile storage media 322 may comprise magnetic storage media (e.g., one or more hard drives), solid-state storage media, optical storage media, or any other suitable, non-volatile storage media.

Figure 4A:
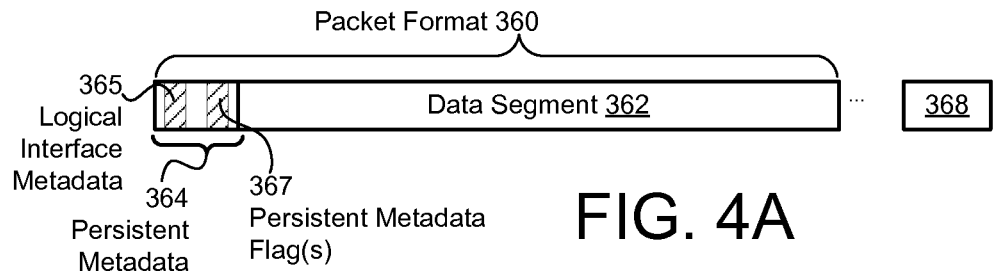
FIG. 4A depicts one embodiment of a packet format.

As described above, the contextual write module 242 may be configured to store data in a contextual format. In some embodiments, the contextual format comprises a packet format. FIG. 4A depicts one example of a packet format 360 for contextual data storage (e.g., data comprising persistent, self-describing metadata). The packet 360 may comprise a quantum of data (e.g., a data segment 362), which may be associated with one or more logical identifiers. In some embodiments, the data segment 362 comprises compressed, encrypted, and/or whitened data. The data segment 362 may be a predetermined size (e.g., a fixed data "block" or "segment" size) or a variable size. The packet format 360 may comprise persistent metadata 364 that is stored on the non-volatile storage media 322 with the data segment 362. (e.g., in a header of the packet format 360 as depicted in FIG. 4A). As described above, persistent metadata 364 may comprise contextual, self-descriptive metadata pertaining to the data segment 362. The persistent metadata 364 may include logical interface metadata 365 that defines the logical interface of the data segment 362. The logical interface metadata 365 may associate the data segment 362 with one or more logical identifiers, a logical identifier references (e.g., reference entries), a range, a size, or the like. The logical interface metadata 365 may be used to determine the context of the data independently of the storage metadata 135 and/or may be used to reconstruct the storage metadata 135 (e.g., reconstruct the "any-to-any" mappings of a forward index). The persistent metadata 364 may further comprise persistent metadata flags 367 which, as described below, may be used to identify data associated with an atomic storage operation.

In some embodiments, the packet 360 may be associated with a sequence indicator 368. The sequence indicator 368 may be persisted on the non-volatile storage media (e.g., page) with the data packet 360 and/or on the storage division (e.g., erase block) of the data packet 360. Alternatively, the sequence indicator 368 may be persisted in a separate storage division. In some embodiments, a sequence indicator 368 is applied when a storage division is reclaimed (e.g., erased, formatted, groomed, etc.). The sequence indicator 368 may be used to determine a log order of the packet 360 in a sequence of storage operations performed on the non-volatile storage media 322.

Referring back to FIG. 3, the contextual write module 242 may be configured to generate data packets of a fixed size or a variable size. Due to the independence between the logical interface of data and the underlying media storage location of the data, the size of the data packets generated by the contextual write module 242 may be independent of the underling structure and/or partitioning of the non-volatile storage media 322.

The write pipeline 240 may further comprise an ECC write module 346, which may be configured to encode the contextual data (e.g., data packets) into respective error-correcting code (ECC) chunks. The ECC encoding may be configured to detect and/or correct errors introduced through transmission and storage on the non-volatile storage media 322. In some embodiments, data packets stream to the ECC write module 346 as un-encoded blocks of length N ("ECC blocks"). The ECC write module 346 may calculate a syndrome of length S for the ECC block, which may be appended and streamed as an ECC chunk of length N+S. The values of N and S may be selected according to testing and experience and may be based upon the characteristics of the non-volatile storage media 322 (e.g., error rate of the media 322) and/or performance, efficiency, and robustness constraints. The relative size of N and S may determine the number of bit errors that can be detected and/or corrected in an ECC chunk.

In some embodiments, there is no fixed relationship between the ECC blocks and the packets; a packet may comprise more than one ECC block; the ECC block may comprise more than one packet; a first packet may end anywhere within the ECC block, and a second packet may begin after the end of the first packet within the same ECC block. The ECC algorithm implemented by the ECC write module 346 and/or ECC read module 347 may be dynamically modified and/or may be selected according to a preference (e.g., communicated via the bus 125), in a firmware update, a configuration setting, or the like.

The ECC read module 347 may be configured to decode ECC chunks read from the non-volatile storage medium 122. Decoding an ECC chunk may comprise detecting and/or correcting errors therein. The contextual read module 243 may be configured to depacketize data packets read from the non-volatile storage media 122. Depacketizing may comprise removing and/or validating contextual metadata of the packet, such as the logical interface metadata 365, described above. In some embodiments, the contextual read module 243 may be configured to verify that the logical interface information in the packet matches a logical identifier in the storage request.

In some embodiments, the log storage module 248 is configured to store data in a log format. As described above, a log format refers to storing data, such that an ordered sequence of storage operations is preserved on the non-volatile storage media, which may comprise storing data in a pre-determined, sequential order of media storage locations and/or associating the data with respective sequence indicators.

The log storage module 248 may be configured to store data sequentially at an append point of the non-volatile storage media 322. An append point may be located where data from the write buffer 244 will next be written. Once data is written at an append point, the append point shifts to the next media storage location Referring to FIG. 2, the append process may continue within logical erase blocks until the logical erase block 254 is full; the append point is then moved to next available logical erase block 254. The sequence of writing to logical erase blocks is maintained (e.g., using sequence indicators) so that if the storage metadata 135 is corrupted or lost, the log sequence of storage operations data be replayed to rebuild the storage metadata 135 (e.g., rebuild the "any-to-any" mappings of the forward index).

Figure 5:
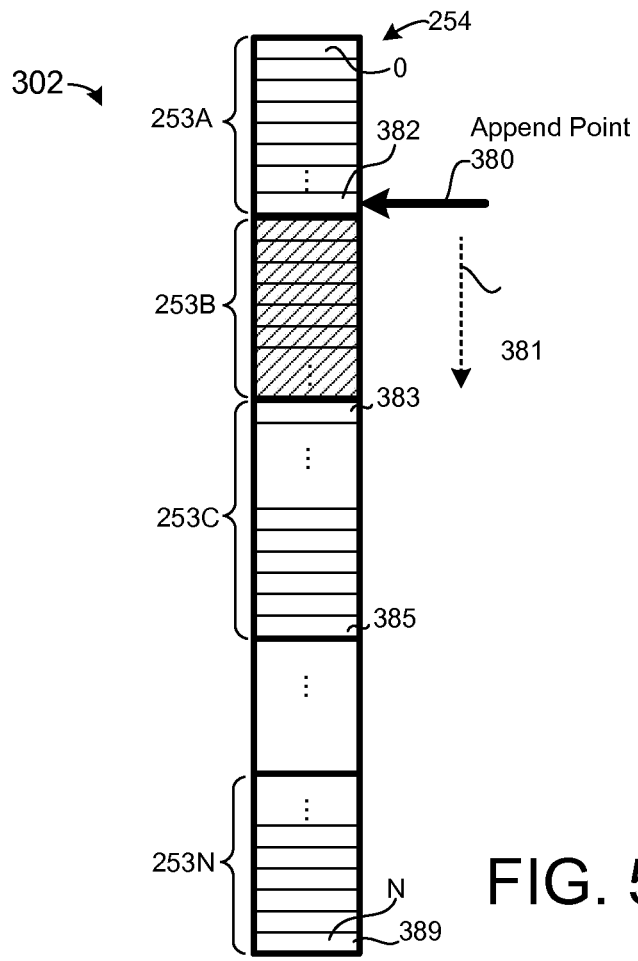
FIG. 5 depicts one embodiment of an append point within a physical storage space of a non-volatile storage device.

FIG. 5 depicts one example of log storage in a non-volatile storage medium. FIG. 5 depicts a physical storage space 302 of a non-volatile storage media, such as the non-volatile storage media 222 of FIG. 2. The physical storage space 302 is arranged into storage divisions (e.g., logical erase blocks 253A-253N), each of which can be initialized (e.g., erased) in a single operation. As described above, each logical erase block 253A-N may comprise an erase block 251 of a respective non-volatile storage element 123, and each logical erase block 253A-N may comprise a plurality of logical storage units (e.g., logical pages) 254. As described above, each logical page 254 may comprise a page of a respective non-volatile storage element 123. Storage element delimiters are omitted from FIG. 5 to avoid obscuring the details of the embodiment.

The logical storage units 254 may be assigned respective media addresses; in the FIG. 5 example, the media addresses range from zero (0) to N. The log storage module 248 may store data sequentially, at the append point 380; data may be stored sequentially within the logical page 382 and, when the logical page 382 is full, the append point 380 advances 381 to the next available logical page in the logical erase block, where the sequential storage continues. Each logical erase block 253A-N may comprise a respective sequence indicator. Accordingly, the sequential storage operations may be determined based upon the sequence indicators of the logical erase blocks 253A-N, and the sequential order of data within each logical erase block 253A-N.

As used herein, an "available" logical page refers to a logical page that has been initialized (e.g., erased) and has not yet been programmed. Some non-volatile storage media 122 can only be reliably programmed once after erasure. Accordingly, an available logical erase block may refer to a logical erase block that is in an initialized (or erased) state. The logical erase blocks 253A-N may be reclaimed by a groomer (or other process), which may comprise erasing the logical erase block 253A-N and moving valid data thereon (if any) to other storage locations. Reclaiming logical erase block 253A-N may further comprise marking the logical erase block 253A-N with a sequence indicator, as described above.

The logical erase block 253B may be unavailable for storage due to, inter alia: not being in an erased state (e.g., comprising valid data), being out-of service due to high error rates or the like, and so on. In the FIG. 5 example, after storing data on the physical storage unit 382, the append point 380 may skip the unavailable logical erase block 253B, and continue at the next available logical erase block 253C. The log storage module 248 may store data sequentially starting at logical page 383, and continuing through logical page 385, at which point the append point 380 continues at a next available logical erase block, as described above.

After storing data on the "last" storage unit (e.g., storage unit N 389 of storage division 253N), the append point 380 wraps back to the first division 253A (or the next available storage division, if storage division 253A is unavailable). Accordingly, the append point 380 may treat the media address space 302 as a loop or cycle.

Although FIG. 5 describes sequential storage operations on a non-volatile storage medium 222, the disclosure is not limited in this regard. The teachings of this disclosure, and in particular the write out-of-place paradigm of the storage controller 124 may be applied to other types of storage media, such as magnetic disks, optical media, or the like.

Referring back to FIG. 3, the storage controller 124 may comprise a groomer module 370 that is configured reclaim media storage locations (e.g., logical erase blocks), as described above. The groomer module 370 may monitor the non-volatile storage medium 322 and/or storage metadata 135 to identify media storage locations for reclamation, such as the logical erase blocks 253 of FIG. 2. The groomer module 370 may be configured to reclaim media storage location(s) in response to detecting one or more conditions, which may include, but are not limited to: a lack of available storage capacity, detecting a percentage of data marked as invalid within a particular media storage location reaching a threshold (e.g., logical erase block 253), a consolidation of valid data, an error detection rate reaching a threshold, improving data distribution, data refresh, or the like.

The groomer module 370 may operate outside of the path for servicing storage operations and/or requests. Therefore, the groomer module 370 may operate as an autonomous, background process, which may be suspended and/or deferred while other storage operations are in process. The groomer 370 may wear-level the non-volatile storage media 322 so that data is systematically spread throughout media storage locations (e.g., logical erase blocks 253), which may improve performance, data reliability and to avoid overuse and underuse of any particular storage locations, thereby lengthening the useful life of the solid-state storage media 322. Although the groomer module 370 is depicted in the VSL 130, the disclosure is not limited in this regard. In some embodiments, the groomer module 370 may operate on the storage media controller 126, may comprise a separate hardware component, or the like.

In some embodiments, the groomer 370 may interleave grooming operations with other storage operations and/or requests. For example, reclaiming media storage location(s) (e.g., a logical erase block 253) may comprise relocating valid data thereon to another storage location. The groomer read bypass module 363 and the groomer write bypass module 362 may be configured to allow data packets to be read into the read pipeline 241 and then be transferred directly to the write pipeline 240 without being routed out of the storage media controller 126.

The groomer read bypass module 363 may coordinate reading data to be relocated from a reclaimed media storage location. The groomer module 370 may be configured to interleave relocation data with other data being written to the non-volatile storage medium 322 via the groomer write bypass 362. Accordingly, data may be relocated without leaving the storage media controller 126. In some embodiments, the groomer module 370 may be configured to fill the remainder of a media storage location (e.g., a logical page or other data storage primitive) with relocation data, which may improve groomer efficiency, while minimizing the performance impact of grooming operations.

Figure 6:
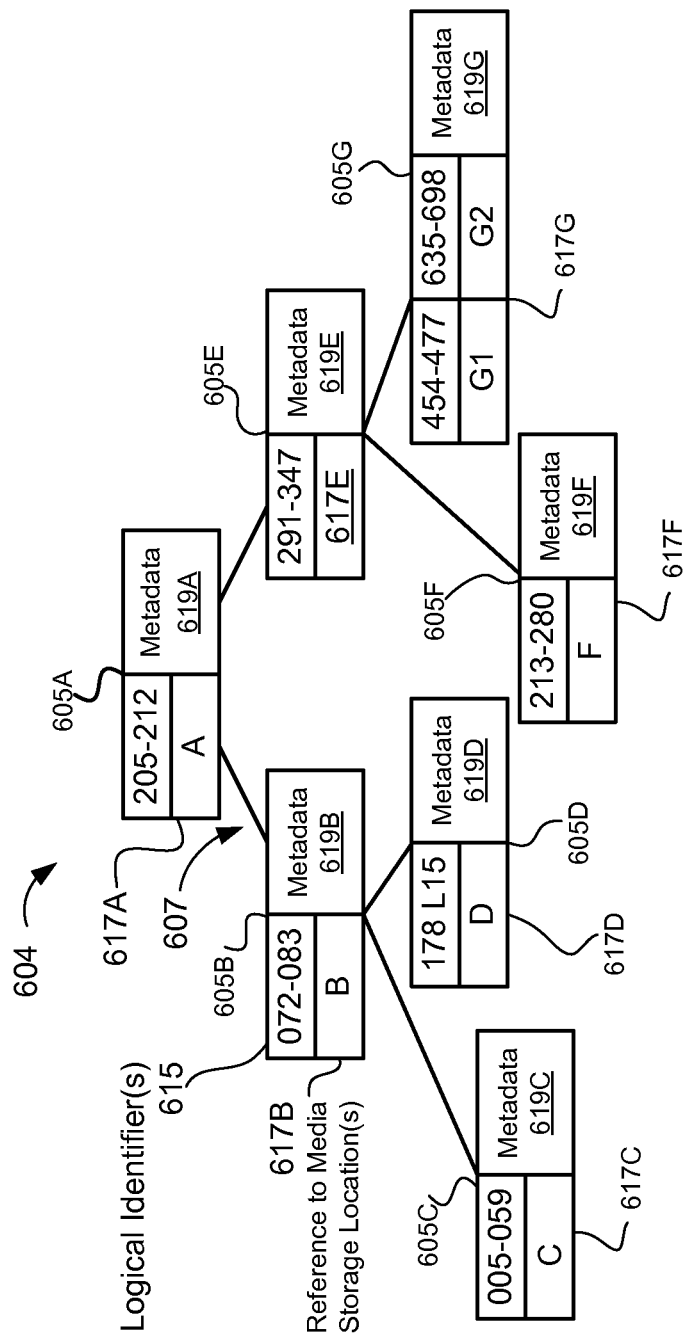
FIG. 6 depicts one embodiment of a forward index

As described above, the storage controller may maintain a forward index corresponding to the logical address space 134. FIG. 6 depicts one example of such an index 604. The index 604 may comprise a one or more entries 605A-N. Each entry 605A may correspond to a LID (or LID range or extent) 617 in the logical address space 134. The entries 605A-N may represent LIDs that have been allocated by use by one or more storage clients 116. The index 604 may comprise "any-to-any" mappings between logical identifiers and media storage locations. For example, the entry 605B binds logical identifiers 072-083 to media storage locations 95-106. An entry 605D may represent a LID that has been allocated, but has not yet been used to store data and as such, the LIDs may not be bound to any particular media storage locations (e.g., the LIDs 178-192 are "unbound"). As described above, deferring the allocation of physical storage resources, may allow the storage controller 134 to more efficiently manage storage resources (e.g., prevent premature reservation of physical storage resources, so that the storage resources are available to other storage clients 116). One or more of the entries 605A-N may comprise additional metadata 619, which may include, but is not limited to: access control metadata (e.g., identify the storage client(s) authorized to access the entry), reference metadata, logical interface metadata, and so on. The index 604 may be maintained by the storage controller 124 (and/or VSL 130), and may be embodied as storage metadata 135 on a volatile memory 112 and/or a non-transitory machine-readable storage medium 114.

The index 604 may be configured to provide for fast and efficient entry lookup. The index 604 may be implemented using one or more datastructures, including, but not limited to: a B-tree, a content addressable memory ("CAM"), a binary tree, a hash table, or other datastructure that facilitates quickly searching a sparsely populated logical address space. The datastructure may be indexed by LID, such that, given a LID, the entry 605A-N corresponding to the LID (if any) can be identified in a computationally efficient manner.

In some embodiments, the index 604 comprise one or more entries (not shown) to represent unallocated LIDs (e.g., LIDs that are available for allocation by one or more storage clients 116). The unallocated logical identifiers may be maintained in the index 604 and/or in a separate index (not shown). In some embodiments, the index 604 may comprise one or more sub-indexes, such as a "reference index." As described below, the reference index 622 may comprise data that is being referenced by one or more other entries 605A-N in the index (e.g., indirect references).

Figure 7A:
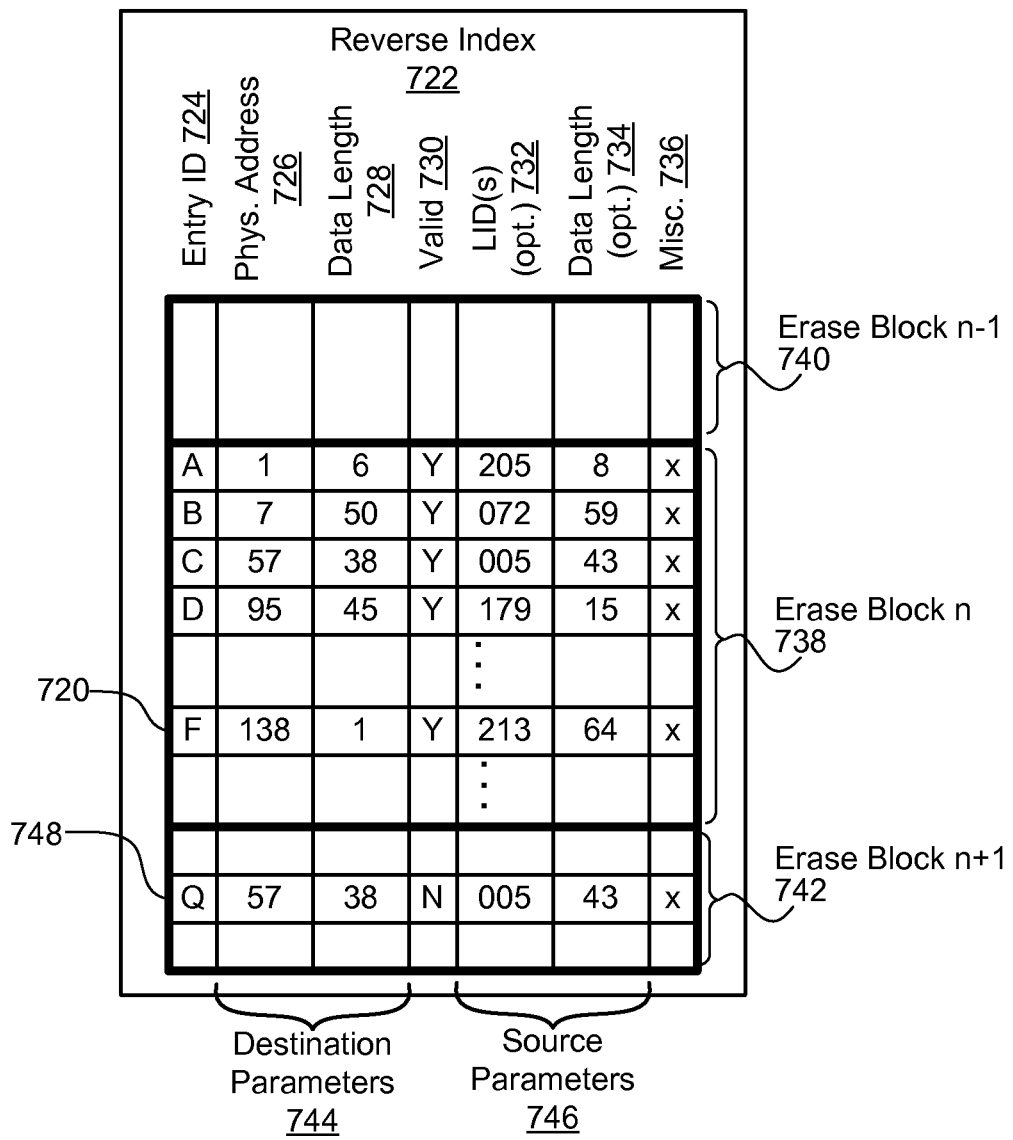
FIG. 7 depicts one embodiment of a reverse index.
Figure 7B:
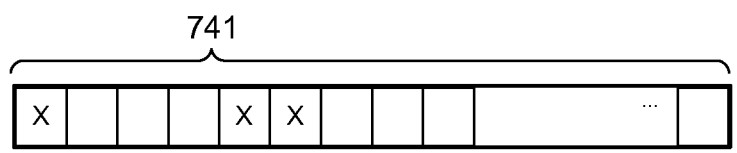

The storage metadata 135 may further comprise a reverse index as depicted in FIG. 7A and/or one or more validity bitmaps 741 as depicted in FIG. 7B. The reverse index 722 may be configured to maintain validity metadata, which may be used to distinguish media storage locations that comprise valid data from media storage locations comprising data that can be erased from the non-volatile storage medium 322. Validity bitmaps 741 may comprise bits (or other indicators) to identify media storage locations comprising valid/invalid data within a particular storage division (e.g., logical erase block 253). Although particular examples and datastructures of storage metadata 135 are described herein, the disclosure is not limited in this regard; the storage controller 124 may be configured to incorporate any type of storage metadata embodied using any suitable datastructure.

Referring back to FIG. 3, in some embodiments, the storage controller 124 may comprise an ordered queue 344. The ordered queue 344 may receive both atomic storage requests (such as an atomic storage request 901 discussed below in connection with FIGS. 9A-E) and non-atomic storage requests through the storage request receiver module 331. In one configuration, the atomic and the non-atomic storage requests are processed based on an order of arrival at the ordered queue 344. The ordered queue 344 may simplify processing of storage requests and obviate the need, for example, for an inflight index 950 (disclosed below in connection with FIGS. 9A-E) because storage requests do not potentially conflict with pending requests as all requests are processed in a specific order. Consequently, certain embodiments may include the ordered queue 344 and not the inflight index 950. In addition, embodiments may leverage the ordered queue 344 to avoid potential problems that may be caused by interleaving of data packets, which may occur if multiple atomic requests are processed simultaneously. As will be explained below in connection with FIGS. 11A-C, if data packets for each atomic request are stored contiguously (without interleaving packets associated with other write requests), a single bit within each data packet may be utilized to identify whether an atomic write was successfully completed. Accordingly, in certain embodiments, the ordered queue 344 may provide significant advantages by mitigating the metadata stored on the storage media 410 in connection with atomic write operations.

In an alternative embodiment, the ordered queue 344 may process either atomic storage request or non-atomic storage requests but not both. As an additional alternative, there may be a first ordered queue for atomic storage requests and a second ordered queue for non-atomic storage requests.

As described below, the storage controller 124 may be configured to implement atomic storage operations in response to atomic storage requests from one or more storage clients 116. Implementing an atomic storage operation may comprise storing data on the non-volatile storage medium 322, such that the data can be "rolled back," if any portion of the atomic storage operation fails. Accordingly, data of an atomic storage operation may comprise persistent metadata (e.g., persistent metadata flags 367) to identify data associated with an atomic storage operation, and to indicate successful completion of the atomic storage operation.

The storage controller 124 may experience an invalid shutdown while implementing an atomic storage operation, which may result in data of a failed atomic storage operation remaining on the non-volatile storage media 322. The storage controller 124 may comprise a recovery module 372 that is configured to detect an invalid shutdown condition, and, in response, to perform a first scan of the non-volatile storage medium 322 to identify (and invalidate) data of failed atomic storage requests stored on the non-volatile storage medium 322. The recovery module 372 may be configured to detect an invalid shutdown when the storage controller 124 is restarted (e.g., powered on, reset, or the like). In some embodiments, the recovery module 372 detects an invalid shutdown condition by accessing the non-volatile storage medium 322. For example, in some embodiments, the storage controller 124 is configured to store a persistent note on the non-volatile storage media 322 to indicate that a clean shutdown occurred. The persistent note may be stored at the current append point or at another, pre-determined media storage location. The recovery module 372 may determine that an invalid shutdown occurred in response to determining that the persistent note was not stored on the non-volatile storage media 322.

The first scan may comprise accessing the log of storage operations on the non-volatile storage medium 322 defined by, inter alia, the contextual, log-based data format implemented by the storage controller 124. The first scan may comprise scanning the log of storage operations in a log order. For example, the first scan may comprise scanning the log of storage operations from the head of the log (e.g., the current append point 380 of FIG. 5) to the tail of the log.

An invalid data identification module 373 may be configured to identify data of failed atomic storage operations during the first scan. Data of a failed atomic storage operation may be identified using the contextual format of the data on the non-volatile storage medium 322 (e.g., persistent metadata flags as described in conjunction with FIG. 13A) and/or other persistent notes, as described in conjunction with FIG. 13B. The invalid data identification module 373 may be configured to identify data that is associated with atomic storage operations that do not comprise a corresponding completion indicator on the non-volatile storage media 322 (e.g., persistent metadata flag and/or persistent note indicating that the atomic storage request was successfully completed).

The invalid data identification module 373 may be further configured to deduce a failed atomic storage operation. The invalid data identification module 373 may be configured to identify storage operations that have properties of an atomic storage operation, but are not specifically "marked" as atomic as described herein (e.g., do not comprise an atomicity indicator, such as persistent metadata flags). As used herein a "property of an atomic storage operation" refers to a property of a storage operation from which successful completion of the operation can be determined. For example, a storage operation may be known to be of a pre-determined size or length. Successful completion of the storage operation may be determined by comparing a size or length of data pertaining to the storage operation on the non-volatile storage media 322 to a predetermined criteria. If the data of the storage operation does not satisfy the criteria, the invalid data identification module 373 may deduce that the is part of a failed atomic storage operation. The invalid data identification module 373 may be configured to deduce atomic storage operations using persistent metadata associated with data on the non-volatile storage medium 322, including, but not limited to: data type metadata, logical interface metadata, and the like. For example, data of a particular type may be known to be a particular, fixed length (e.g., a set of fixed-length validity bitmaps 741). In response to identifying data of the particular type, the invalid data identification module 373 may be configured to determine whether the data satisfies a known size and/or length constraint; if not, the invalid data identification module 373 may deduce that the is part of a failed atomic storage operation. In another example, the invalid data identification module 373 may be configured to recognize that data stored in association with a particular logical identifier is subject to a particular size and/or length constraint; data that is associated with the particular logical identifier and that does not satisfy the constraint may be deduced to be part of a failed atomic storage request.

The invalid data identification module 373 may be further configured to incorporate contents of other physical trim notes accessed during the first scan of the non-volatile storage medium 322. Incorporating a physical trim note may comprise identifying data referenced therein as invalid (as if the data were part of a failed atomic storage request).

In some embodiments, the first scan may comprise scanning the entire media address space of the non-volatile storage medium 322. Alternatively, the first scan may be limited to particular areas and/or regions of the media address space (or log). For example, the first scan may be limited to identifying data of a failed atomic storage requests at the end of the log (adjacent to the append point 720, discussed below); the first scan may terminate in response to identifying data of a valid atomic storage operation and/or a non-atomic storage operation.

A note storage module 374 may be configured to store a physical trim note on the non-volatile storage media 322 in response to completing the first scan (and/or in response to identifying data of a failed atomic storage operation on the non-volatile storage media 322). The physical trim note may identify the invalid data that was identified by the invalid data identification module 373 during the first scan, as described above. The physical trim note may further comprise invalidation information determined from other physical trim notes on the non-volatile storage medium 322. The physical trim note may, therefore, identify one or more contiguous and/or discontiguous sets, ranges, and/or extents of media storage locations. The media storage locations may be identified by media address (or other reference or address). The invalid data may be further identified by a sequence indicator associated with media storage location (e.g., a sequence indicator the corresponding storage division). The sequence indicator may provide for determining whether data referenced by the trim note is still on the non-volatile storage medium 322. For example, a media storage location referenced by a physical trim note may be overwritten with other, valid data (and/or reclaimed by the groomer 370), which may comprise assigning a new, updated sequence indicator to the media storage location. The data referenced in the physical trim note may be distinguished from data of the updated media storage location by comparing the sequence indicator of the physical trim note to the current sequence indicator associated with the media storage location. The physical trim note may comprise a single sequence indicator (e.g., a current sequence indicator) and/or may comprise sequence indicators for each media storage location referenced in the physical trim note.

Figure 4B:
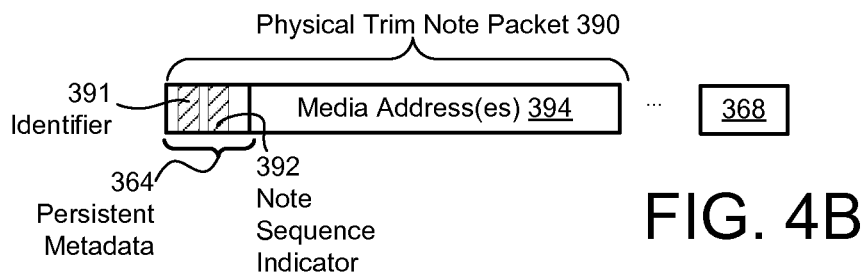
FIG. 4B depicts one embodiment of a packet format for a physical trim note.

FIG. 4B depicts one embodiment of a packet format 390 for a physical trim note. The physical trim note packet 390 may comprise persistent metadata 364 (e.g., a header), comprising a type identifier 391 that indicates that the packet 390 is a physical trim note.

The physical trim note packet 390 may identify data to be trimmed from the non-volatile storage medium 322. In the FIG. 4B example, the identifiers comprise media address(es) 394; however, any suitable reference mechanism could be used. The media address(es) 394 may comprise respective sequence indicators, which, as described above, may be used to determine whether invalid data stored at the media address(es) 394 remains on the non-volatile storage media 322 (e.g., compare a current sequence indicator associated with the media storage location to the sequence indicator stored in the physical tri note packet 390).

In some embodiments, the persistent metadata 364 may comprise a note sequence indicator field 392, which may correspond to the "original" sequence indicator of the physical trim note packet 390 (the sequence indicator of the physical trim note packet 390 when stored on the non-volatile storage media 322). The note sequence indicator 392 may be included in lieu of, or in addition to, the individual, media-address-specific sequence indicators described above.

As described above, data stored on the non-volatile storage medium 322 may be periodically groomed (by the groomer 370), which may comprise relocating data to a different media storage location. Relocating the data may comprise associating the data with a new sequence indicator 368, which may correspond to the sequence indicator of the new storage division of the data (e.g., the new erase block or logical erase block 254). However, as described above, it may be desirable to retain the original note sequence indicator 392 for comparison with sequence indicator(s) of data referenced by the physical trim note 390 (e.g., to determine whether data of the media address(es) is still stored on the non-volatile storage medium 322). For example, if a sequence indicator of a media storage location referenced in the physical trim note packet 390 is more recent in the log than the note sequence indicator 392 (or a sequence indicator associated with the media address 394 in the note 390), it can be determined that the media storage location has been groomed (and/or overwritten), and the data referenced in the physical trim note 390 is no longer on the non-volatile storage medium 322. However, if the sequence indicator of the media storage location is earlier in the log than the note sequence indicator 392 (or a sequence indicator of the media address 394), it can be determined that the media storage location has not been groomed, and the data referenced in the physical trim note 390 is still on the non-volatile storage medium 322.

Referring back to FIG. 3, a data invalidation module 375 may be configured to invalidate the data of failed atomic storage operation(s) and/or data referenced in other, physical trim notes identified during the first scan. The data invalidation module 375 may be configured to invalidate data by, inter alia, updating a reverse index 722, validity bitmap(s) 741, and/or other data structures to indicate that the identified media storage location(s) comprise invalid data.

The storage request receiver module 331 may be configured to lock access to the non-volatile storage medium 322 during the first scan. Locking access may comprise deferring, queuing, and/or rejecting storage requests directed to the storage controller 124 while the first scan is in progress, until the physical trim note has been stored on the non-volatile storage medium 322, and/or until the reconstruction module 376 completes reconstruction of the storage metadata 135 (described below).

The reconstruction module 376 may be configured to reconstruct storage metadata 135 from the contextual format of the data on the non-volatile storage medium 322. The reconstruction module 376 may reconstruct the storage metadata 135 in a second scan of the non-volatile storage media 322, which may begin in response to completing the first scan (and/or storing the physical trim note). The reconstruction module 376 may be configured to exclude data of failed atomic storage operations based upon the storage metadata 135 provided by the data invalidation module 375 during the first scan (e.g., the reverse index 722, validity bitmap(s) 741, and so on) and/or the physical trim note described above.

In some embodiments, the reconstruction module 376 reconstructs a forward index comprising any-to-any mappings between logical identifiers and media storage location (s). One embodiment of a forward index 604 is described below in conjunction with FIG. 6. The mappings may be derived from the contextual format of the data on the non-volatile storage medium 322. As described above, the storage controller 124 may be configured to store data with self-describing, persistent metadata (e.g., in a packet format 360). The self-describing, persistent metadata may comprise logical interface 365 of the data (e.g., logical identifier associated with the data), from which the mappings may be derived. The storage controller 124 may be further configured to store data in a log-format, such that the most recent version of data of a particular logical identifier may be distinguished from other, obsolete versions of the data (e.g., based upon the log order of the respective packets 360).

The storage controller may further comprise an exclusion module 377 that is configured to exclude data of failed atomic storage requests from the forward index 604 and/or prevent the data from being misidentified as valid data, which may comprise excluding media addresses identified by the invalid data identification module 373 and/or data invalidation module 375 from being associated with logical identifiers in the forward index 604.

The storage request receiver module 331 may be configured to unlock access to the non-volatile storage medium 322 (and the storage controller 124) in response to reconstructing the storage metadata 135. Unlocking access may comprise accepting storage requests, implementing queued and/or deferred storage requests, and so on.

As described above, a groomer module 370 may be configured to reclaim media storage locations of the non-volatile storage media 322 (e.g., logical erase blocks) in background grooming operations. Reclaiming a media storage location may comprise relocating valid data and erasing data that does not need to be retained (e.g., data that is invalid, obsolete, deleted, trimmed, or the like). The groomer 370 may distinguish valid data from invalid data using storage metadata 135. For example, the groomer 370 may determine that media storage locations that are not "bound" to valid logical identifiers in the forward index are invalid, and can be erased. Similarly, the groomer 370 may access a reverse index and/or validity bitmap(s) (described below) to identify media storage locations comprising invalid data. Accordingly, the groomer 370 may use the storage metadata 135 provided by the data invalidation module 375 to remove data of failed atomic storage requests from the non-volatile storage medium 322.

The groomer 370 may be configured to erase physical trim notes from the non-volatile storage media 322. The groomer 370 may erase a physical trim note in response to determining that the physical trim note is obsolete (e.g., data referenced by the physical trim note has been removed from the non-volatile storage media 322). The groomer 370 may identify an obsolete physical trim note by comparing sequence indicator(s) of the physical trim note to sequence indicators associated with media storage location(s) referenced in the physical trim note. If the sequence indicator(s) of the media storage locations referenced by the physical trim note are later in the log than the physical trim note sequence indicators(s), the groomer 370 may determine that the physical trim note is obsolete and can be erased (e.g., during grooming of the storage division comprising the physical trim note).

FIG. 6 depicts one example of storage metadata and, in particular, a forward index 604 that maintains allocations of the logical address space of one or more non-volatile storage devices (e.g., storage devices 120 described above). The forward index 604 may be further configured to maintain assignments between allocated logical identifiers and physical storage locations on a non-volatile storage device. The forward index 604 may be maintained by the storage controller 124 (and/or one or more module(s) thereof).

In the FIG. 6 example, the data structure 604 is implemented as a range-encoded B-tree. The disclosure is not limited in this regard, however; the forward index 604 may be implemented using a suitable data structure including, but not limited to: a tree, a B-tree, a range-encoded B-tree, a radix tree, a map, a content addressable map (CAM), a table, a hash table, or other suitable data structure (or combination of data structures).

The forward index 604 comprises a plurality of entries 605 (entries 605A-G), each representing one or more logical identifiers in the logical address space. For example, the entry 605B references logical identifiers 615 (LIDs 072-083). Data may be stored sequentially or "out-of-place" on the non-volatile storage device and, as such, there may be no correspondence between logical identifiers and the physical storage locations. The forward index 604 maintains assignments between allocated logical identifiers and physical storage locations (e.g., using physical storage location references 617). For example, the reference 617B assigns the logical identifiers 615 (LIDs 072-083) to one or more physical storage locations of the non-volatile storage device. In some embodiments, the references 617 comprise a physical address on the non-volatile storage device. Alternatively, or in addition, the references 617 may correspond to a secondary datastructure (e.g., the reverse index 722, described below), or the like. The references 617 may be updated in response to changes to the physical storage location of data (e.g., due to grooming operations, data refresh, modification, overwrite, or the like).

In some embodiments, one or more of the entries 605 may represent logical identifiers that have been allocated to a storage client, but have not been assigned to any particular physical storage locations (e.g., the storage client has not caused data to be written to the logical identifiers). The physical storage location reference 617 of an unassigned entry 605 may be marked as "null" or not assigned.

The entries 605 are arranged into a tree data structure by the edges 607. In some embodiments, the entries 605 are indexed by logical identifier, which provides for fast and efficient entry 605 lookup. In the FIG. 6 example, the entries 605 are arranged in logical identifier order such that the entry 605C references the "lowest" logical identifiers and 605G references the "largest" logical identifiers. Particular entries 605 are accessed by traversing the edges 607 of the forward index 604. In some embodiments, the forward index 604 is balanced, such that all leaf entries 605 are of a similar depth within the tree.

For clarity, the FIG. 6 example depicts entries 605 comprising numeric logical identifiers. However, the disclosure is not limited in this regard, and one of skill in the art will recognize that the entries 605 could comprise any suitable logical identifier representation, including, but not limited to: alpha-numerical characters, hexadecimal characters, binary values, text identifiers, hash codes, or the like.

The entries 605 of the index 604 may reference logical identifiers of variable size and/or length; a single entry 605 may reference a plurality of logical identifiers (e.g., a set of logical identifiers, a logical identifier range, a noncontiguous set of logical identifiers, or the like). For example, the entry 605B represents a contiguous range of logical identifiers 072-083. Other entries of the index 604 may represent a noncontiguous set of logical identifiers; entry 605G represents logical identifiers 454-477 and 535-598, each assigned to respective physical storage locations by respective references G1 and G2. The forward index 604 may represent logical identifiers using any suitable technique; for example, the entry 605D references logical identifier 178 and length 15, which corresponds to a range of logical identifiers 178-192.

In some embodiments, the entries 605 comprise and/or reference metadata 619, which may comprise metadata pertaining to the logical identifiers, such as age, size, logical identifier attributes (e.g., client identifier, data identifier, file name, group identifier), the underlying physical storage location(s), or the like. The metadata 619 may be indexed by logical identifier (through association with the respective entries 605) and, as such, the metadata 619 may remain associated with entry 605 regardless of changes to the location of the underlying physical storage locations of the data.

The index 604 may be used to efficiently determine whether the non-volatile storage device comprises a particular logical identifier. In one example, a storage client may request allocation of a particular logical identifier. If the index 604 comprises an entry 605 that includes the requested logical identifiers, the logical identifier(s) associated with the request may be identified as being already allocated. If the logical identifiers are not in the index, they may be allocated to the requester by creating a new entry 605 in the index 604. In another example, a storage client requests data of a particular logical identifier. The physical storage location of the data is determined by accessing the reference 617 to the physical storage location of the entry 605 comprising the logical identifier. In another example, a client modifies data pertaining to a logical identifier. In another example, a storage client modifies existing data of a particular logical identifier. The modified data is written sequentially to a new media storage location on the non-volatile storage device, and the media storage location reference 617 of the entry 605 in the index 604 is updated to reference the media storage location of the new data. The obsolete data may be marked as invalid for reclamation in a grooming operation.

The forward index 604 of FIG. 6 maintains a logical address space and, as such, is indexed by logical identifier. As discussed above, entries 605 in index 604 may comprise references 617 to media storage locations on a non-volatile storage device. In some embodiments, the references 617 may comprise media addresses (or address ranges) of the media storage locations. Alternatively, or in addition, the references 617 may be indirect (e.g., reference a secondary datastructure, such as a reverse index).

FIG. 7A depicts one example of a reverse index 722 for maintaining metadata pertaining to media storage locations of a non-volatile storage device. In the FIG. 7A example, the reverse index 722 is implemented as a table data structure. The disclosure is not limited in this regard, however, and could implement the reverse index 722 using any suitable datastructure. For example, in some embodiments, the reverse index 722 is implemented in the same data structure with the forward index 604 described above (e.g., portions and/or entries of the reverse index 722 may be included as leaf entries of the forward index 604). The index 722 comprises a plurality of entries 720 (depicted as rows in the table datastructure 722), each of which may comprise an entry ID 724, a media address 726, a data length 728 associated with the data stored at the media address 726 on the non-volatile storage media 410 (in this case the data is compressed), a valid tag 730, a logical address 732 associated with the data, a data length 734 associated with the logical address 732, and other miscellaneous data 736. In a further embodiment, the reverse index 722 may include an indicator of whether the media address 726 stores dirty or clean data, or the like.

The reverse index 722 may be organized according to the configuration and/or layout of a particular non-volatile storage device. Accordingly, the reverse index 722 may be arranged by storage divisions (e.g., erase blocks), media storage locations (e.g., pages), logical storage locations, or the like. In the FIG. 7A example, the reverse index 722 is arranged into a plurality of erase blocks (740, 738, and 742), each comprising a plurality of media storage locations (e.g., pages, logical pages, or the like).

The entry 720 comprises metadata pertaining to the media storage location(s) comprising data of the entry 605F of FIG. 6. The entry 720 indicates that the media storage location is within erase block n 738. Erase block n 738 is preceded by erase block n−1 740 and followed by erase block n+1 742. (The contents of erase blocks n−1 and n+1 are not shown).

The entry ID 724 may be an address, a virtual link, or other data to associate entries in the reverse index 722 with entries in the forward index 604 (or other storage metadata). The media address 726 indicates a media address on the non-volatile storage device (e.g., non-volatile storage media 410). The data length 728 associated with the media address 726 identifies a length of the data stored at the media address 726. Together, the media address 726 and data length 728 may be referred to as destination parameters 744.

The logical identifier 732 and data length 734 may be referred to as source parameters 746. The logical identifier 732 associates the entry with a logical identifier of the logical address space. The logical identifier 732 may be used to associate an entry in the reverse index 722 with an entry 605 of the forward index 604. The data length 724 refers to the length of the data in the logical address space (e.g., from the perspective of the storage client). The source parameter 746 data length 734 may be different from the source parameter 746 data length 734 due to, inter alia, data compression, header overhead, encryption overhead, or the like. In the FIG. 7A example, the data associated with the entry 720 is highly compressible and was compressed from 74 blocks in the logical address space to 1 block on the non-volatile storage device.

The valid tag 730 indicates whether the data mapped to the entry 720 is valid. In this case, the data associated with the entry 720 is valid and is depicted in FIG. 7A as a "Y" in the row of the entry 720. As used herein, valid data refers to data that is up-to-date and has not been deleted and/or made obsolete (overwritten or modified). The reverse index 722 may track the validity status of each media storage location of the non-volatile storage device. The forward index 604 may comprise entries corresponding to valid data only. In the FIG. 7A example, entry "Q" 748 indicates that data associated with the entry 748 is invalid. Note that the forward index 604 does not include logical addresses associated with entry Q 748. The entry Q 748 may correspond to an obsolete version of the data of entry 605C (overwritten by data now stored at entry "C").

The reverse index 722 may maintain entries for invalid data so that valid and invalid data can be quickly distinguished for storage recovery (e.g., grooming). In some embodiments, the forward index 604 and/or the reverse index 722 may track dirty and clean data in a similar manner to distinguish dirty data from clean data when operating as a cache.

In some embodiments, the reverse index 722 may omit the source parameters 746. For example, if the source parameters 746 are stored with the data, possibly in a header of the stored data, the reverse index 722 may identify a logical address indirectly by including a media address 726 associated with the data and the source parameters 746 could be identified from the stored data.

The reverse index 722 may also include other miscellaneous data 736, such as a file name, object name, source data, storage client, security flags, atomicity flag, transaction identifier, or the like. One of skill in the art will recognize other information useful in a reverse index 722. While media addresses 726 are depicted in the reverse index 722, in other embodiments, media addresses 726, or other destination parameters 744, may be included in other locations, such as in the forward index 604, an intermediate table or data structure, or the like.

The reverse index 722 may be arranged by erase block or erase region (or other storage division) so that traversing a section of the index allows a groomer to identify valid data in a particular storage division (e.g., erase block 738) and to quantify an amount of valid data, or conversely invalid data, therein. The groomer may select storage divisions for recovery based, in part, on the amount of valid and/or invalid data in each division.

In some embodiments, the storage metadata 135 may further comprise one or more validity bitmaps(s) 741. As depicted in FIG. 7B a validity bitmap may comprise a bitmap datastructure, in which each bit represents a respective media storage location. The state of each bit may indicate whether the corresponding media storage location comprises valid data. The validity bitmap(s) 741 may be stored in respective storage divisions (e.g., in a header of a logical erase block 253) and/or in another media storage location.

Referring back to FIG. 3, in some embodiments, the groomer 370 may be are restricted to operating within certain portions of the media address space. For example, portions of the storage metadata 135 may be periodically persisted to the non-volatile storage medium 322, and the groomer 370 may be limited to operating within media storage locations corresponding to the persisted storage metadata 135. In some embodiments, storage metadata 135 is persisted by relative age (e.g., sequence order), with older portions being persisted, while more current portions are retained in volatile memory. Accordingly, the groomer 370 may be restricted to operating in older portions of the media address space and, as such, are less likely to affect data of an in process atomic storage request. In some embodiments, the groomer 370 may continue to operate while atomic storage operations are implemented. Alternatively, the groomer 370 may access the storage metadata and/or inflight index (discussed below) to prevent interference with atomic storage operations.

As discussed above, the storage controller 124 may be configured to store data on the non-volatile storage media 322 in a contextual, log format. The contents of the non-volatile storage medium 322 may, therefore, comprise an ordered log of storage operations performed on the non-volatile storage medium 322. The sequential ordering of storage operations may be maintained by appending data at an append point within the media address space of the non-volatile storage medium 322. Alternatively, or in addition, sequence information may be maintained through persistent data stored on the non-volatile storage medium 322 (e.g., each storage division may comprise a respective sequence indicator to determine the order of the storage division within the log).

Figure 8:
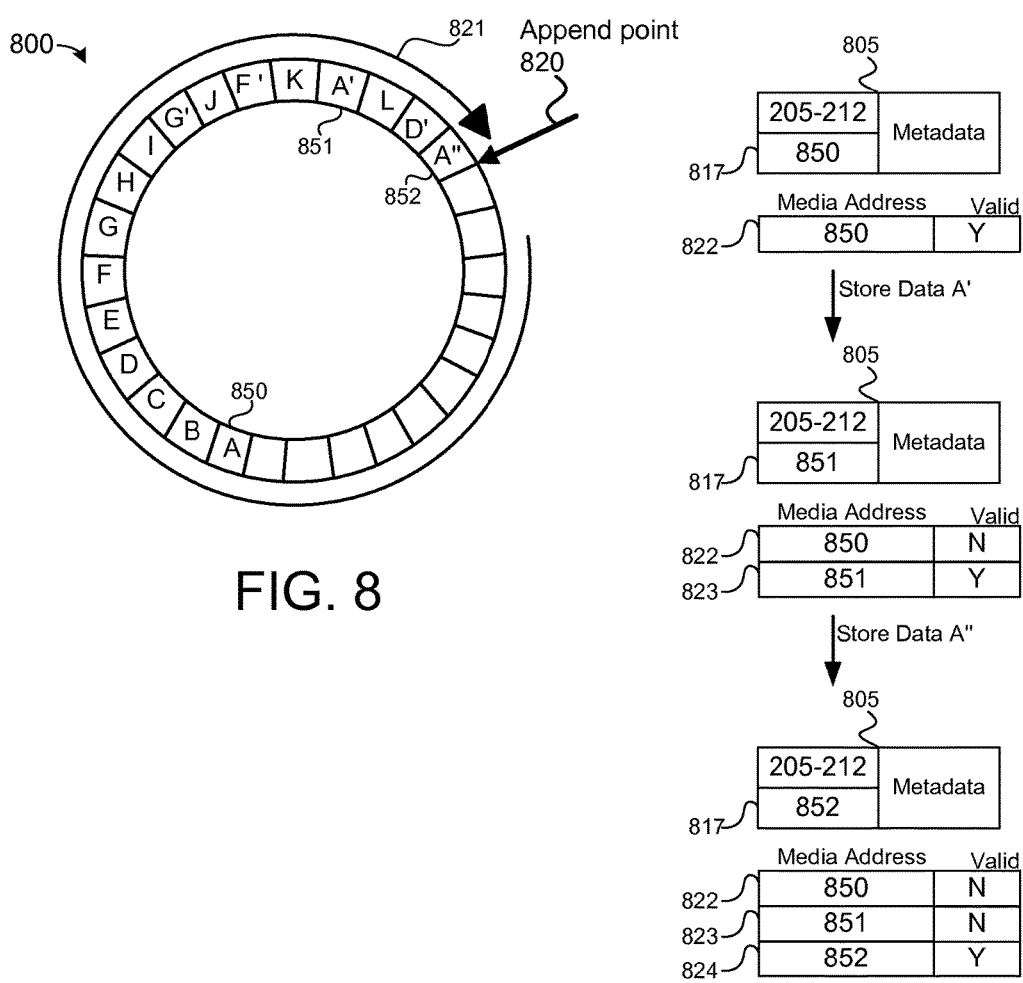
FIG. 8 depicts cyclic, sequential storage operations on a non-volatile storage device.

FIG. 8 depicts a media storage space 800 of a non-volatile storage device. The media storage space 800 is arranged into storage divisions (e.g., erase blocks), each of which can be initialized (e.g., erased) in a single operation. Each storage division comprises a plurality of media storage locations (e.g., pages or logical pages) capable of storing data.

Each media storage location may be assigned a respective media address ranging from zero (0) to N. Data is stored sequentially at an append point 820. The append point 820 moves sequentially through the media storage space 800. After storing data at the append point 820, the append point advances sequentially to the next available media storage location. As used herein, an available media storage location refers to a media storage location that has been initialized and is ready to store data (e.g., has been erased). Some non-volatile storage media can only be programmed once after erasure. Accordingly, as used herein, an available media storage location may refer to a storage location that is in an initialized (or erased) state. If the next storage division in the sequence is unavailable (e.g., comprises valid data, has not been erased or initialized, is out of service, etc.), the append point 820 selects the next available media storage location. In the FIG. 8 example, after storing data on the media storage location 816, the append point 820 may skip the unavailable storage division 813, and continue at the next available location (e.g., media storage location 817 of storage division 814).

After storing data on the "last" media storage location, the append point 820 wraps back to the "first storage division" (or the next available storage division. Accordingly, the append point 820 may treat the media address space as a loop or cycle. As depicted in FIG. 8, the append point 820 sequentially cycles through media storage locations; data stored at the append point 820 may be associated with (e.g., assigned to) any logical identifier. As such, the storage controller 124 may implement a "write anywhere" storage paradigm. Storing data sequentially at the append point 820 (with the any-to-any mappings) may provide performance benefits; rather than searching for a particular media storage location to be used with a particular LID (and/or initializing the particular media storage location), data may be stored at available media storage locations at the append point 820. Accordingly, data may be stored without first searching for and/or initializing particular storage locations. Moreover, sequential storage at the append point 820 may prevent write amplification and other issues related to write-once, asymmetric storage media (e.g., storage media having different latency times for read, program, and/or erase operations).

Referring back to FIG. 8, the letters A-L represent data stored on media storage locations of a non-volatile storage device. Data A is initially stored at a media storage location 850. When the data A is persisted at location 850, the media storage location reference 817 of the corresponding forward index entry 805 is updated to reference the media storage location 850. In addition, a reverse index entry 822 (and/or validity bitmap, not shown) may be updated to indicate that the media storage location 850 comprises valid data and/or to associate the media storage location 850 with logical identifiers 205-212 (not shown). (For clarity, other portions of the forward index and/or reverse index are omitted from FIG. 8.)

When the data A is modified and/or overwritten, the updated data may not be stored in the original media storage location 850. Instead, the updated data A' is stored sequentially (out-of-place) at storage location 851 (at the current position of the append point 820). The storage metadata is updated accordingly. The forward index entry 805 is updated to associate the logical identifiers 205-212 with the media storage location 851 comprising A'. The entry 822 of the reverse index is updated to mark media storage location 850 as invalid and to indicate that the media storage location 851 comprises valid data. Alternatively, or in addition, the media storage location 850 may be marked invalid in one or more validity bitmaps (not shown). Marking the media storage location 850 as invalid may allow the storage location 850 to be reclaimed in a grooming operation, as described above.

The data A' is further modified and/or overwritten with data A". The updated data A" is stored at the current append point 820 (media storage location 852). The storage metadata is updated, as described above: the forward index entry 805 is updated to associate the entry with the media storage location 852, and a reverse index entry 824 is updated to indicate that the media storage address 852 comprises valid data (and that the media address 851 comprises invalid data); similar updates may be made to a validity bitmap.

The "obsolete" versions A and A' may be retained on the non-volatile storage device until the corresponding media storage locations 850 and/or 851 are reclaimed (e.g., erased) in a grooming operation.

The data A, A', and A" may be stored in a contextual, log format (stored with persistent, self-descriptive metadata), from the storage metadata 135 may be reconstructed. Persistent metadata stored with data A, A', and/or A" may indicate that the data stored at the media storage locations 850, 851, and 852 corresponds to logical identifiers 205-212. A sequence indicator of the data A, A', and/or A" (and/or the position of the append point 820) indicates that the media storage location 852 comprises the current, valid copy of the data. Therefore, the forward index entry 805 may be reconstructed to associate the logical identifiers 205-212 with the media storage location 852. In addition, the reverse index entries 822, 823, and/or 824 may be reconstructed to indicate that the media storage locations 850 and 851 comprise invalid data, and that the media storage location 852 comprises valid data.

The contextual, log format disclosed herein may be leveraged to implement efficient atomic storage operations (without the need for a separate atomic storage layer and/or "copy on write" operations). Consistency of the storage metadata 135 may be maintained by deferring updates until the one or more storage operations comprising the atomic storage operation are complete. Metadata pertaining to storage operations that are "in process" (e.g., ongoing operations that are not yet complete) may be maintained in separate "inflight" metadata, described below. Accordingly, in certain embodiments, the state of the storage metadata 135 is maintained until the atomic storage operation successfully completes, obviating the need for extensive post-failure "roll back" operations.

Referring back to FIG. 3, the write-anywhere log format implemented by the storage controller 124 persists a log of storage operations on the non-volatile storage media 322. The storage media 322 may retain multiple copies of data (e.g., previous versions of the data) on the non-volatile storage media 322 until the data is marked as invalid and/or the data is erased in a grooming operation.

As discussed above, the storage metadata 135 may be reconstructed from the contents of the non-volatile storage media 322. During reconstruction, data pertaining to failed atomic storage requests may be identified (and discarded) based upon persistent metadata associated with the data, as depicted in FIG. 8.

In some embodiments, storage controller 124 is configured to preserve the state of the storage metadata 135 while an atomic storage operation is in process by deferring updates to the storage metadata 135 until the atomic storage operation is complete. Metadata pertaining to an atomic storage operation that is in progress may be maintained in a separate index (inflight index). In some embodiments, a first persistent metadata flag identifies data pertaining to the atomic storage request, and a first persistent metadata flag in a second state indicates completion of the atomic storage request. Metadata pertaining to in-process atomic storage operations may be maintained in an inflight index, which may be separate from other storage metadata. The inflight index may be accessed to identify read and/or write hazards pertaining to the atomic storage operation.

Figure 9A:
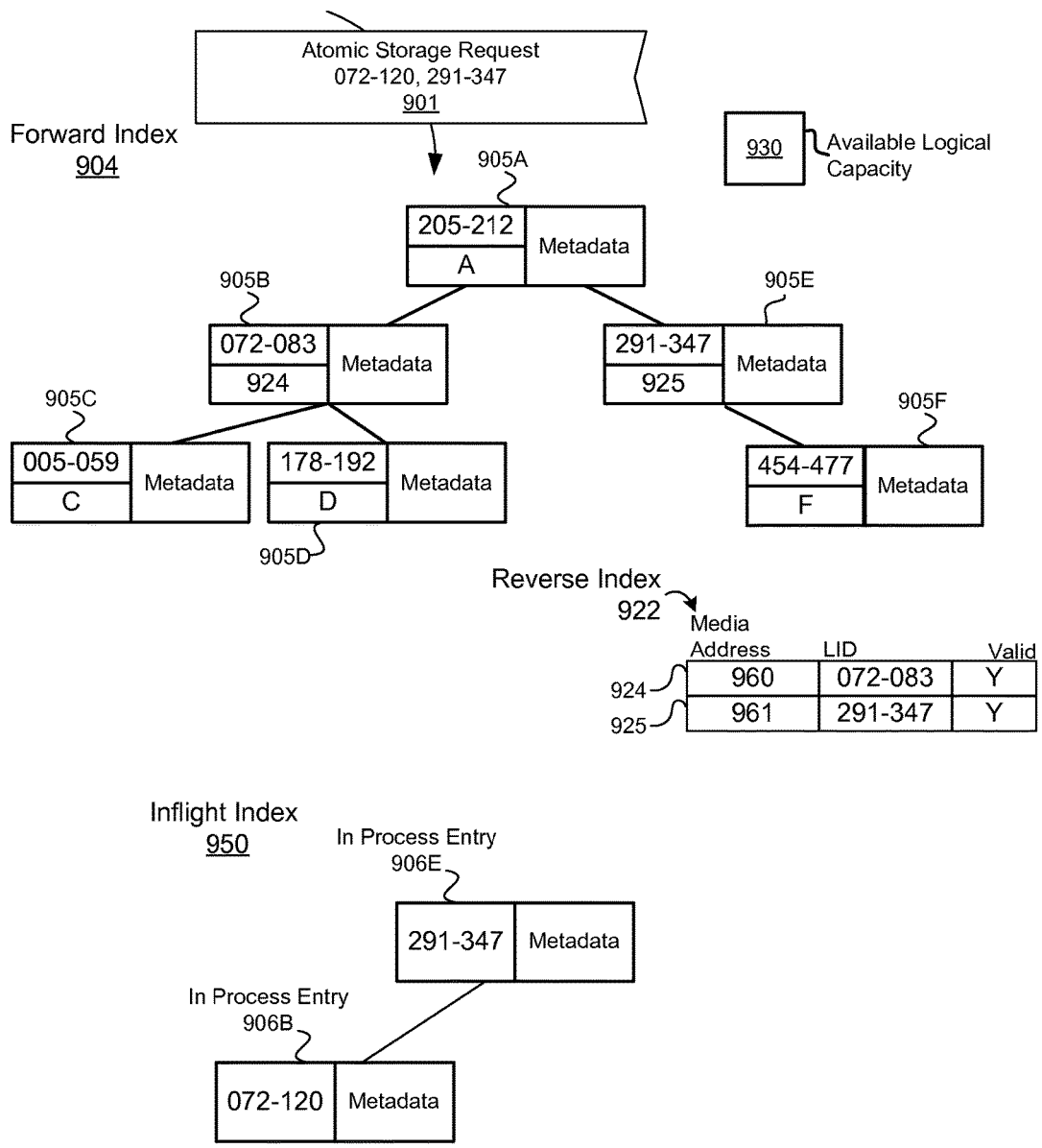
FIGS. 9A-E depict one embodiment of storage metadata comprising a separate inflight index for atomic storage operations.

FIG. 9A depicts one example of storage metadata 135 that comprises a forward index 904 and a separate, inflight index 950. Like the forward index 604 described above, the index 904 may comprise a range-encoded B-tree of mappings between logical identifiers and media storage locations. The index 904 may comprise a plurality of entries (e.g., entries 905A-F) to associate logical identifiers with corresponding media storage locations. The forward index 904 may also track the available logical capacity 930 of the logical address space and/or may include an unallocated index (not shown) to track unallocated portions of the logical address space.

Figure 9B:
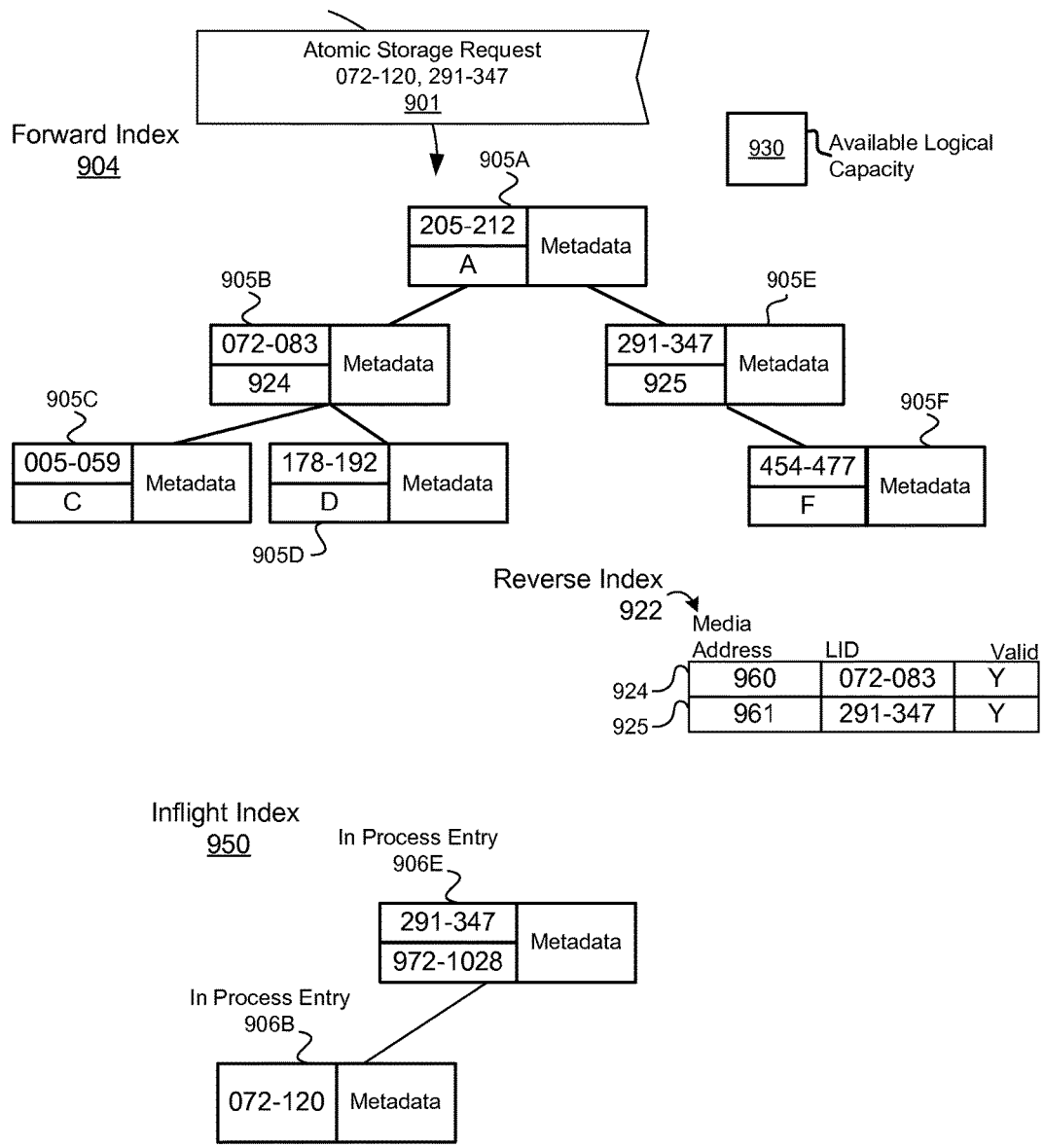
Figure 9C:
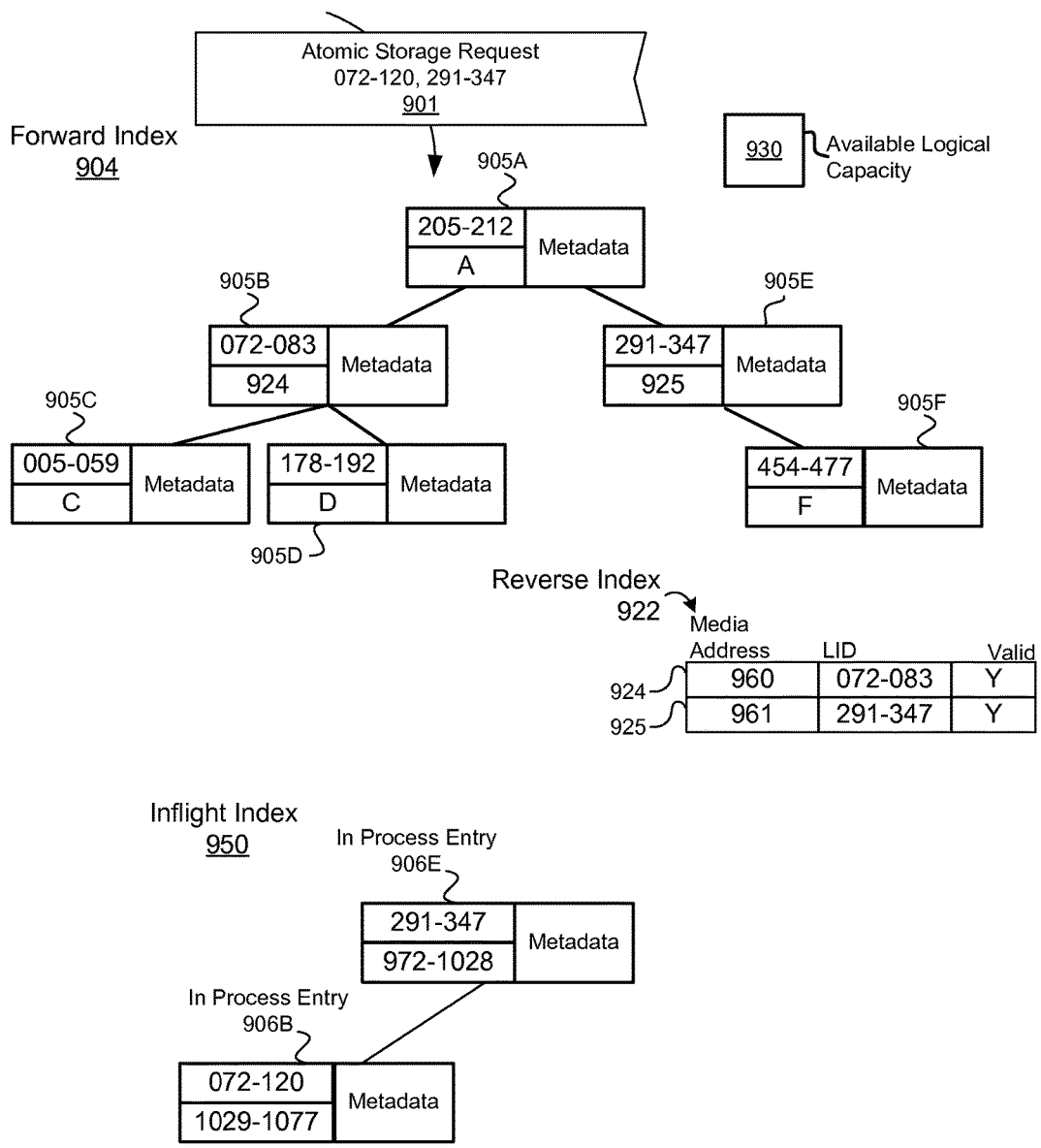

An atomic storage request 901 may comprise a request to store data atomically in association with one or more noncontiguous, contiguous, or combination of contiguous and noncontiguous logical identifiers. In the FIG. 9A example, the atomic storage request 901 comprises atomically storing to two noncontiguous logical identifier ranges (072-120 and 291-347), portions of which overwrite existing data in the forward index 904. The existing data is referenced by entries 905B and 905E of the forward index 904. The entries 905B and 905E may comprise references to media storage locations of the data and/or may reference the media storage locations 960 and 961 of the data using the entries 924 and 925 of a reverse index 922 (for clarity, only a portion of the reverse index 922 and reverse index entries are depicted). As illustrated in FIG. 9A, the atomic storage request expands the logical identifier range of 072-083 to 072-120. Servicing the atomic storage request may, therefore, comprise allocating additional logical identifiers in the logical address space. The new logical identifiers may be allocated in the forward index 904 (in an unassigned entry (not shown)), or, as depicted in FIGS. 9A-9C in the inflight datastructure 950.

As discussed above, the storage metadata 135 may be updated as data is stored on the non-volatile storage media 322. The updating may comprise updating one or more entries in the forward index 904 to assign logical identifiers to updated media storage locations. The updating may further comprise updating the reverse index 922 and/or validity bitmaps (not shown) to invalidate previous versions of overwritten/modified data and to track the media storage locations of the updated data. This updating changes the state of the storage metadata 135, which may make it difficult to "roll back" a failed atomic storage operation. Moreover, the updates may cause previous versions of the data to be erased by the groomer module 370, or other process, such as cache manager or the like. In some embodiments, these issues may be avoided or mitigated by prohibiting the groomer 370 from accessing certain portions of the non-volatile storage media 322, such as a logical erase block in which the final packet of an atomic write operation is situated, since removal of the previous version of data overwritten by a data of an atomic storage request may make it difficult or impossible to roll back the atomic storage request in the event of a failure.

Use of the inflight index/datastructure 950 may provide additional advantages over tracking in-process storage operations using the forward index 904 alone. For example, as a storage request is performed, the inflight datastructure 950 may be updated via an "exclusive" or "locked" operation. If these updates were performed in the forward index 904 (or other shared metadata), the lock may preclude other storage requests from being completed. Isolating these updates in a separate datastructure may "free up" the storage metadata 135 to service other, potentially concurrent, requests. In addition, the inflight index 950 may track in-process operations that may be rolled back in the event of failure (e.g., atomic storage operations). Furthermore, isolating the in-process metadata within the inflight index 950 allows other metadata, such as the forward index 904, to be maintained in a consistent state (until the storage request is fully complete), and may allow for more efficient rollback of failed and/or incomplete storage requests.

In some embodiments, the state of the storage metadata 135 is preserved until completion of an atomic storage request. The progress of an atomic storage request (e.g., request 901) may be tracked in a separate datastructure, such as an inflight index 950. Modifications to the inflight index 950 may be applied to the storage metadata 135 (forward index 904 and/or reverse index 922) upon completion of the atomic storage request (and/or upon reaching a point after which the atomic storage operation is guaranteed to complete).

The inflight index 950 depicted in FIG. 9A may comprise a separate datastructure from the forward index 904. The disclosure is not limited in this regard, however; in other embodiments, the inflight index 950 may be implemented within the forward index 904 (using special-purpose entries in the index 904), as metadata entries of the forward index entries, or the like.

The inflight index 950 may comprise any suitable datastructure (e.g., tree, B-tree, radix tree, map, etc.). In the FIG. 9A example, the inflight index 950 is implemented using a range encoded tree. The entries 906 in the inflight index 950 may be indexed by logical identifier, as described above.

Entries 906B and 906E are added to the inflight index 950 in response to the atomic storage request 901. The entries 906B and 906E identify logical identifiers pertaining to the atomic storage operation. As illustrated in FIG. 9A, the atomic storage request 901 comprises two noncontiguous logical identifier ranges. The inflight index 950 comprises respective entries 906B and 906E for each logical identifier range. The disclosure is not limited in this regard, however, and could be adapted to generate entries for each logical identifier, for sub-ranges of logical identifiers in the request, and so on.

The inflight index 950 is updated in response to completion of one or more portions of the atomic storage request 901. FIG. 9B depicts the inflight index 950 after storing a first portion of the data of the atomic storage request 901. The entry 906E indicates that the data corresponding to logical identifiers 291-347 has been successfully stored at media storage locations 972-1028. Alternatively, or in addition, the media storage locations may be referenced using a secondary datastructure, such as a separate reverse index or the like. The forward index 904 and reverse index 922 remain unchanged.

The inflight index 950 is further updated in response to completion of other portions of the atomic storage request 901. FIG. 9C depicts the inflight index 950 as the atomic storage request is completed. The inflight index entry 906B is updated to assign media storage locations to the logical identifiers 072-083. The forward index 904 and/or reverse index 922 remain unchanged.

The storage metadata 135 may be updated in response to detecting completion of the atomic storage request 901 and/or determining that the atomic storage request 901 will successfully complete (e.g., data of the atomic storage request has been received at a write data pipeline or write buffer of the non-volatile storage device 402).

Figure 9D:
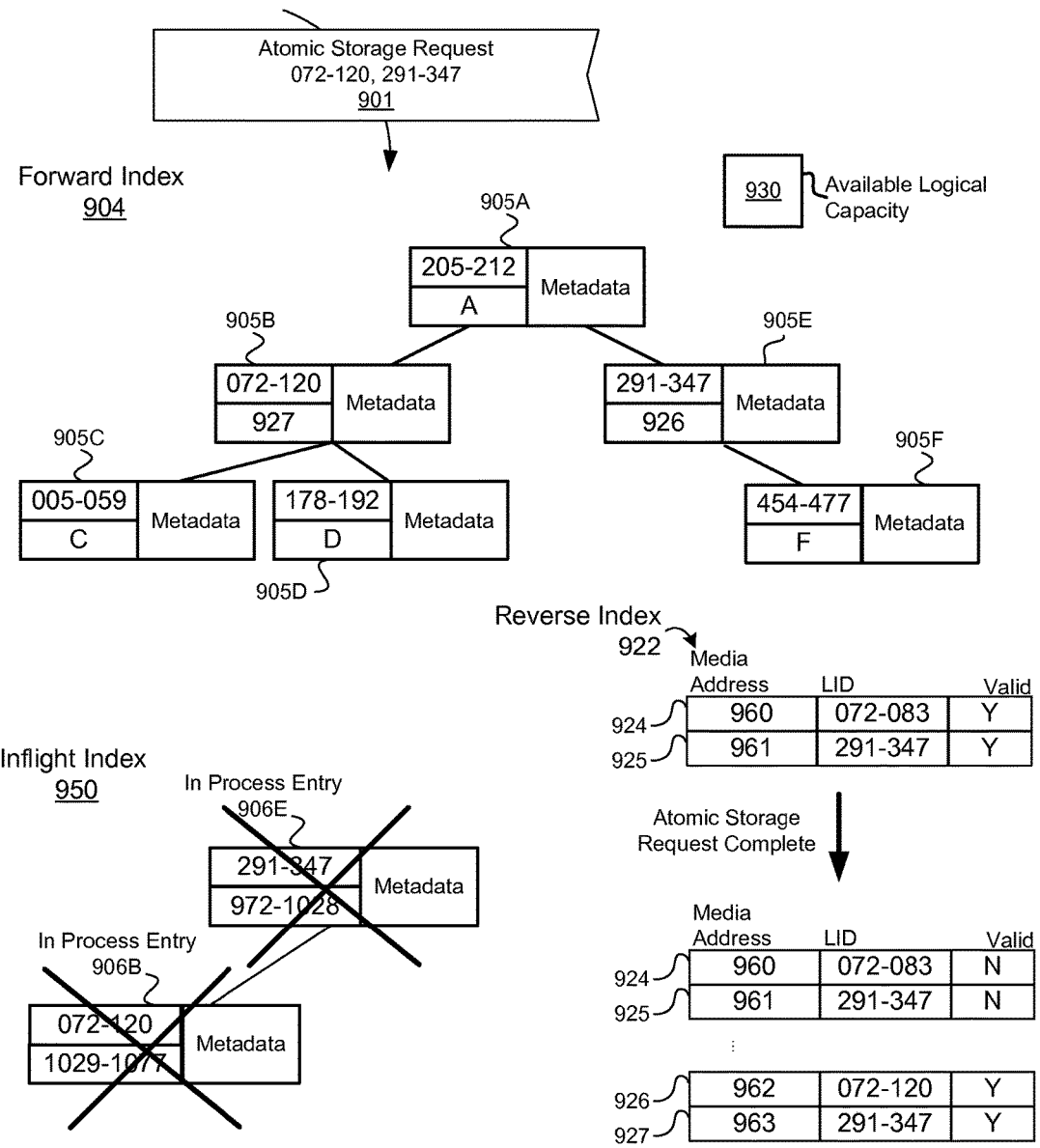

FIG. 9D depicts updated storage metadata 135 following completion of the atomic storage request 901. As shown in FIG. 9D, the entries 906B and 906E may be removed from the inflight index 950. In addition, the reverse index 922 may be updated to invalidate data overwritten and/or modified by the atomic storage request (e.g., invalidate entries 924 and 925) and to add entries 926 and 927 representing storage locations of the updated data. The entries 905B and 905E of the forward index 904 are updated to assign the logical identifiers of the atomic storage request 901 to the updated media storage locations 926 and 927. The updating may further comprise expanding the entry 905B from a logical identifier range of 072-83 to 072-120. The forward index 904 and/or portions thereof may be locked during the updating. The lock may prevent potential read/write hazards due to concurrent storage requests.

Figure 9E:
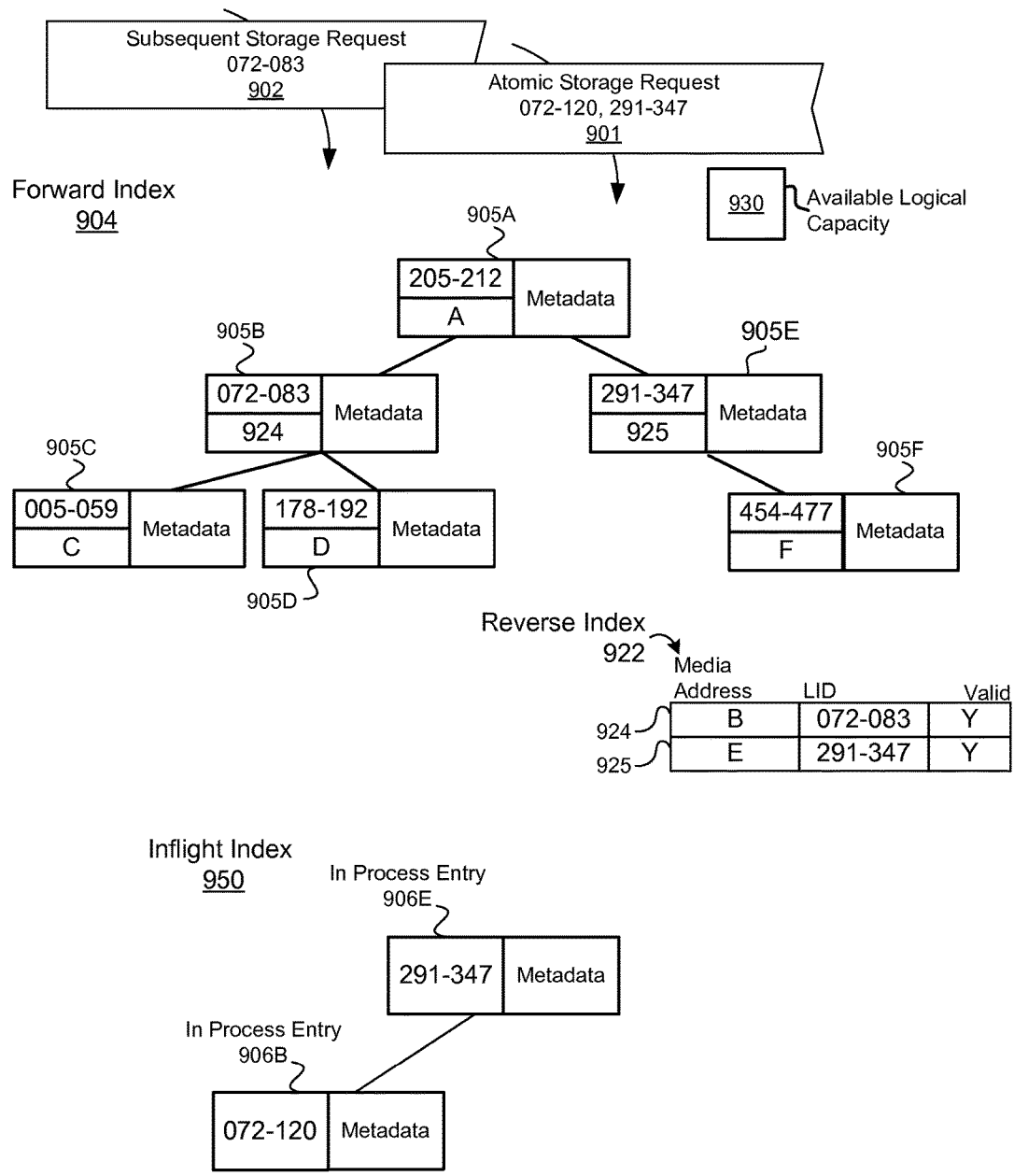

In some embodiments, the inflight index 950 is used to avoid write and/or read hazards. As shown in FIG. 9E, a storage request 902 pertaining to a logical identifier of an atomic storage request may be received after or concurrent with the atomic storage request 901, but before completion of the atomic storage request 901. For example, the storage request may pertain to logical identifiers 072-083 that are to be overwritten by the atomic storage request 901. If the request 902 is to read data of 072-083, the request may pose a read hazard (e.g., read before write), since reading the media storage location 924 of the entry 905B will return obsolete data. The read hazard may be identified in the inflight index 950, which indicates that the target of the request 902 is in the process of being modified. The request 902 may be delayed until completion or failure of the atomic storage request 901 (and removal of the in-process entry 906B from the inflight index 950). A write hazard may be detected and addressed similarly.

The inflight index 950 may also be used to prevent a subsequent storage request from writing data to the logical identifiers of the atomic storage request. For example, the entry 906B of the inflight index 950 may be accessed to prevent another storage client from allocating logical identifiers 072-120.

Figure 10:
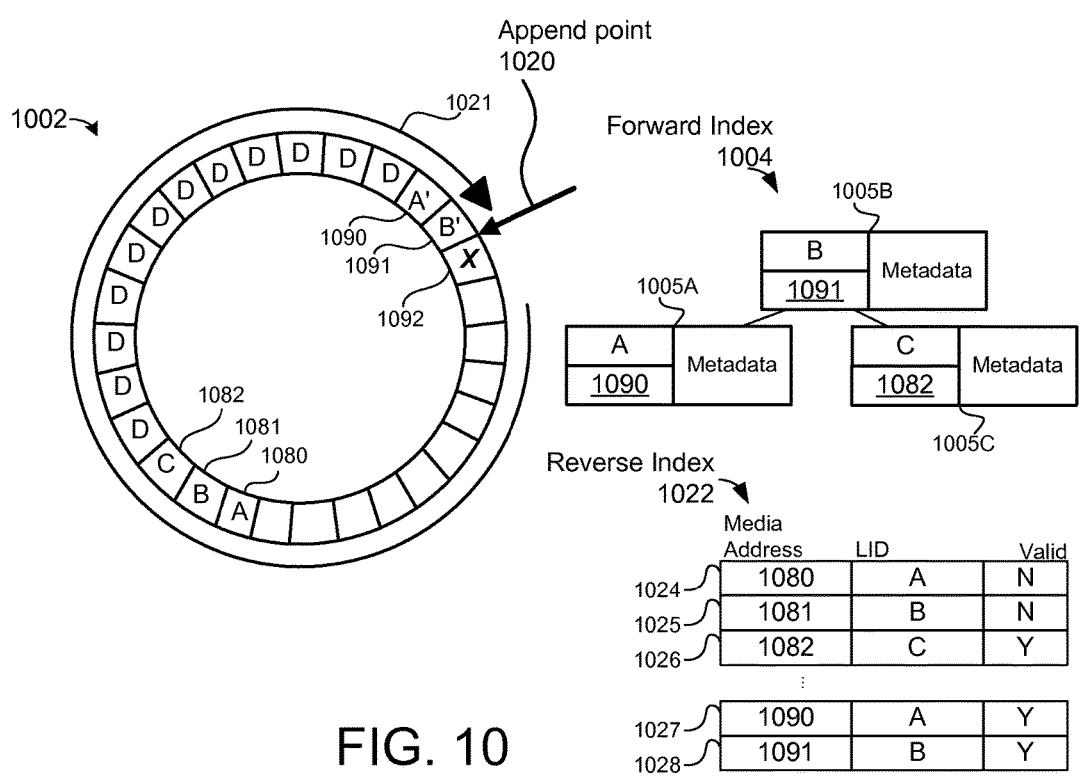
FIG. 10 depicts an incomplete atomic storage operation.

Partially completed atomic storage operations should be identifiable during reconstruction. Otherwise, data pertaining to a failed atomic storage operation may appear to be the most up-to-date version of data. This potential issue is illustrated in FIG. 10. Data A, B, C are stored on media storage locations 1080, 1081, and 1082 respectively. Other data D is subsequently stored within the media storage space of a non-volatile storage device 1002. The data A, B, and C is modified (overwritten) in a subsequent atomic storage operation. The atomic storage operation stores a portion of the atomic storage operation, the updated data A', at media storage location 1090 and updated B' at 1091, but an invalid shutdown occurs (with the append point 1020 at media storage location 1092) before the atomic storage operation is complete (before writing C' at media storage location 1092). The failure may require the storage metadata 135 (e.g., forward index and/or reverse index through power loss or data corruption) to be reconstructed.

As discussed above, the forward index 604 may be reconstructed from the "event log" of sequential log-based data on the non-volatile storage device. The event log is accessed from the last known append point 1020, which corresponds to the most recent operations in the log. In some embodiments, the append point 1020 location is periodically stored on a non-volatile storage device. Alternatively, or in addition, the append point 1020 may be determined using sequence indicators associated with storage divisions (e.g., erase blocks) of the non-volatile storage device. The metadata is reconstructed by traversing the event log in a predetermined order (e.g., from storage operation performed furthest in the past to the most recent storage operations (tail to head) or from the most recent storage operations to older storage operations (head to tail)). Based upon the log, the data A' at 1090 and B' 1091 of the failed atomic storage request appear to comprise the most up-to-date versions of data A and B (rendering obsolete the previous version(s) of A at 1080, and B at 1081). However, the atomic storage request should have been rolled back to preserve the original data A, B, and C. If the failed atomic storage request is not identified and reconciled, the reconstruction module 376 may inadvertently associate entries 1005A and 1005B in the forward index 1004 with data of the failed atomic storage operation (e.g. media storage locations 1090 and/or 1091).

Moreover, the reconstruction module 376 may update the entries 1024 and 1025 of the reverse index 1022 (and/or validity bitmap, not shown) to indicate that the data at 1080 and/or 1081 is obsolete (invalid); the entries 1027 and 1028 may erroneously indicate that the data of the failed atomic storage operation comprises valid data for A and B.

In some embodiments, persistent indicators stored on the non-volatile medium 322 are used to track in-process storage requests on the non-volatile storage device and/or to account for loss of storage metadata 135. As discussed above, a persistent indicator refers to an indicator that is stored (persisted) on the non-volatile medium 322 with the data to which the indicator pertains. In some embodiments, the persistent indicators are persisted with the data (e.g., as persistent metadata 364, such as persistent metadata flags 367), persistent notes, or the like. The persistent indicators are preferably stored with the data in a single storage operation and/or in the smallest write unit supported by the non-volatile storage medium 322. Accordingly, persistent indicators will be available when the storage metadata 135 is reconstructed from the contents of the non-volatile storage medium 122. The persistent indicators may identify incomplete and/or failed atomic storage requests despite an invalid shutdown and/or loss of storage metadata 135.

Referring back to FIG. 4, in some embodiments, the persistent metadata 364 of the contextual packet format 360 is leveraged to track atomic storage operations and/or identify failed atomic storage operations. The persistent metadata flag(s) 367 may identify data packets 360 that pertain to an atomic storage request and/or indicate completion of an atomic storage request (a persistent completion indicator). The persistent metadata flag(s) 367 may be stored with the data segment 362 in a single storage operation (e.g., single program operation, write buffer programming operation, or the like).

Figure 11A:
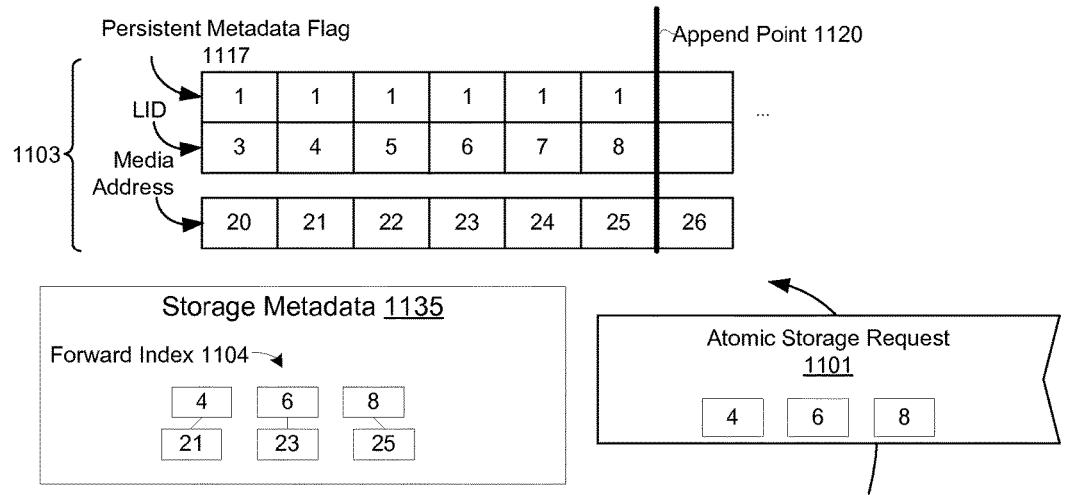
FIGS. 11A-C depict one embodiment of persistent metadata flags for atomic storage operations.
Figure 11B:
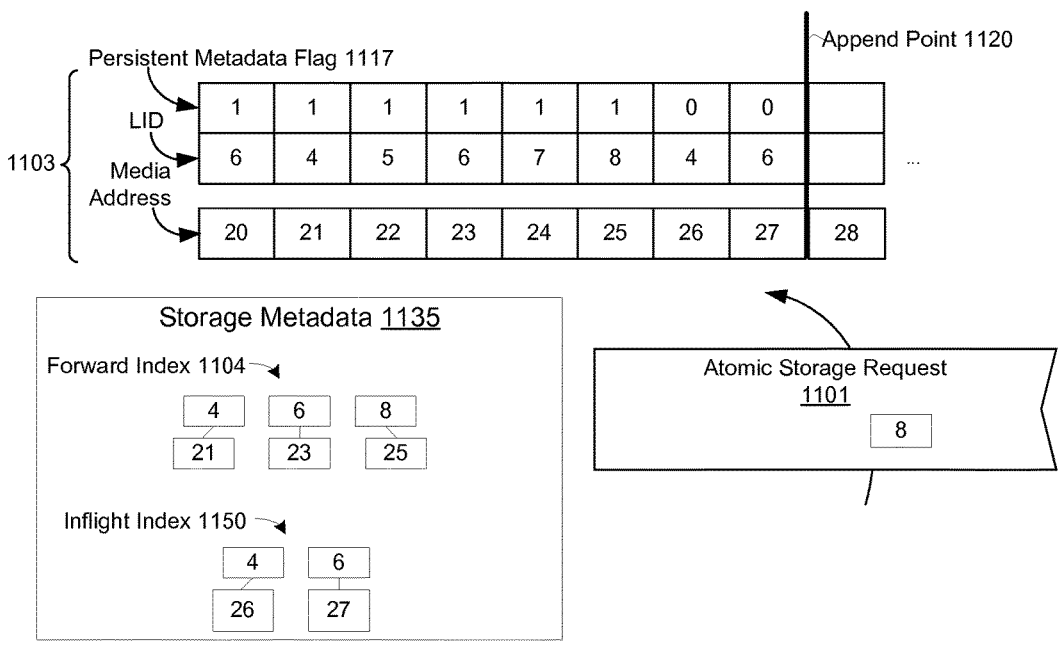
Figure 11C:
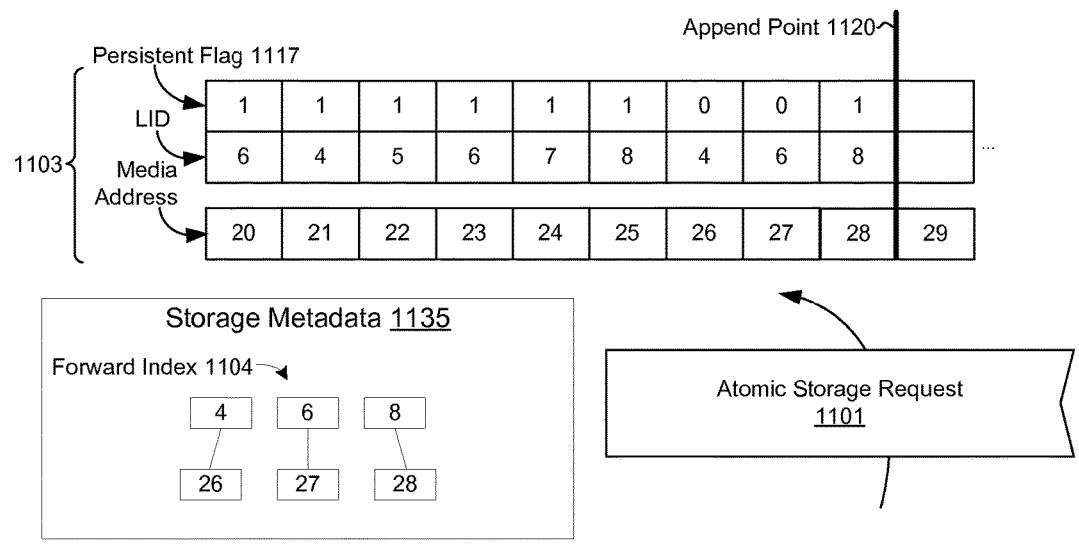

In some embodiments, data pertaining to an atomic storage operation is stored with a persistent metadata flag 367 in a first state (e.g., a single bit "1"). Data that does not pertain to an atomic storage operation, or data at the completion, "endpoint" of the atomic storage operation is stored with a persistent metadata flag 367 in a second state (e.g., a single bit "0"). FIGS. 11A-C illustrate the progression of persistent metadata flags in an exemplary atomic storage operation.

In FIG. 11A, the event log (sequential log-based data) 1103 comprises data pertaining to logical identifiers 3-8 stored on respective media storage locations 20-25. The append point 1120 is prepared to store data at the next, sequential media storage location 26. A forward index 1104 associates logical identifiers 4, 6, and 8 with respective media storage locations as described above. The forward index 1104 may include other entries, not shown here for clarity.

An atomic storage request 1101 is received to store data in association with a noncontiguous set of logical identifiers (LIDs 4, 6, and 8). In some embodiments, an atomic storage request 1101 is formed by aggregating one or more sub-requests. The sub-requests may be combined into a single atomic storage request that is implemented as a whole.

In some embodiments, data of the atomic storage request 1101 is stored contiguously in the event log 1103, such that data that does not pertain to the atomic storage request 1101 is not interleaved with data of the atomic storage request. The logical identifiers of the atomic storage request 1101, however, may be noncontiguous, out of order, or the like. Accordingly, while data of the atomic storage request 1101 is being stored on event log 1103, other data that does not pertain to the request 1101, such as garbage collection bypass data, grooming data (e.g., data refresh), other data requests, and the like, may be suspended. In one embodiment, suspension is not required if write requests, including grooming, are processed utilizing the ordered queue 433.

FIG. 11B depicts the state of the storage metadata 1135, inflight index 1150, and event log 1103 while the atomic storage request 1101 is in process. In FIG. 11B, data of logical identifiers 4 and 6 have been stored on the event log 1103 (e.g., programmed to a media storage location, streamed to a program buffer, or the like). The inflight index 1150 tracks the progress of the atomic storage request (e.g., assigns the logical identifiers 4 and 6 to the media storage locations 26 and 27 comprising data of the atomic storage request 1101).

The persistent metadata flag 1117 stored with the data on media storage locations 26 and 27 indicates that the media storage locations 26 and 27 comprise data pertaining to an incomplete atomic storage operation because the first encountered persistent metadata flag 1117 is a "0" rather than a "1," reading in reverse sequence order (reading to the left from the append point 1120, as illustrated in FIG. 11B). If the first persistent metadata flag 1117 preceding the append point 1120 is set to a "1" (as shown in FIG. 11C), this indicates that the atomic storage operation was successfully completed. The persistent metadata flag 1117 may be stored with the data on the media storage locations 26 and 27.

If a failure were to occur, the persistent metadata flags 1117 are used, together with the contiguous placement of data for the atomic storage request 1101, to identify data pertaining to the failed atomic storage request 1101. As discussed above in conjunction with FIG. 10, storage metadata 135 is reconstructed from the log of contextual data on the non-volatile storage medium 322. In response to detecting the invalid shutdown, a recovery module 372 may be configured to scan the log 1103 of FIG. 11B in a reverse log order (e.g., right to left as shown in FIG. 11B or, in other words, from the tail to the head of the sequence). The invalid data identification module 373 may identify data that is part of a failed atomic storage operation based upon the first persistent metadata flag 1117 (with no corresponding completion indicator). The invalid data identification module 373 may continue identifying the invalid data until a "1" flag is encountered at media storage location 25. After scanning data of a completed atomic storage operation and/or data of a non-atomic storage operation, the invalid data identification module 373 may determine that no more unidentified data of failed atomic storage operations exists on the non-volatile storage medium 322. This determination may be based upon the log format implemented by the storage controller 124; since data is stored in a log sequence, any data proceeding a successful atomic storage operation (or non-atomic operation) will have been completed before the invalid shutdown (or detected in a previous restart recovery operation). The first scan may, therefore, scan only a relatively small portion of media address space of the non-volatile storage media 322.

The note storage module 374 may be configured to store a physical trim note on the non-volatile storage media (e.g., at media storage location 28) to identify the data of the failed atomic storage operation; the physical trim note may comprise the media address of locations 26 and 27. The data invalidation module 375 may invalidate the data, and the reconstruction module 376 may reconstruct the storage metadata 135, as described above. Storing the physical trim note before the second scan and/or before reconstructing the storage metadata 135 may help ensure that the restart recovery process is crash safe; an invalid shutdown during the second scan will not result in any loss of storage metadata and/or will not cause invalid data to be misidentified as valid data (due to storage of the physical trim note).

The approach to identifying data of a failed atomic storage operation described above relies on data of the atomic storage request 1101 being stored contiguously within the media address space (e.g., within the log 1103). If data comprising a "1" persistent metadata flag 1117 were interleaved with the atomic storage data (before completion of the atomic storage request 1101), the data at 26 and/or 27 could be misidentified as being valid (e.g., pertaining to a complete atomic storage request 1101).

FIG. 11C illustrates completion of the atomic storage request 1101. The final storage operation of the atomic storage request 1101 comprises a "1" persistent metadata flag 1117 indicating that the atomic storage request 1101 is complete. The forward index 1104 is updated to assign the logical identifiers 4, 6, and 8 with updated media storage locations 26, 27, and 28. The inflight index is updated (the entries representing logical identifiers 4, 6, and 8 are removed) to indicate that the atomic storage request 1101 is no longer in process (e.g., is complete).

If an invalid shutdown were to occur subsequent to persisting the data at media storage location 28, the storage metadata 1135 could be correctly reconstructed. When traversing the event log 1103 in reverse sequence (e.g., moving left from the append point), the first persistent metadata flag 1117 encountered would be the "1" flag on the media storage location 28, indicating that the data at media storage locations 26 and 27 pertain to a successfully completed atomic storage operation.

In some embodiments, the data of such an atomic storage operation may be limited by storage boundaries of the non-volatile storage device (e.g., page boundaries, logical page boundaries, storage divisions, erase blocks, logical erase blocks, etc.). Alternatively, the size of the data for an atomic storage operation may require that the atomic storage request wait until the append point is on a storage division with sufficient free space to fit the data of the atomic storage operation before reaching a logical erase block boundary. Accordingly, the size of an atomic storage operation may be limited to a logical page size. Additionally, in some embodiments, atomic storage operations do not cross logical erase block boundaries.

In another example, the persistent metadata flag 1117 may comprise an identifier, which may allow data to be interleaved with data of atomic storage requests and/or allow atomic storage requests to be serviced concurrently.

Figure 12:
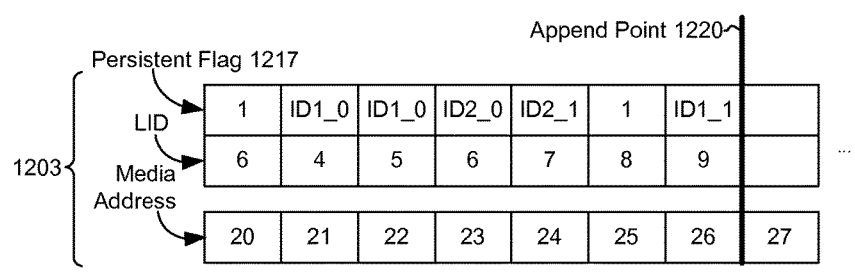
FIG. 12 depicts another embodiment of persistent metadata flags for atomic storage operations.

FIG. 12 depicts one example of an event log 1203 comprising persistent metadata flags 1217. The event log 1203 comprises data pertaining to two atomic storage operations having respective identifiers ID1 and ID2. ID1 corresponds to an atomic storage operation pertaining to logical identifiers 4, 5, and 9 and ID2 corresponds to an atomic storage operation pertaining to logical identifiers 6 and 7.

The ID1_0 persistent metadata flag 1217 on media storage locations 21 and 22 identifies data pertaining to the atomic storage operation ID1 that has not yet been completed. The persistent metadata flag 1217 ID1_1 on the media storage location 26 indicates successful completion of the atomic storage operation ID1. Another persistent metadata flag 1217 ID2_0 identifies data pertaining to a different, interleaved atomic storage operation. The persistent metadata flag 1217 ID2_1 of media storage location 24 indicates successful completion of the atomic storage operation ID2. Data that does not pertain to an atomic storage operation may comprise a "1" persistent metadata flag 1217 or other, pre-determined identifier. When reconstructing storage metadata 135 from the event log 1203, if an atomic storage operation identifier comprising a "0" flag (e.g., ID1_0) is encountered before (or without) encountering a completion persistent metadata flag 1217 (e.g., ID1_1), all data associated with the persistent metadata flag 1217 ID1 may be invalidated. By contrast, after encountering the ID1_1 flag, all data associated with the ID1 persistent metadata flag 1217 may be identified pertaining to a completed atomic storage operation. Although the extended persistent metadata flags 1217 of FIG. 12 may provide for more robust support for atomic storage operations, they may impose additional overhead.

Figure 13A:
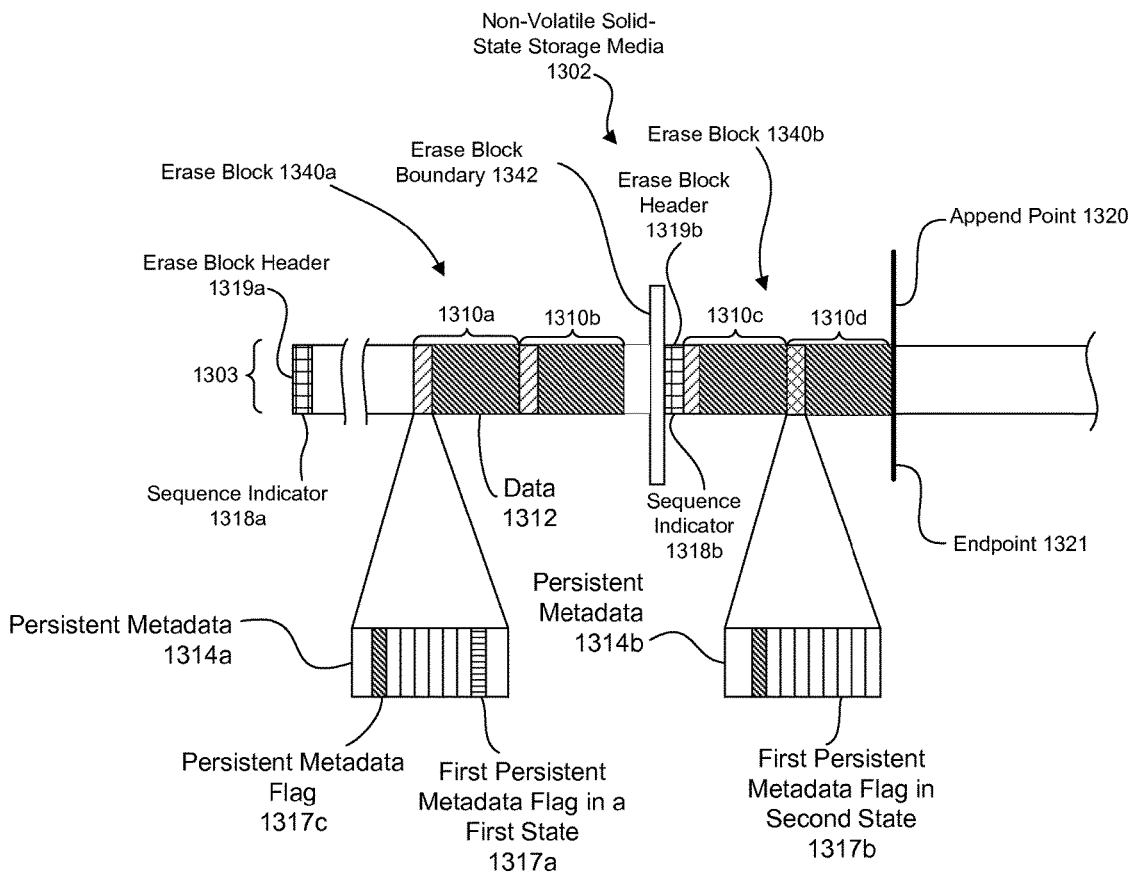
FIG. 13A is a diagram illustrating data saved within multiple erase blocks of a non-volatile solid-state storage media in response to an atomic storage request.

FIG. 13A is a diagram illustrating data saved within multiple logical erase blocks 1340a-b of a non-volatile solid-state storage media 1302 in response to an atomic storage request. It should be noted that in connection with FIGS. 13-15 certain components are marked with the same fill pattern to identify these components throughout these figures, although, for simplicity and clarity, a reference number has not been placed on each such area.

As illustrated in FIG. 13A, two data packets 1310a-b are stored in a first logical erase block 1340a and two different data packets 1310c-d are stored in a second logical erase block 1340b. In the illustrated embodiment, all four of the data packets 1310a-d are stored as a result of a single atomic storage operation. As indicated above, the append point 1320 indicates where additional data may be written to the storage media 1302.

Each logical erase block 1340a-b comprises two or more media erase blocks (e.g., blocks 0 205a-m shown in FIG. 2). A logical erase block boundary 1342 separates each logical erase block 1340a-b. The logical erase block boundary 1342 may comprise a virtual or logical boundary (i.e., a virtual boundary) between each logical erase block 1340a-b.

As illustrated in the embodiment of FIG. 13A, each data packet 1310a-d includes persistent metadata 1314a-b. The data 1312 may comprise user data to be stored on and potentially retrieved from the storage media 1302 in response to requests by, for example, storage clients 116 (shown in FIG. 3). In one embodiment, the persistent metadata 1314a and associated data 1312 are both stored to the storage media 1302 in a single write operation (i.e., as a single unit or collection of data).

In FIG. 13A, the persistent metadata 1314a of a first data packet 1310a is illustrated. The persistent metadata 1314a may comprise persistent metadata including various flags 1317a-c. For example, one or more bits of the persistent metadata 1314a may comprise a data packet flag 1317c that, when set to a particular value, indicates when an associated data packet 1310a-d comprises user data. The position and number of the bits for each data packet flag 1317c within the persistent metadata 1314a may be varied within the scope of the disclosed subject matter. Also, in one embodiment, the data packet flag 1317c may be located in the same position (i.e., the same bit position) within the persistent metadata 1314a-b of each data packet 1310a-d.

The persistent metadata 1314a-b also include either a first persistent metadata flag in a first state 1317a or the first persistent metadata flag in a second state 1317b. The first persistent metadata flag 1317a-b may comprise a single bit within the persistent metadata 1314a-b. For example, the first persistent metadata flag in the first state 1317a may comprise a particular bit position (such as the 56th bit) within the persistent metadata 1314a set to a high value (a "1"), while the first persistent metadata flag in the second state 1317b may comprise the same bit position set to a low value (a "0"). Alternatively, the first persistent metadata flag in the first state 1317*a* may comprise a particular bit position within the persistent metadata 1314*a* set to a low value, while the first persistent metadata flag in the second state 1317*b* may comprise the same bit position to a high value. In one embodiment, the first persistent metadata flag in the first or second state 1317*a-b* may each comprise a pattern of multiple bits or separate and distinct bit positions. Use of a single bit within each packet 1310*a-d*, when data packets 1310*a-d* associated with an atomic storage operation are stored contiguously, provides the advantage that a very small amount of data is used on the storage media 1302 to indicate whether an atomic write operation failed or succeeded.

As illustrated in FIG. 13A, the persistent metadata 1314*a* of the first three data packets 1310*a-c* comprises the first persistent metadata flag in the first state 1317*a*, while the last data packet 1310*d* comprises the first persistent metadata flag in the second state 1317*b*. In one embodiment, each of data packets 1310*a-c*, except the last data packet 1310*d*, stored on the storage media 1302 pursuant to an atomic storage operation comprises the first persistent metadata flag in the first state 1317*a*. As illustrated, the last packet 1310*d* includes the first persistent metadata flag in the second state 1317*b*, which signals the end or completion of data written pursuant to an atomic write request. This embodiment is advantageous in that only one bit within each packet 1310*a-d* is needed to signal whether an atomic storage request was completed successfully. The first persistent metadata flags in the first and second states 1317*a-b* indicate not only that the data 1312 of these packets 1310*a-d* pertain to an atomic storage operation, but also identify a beginning and end, or successful completion, of the data associated with the atomic storage operation.

However, a problem may arise if the third and fourth data packets 1310*c-d* of the second logical erase block 1340*b* are erased. Some background information may be helpful to understand this problem. For example, during a recovery or other process the event log (e.g., the data stored sequentially together with persistent metadata as illustrated in the log 1103 of FIG. 11) may be accessed to reconstruct a logical sequence of logical erase blocks 1340*a-b* (e.g., from head to tail). This may be achieved through a scan of the erase blocks 1340*a-b* and, in particular, through examination and processing of metadata and sequence indictors stored in the erase block headers 1319*a-b* of the log 1303. The logical sequence of erase blocks 1340*a-b* may be formulated before performing recovery following an invalid shutdown or a restart operation (such as a shutdown resulting from an invalid shutdown) using either a forward or reverse sequence scan of the logical erase blocks 1340*a-b* stored on the media 1302. After the logical sequence of erase blocks 1340*a-b* has been formulated, reverse sequence scanning the log 1303 or logical sequence of logical erase blocks 1340*a-b* based on the event log 1303 from the append point 1320 (i.e., the tail) in reverse sequence toward the head or beginning of the log 1303, in certain embodiments, is initiated to identify failed atomic requests. In such a case (if third and fourth data packets 1310*c-d* of the second logical erase block 1340*b* are erased), the reverse sequence scanning from an append point 1320 could erroneously identify the first and second data packets 1310*a-b* as being associated with a failed atomic storage operation because the first encountered packet 1310*b* does not include the first persistent metadata flag in the second state 1317*b*. Accordingly, in one embodiment, grooming or deletion of a logical erase block 1340*b* that includes an endpoint 1321 is prohibited.

As used in this application, an endpoint 1321 may comprise the point immediately after the last packet 1310*d*, which may be stored or identified in a volatile memory. Alternatively, the final or last packet 1310*d* of an atomic write operation may comprise the endpoint.

As an alternative to prohibiting grooming or deletion of a logical erase block 1340*b* that includes an endpoint 1321, an incorrect determination that the first and second data packets 1310*a-b* relate to a failed atomic storage operation is avoided by reference to sequence indicators (such as the sequence indicators 818 illustrated in FIG. 8). As noted above, the sequence indicators 818 identify or specify an ordered sequence of erase blocks 1340*a-b*. In particular, in one embodiment, sequence indicators 1318*a-b* of each erase block header 1319*a-b* comprise monotonically increasing numbers spaced at regular intervals. In view of the foregoing, if a sequence indicator 1318*b* for a next logical erase block 1340*b* in the event log 1303, moving from left to right (from the head to the tail of logical chain of erase blocks, as specified by the event log 1303), is not a next sequence number in the sequence, then, for example, the storage controller 124 recognizes that prior logical erase block 1340*a* does not end with a failed atomic request, i.e., the first and second packets 1310*a-b* do not comprise a part of a failed atomic write.

Figure 14:
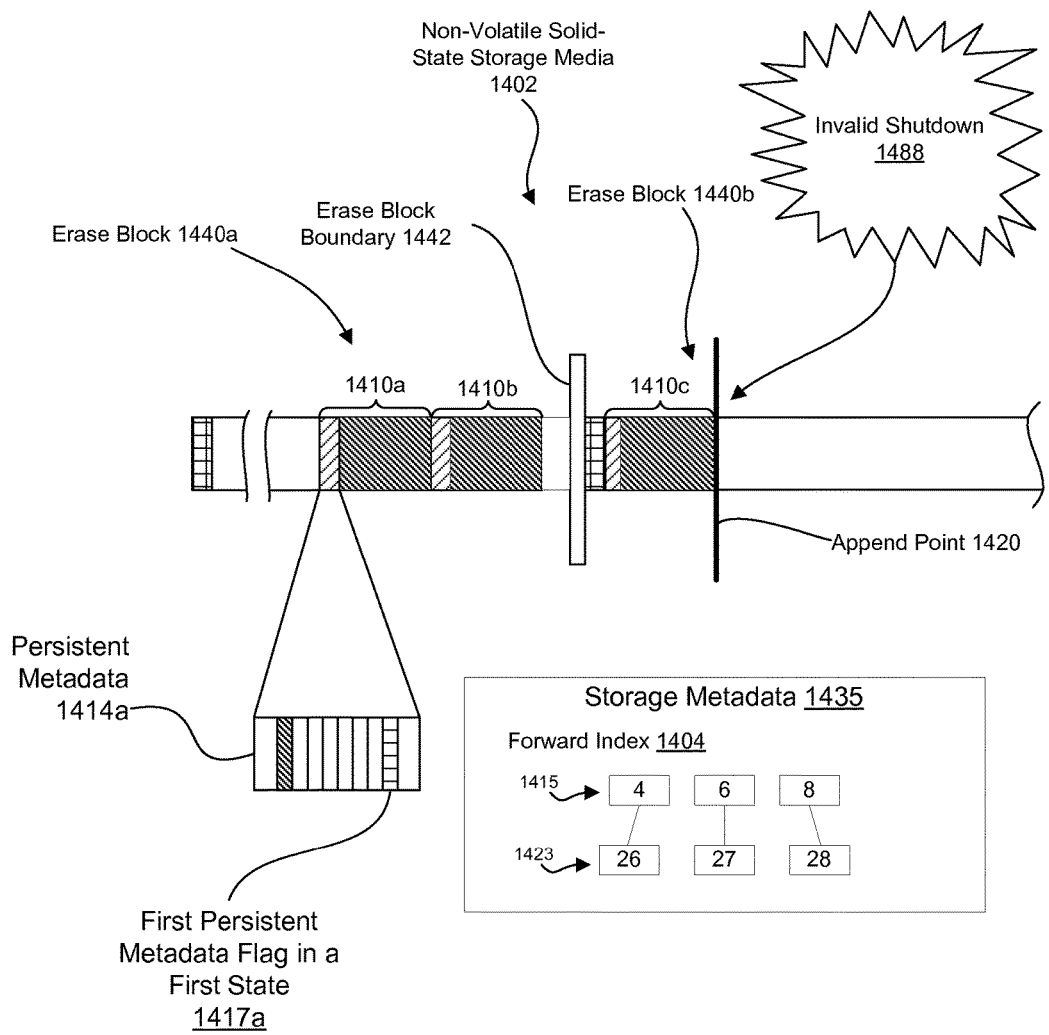
FIG. 14 illustrates a failed atomic write that spans an erase block boundary of a non-volatile storage media.

FIG. 14 illustrates a failed atomic write to a non-volatile solid-state storage media 1402 that spans a logical erase block boundary 1442. As indicated in FIG. 14, the atomic write request, in the illustrated case, failed because of an invalid shutdown 1488. An invalid shutdown 1488 may comprise any event that can cause the loss of data stored within volatile memory of a system, apparatus, or computing device (e.g., a hard reset or other interruption of power). The invalid shutdown 1488 may comprise an invalid shutdown 1488 of a primary power source 406. Alternatively, the atomic write may have failed for other reasons. As shown in FIG. 14, the first and second data packets 1410*a-b* may be stored in the first logical erase block 1440*a* and a third data packet 1410*c* may be stored in a second logical erase block 1440*b*. Each of the data packets 1410*a-c* comprises a persistent metadata flag in a first state 1417*a*; FIG. 14 illustrates a persistent metadata flag 1417*a* in the persistent metadata 1414*a* of packet 1410*a*. The last packet 1410*c* shown in FIG. 14 does not include a persistent metadata flag in a second state, which indicates that the atomic storage operation was not successfully completed. As a consequence, if a reverse sequence scan of the storage media 1402 is initiated from, or based on, the append point 1420 during a restart recovery, the packets 1410*a-c* will be identified as comprising part of a failed atomic write. Accordingly, the data packets 1410*a-c* will be excluded from (i.e., removed from or otherwise not included in) a logical or forward index 1404 that maps logical identifiers 1415 to media locations or addresses 1423 of the data packets 1410*a-c* of the storage media 1402. As indicated above, index 1404 may be contained in or derived from the metadata 1435 stored on the non-volatile solid-state storage media 1402.

In one embodiment, excluding data of a failed atomic storage operation from the index 1404 may comprise bypassing and/or ignoring the data packet(s) 1410*a-c* associated with the failed atomic storage operation during a scan of a log-based structure (e.g., the event log 1103 illustrated in FIGS. 11A-C or the ordered sequence of logical erase blocks 1440*a-b* specified by the log 1103). In another embodiment, excluding from the forward index 1404 may further comprise removing mappings between logical identifier(s) 1415 and data packet(s) 1410*a-c* associated with the failed atomic storage operation from the index 1404. In yet another embodiment, excluding from the index 1404 may comprise marking media storage locations comprising the data packets 1410*a-c* invalid in a reverse index 722 and/or validity bitmap 741, as described above. Excluding from the index 1404 may further comprise erasing the data packet(s) 1410*a-c* from the storage media 1402 by way of a grooming operation. Of course, one or more of the foregoing embodiments may be combined or used with other embodiments for excluding the data packets 1410*a-c* from the index 1404.

Referring back to FIG. 3, in some embodiments, the storage controller 124 may be configured to implement a fail-safe, multi-step restart recovery process comprising a first scan of the non-volatile storage media 322 to identify data of failed atomic storage operation(s). The first scan may comprise identifying data of failed atomic storage operation(s), as described above, and storing a physical trim note on the non-volatile storage media 322 identifying the data. Storage of the physical trim note may persist the results of the first scan, such that the results will not be lost in the event of a subsequent invalid shutdown. During the first scan, access to the non-volatile storage medium 322 may be locked to prevent other storage operations storing data on the non-volatile storage medium 322, and potentially causing data of a failed atomic storage operation to be misidentified as valid data. The first scan may be limited to a subset of the media address space of the non-volatile storage medium 322. For example, the first scan may begin at an append point 720, and may terminate upon scanning a complete and/or non-atomic storage operation. The restart recovery process may further comprise a second scan of the non-volatile storage media by a reconstruction module 376, which may comprise reconstructing the storage metadata 135 (e.g., a forward index 604), as described above.

Figure 15:
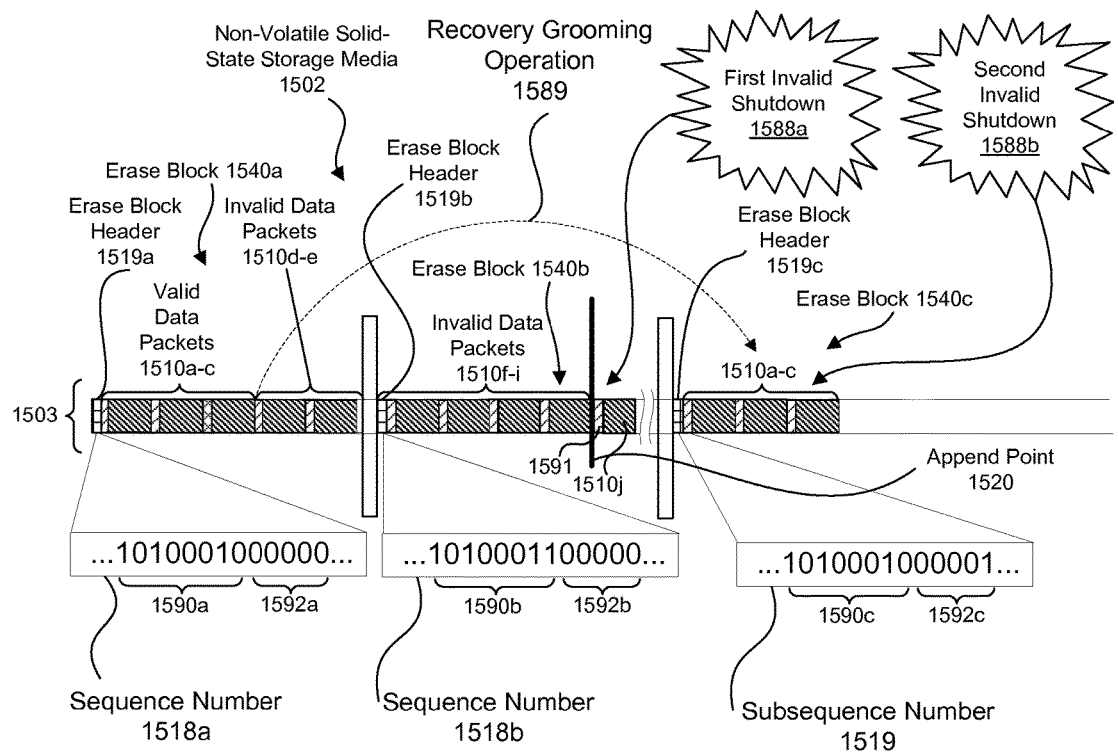
FIG. 15 comprises a diagram illustrating a restart recovery process.

FIG. 15 is a block diagram that illustrates one embodiment of a restart recovery process related to a first invalid shutdown 1588*a* and a second invalid shutdown 1588*b*. As illustrated in FIG. 15, a first invalid shutdown 1588*a* interrupts an atomic storage operation such that data packets 1510*d-e*, 1510*f-i* associated with the failed operation are stored on the non-volatile solid-state storage media 1502. During a restart recovery operation, such as during a subsequent power-on operation, an ordered sequence of logical erase blocks 1540*a-c* (e.g., the ordered sequence of erase blocks identified by the log 1503) are formulated using metadata 1535 stored on the storage media 1502. An append point 1520 is identified at the end of the ordered sequence of logical erase blocks 1540*a-c*.

Thereafter, reverse sequence scanning of the ordered sequence of logical erase blocks 1540*a-b* (or the log 1503) will be initiated from the append point 1520 to identify data packets 1510*d-e*, 1510*f-i* associated with a failed atomic request. As a consequence, data packets 1510*d-e* of the first logical erase block 1540*a* and data packets 1510*f-i* of the second logical erase block 1540*b* will be identified as being associated with a failed atomic write operation. As indicated above, this may occur, for example, by determining that the first packet found in the reverse sequence scan (i.e., data packet 1510*i*) satisfies a failed atomic write criteria (e.g., includes a first persistent metadata flag in a first state 1417*a*, as described in connection with FIG. 14). Thereafter, the remaining data packets 1510*d-e*, 1510*f-h* of the failed atomic storage operation will be identified as being associated with the failed atomic storage operation because, for example, of each of these packets 1510*d-e*, 1510*f-h* also include the first persistent metadata flag in the first state 1417*a*. The restart recovery process may further comprise storing a physical trim note 1591 that identifies the invalid data packets 1510*d-i*.

Thereafter, a recovery grooming operation 1589 may be initiated to transfer the valid data packets 1510*a-c* (but not the invalid data packets 1510*d-e*) from the first logical erase block 1540*a* to the third logical erase block 1540*c*. More specifically, the grooming operation 1589, for example, may involve transfer of valid packets 1510*a-c* from the first logical erase block 1540*a* to the third logical erase block with a newly assigned sequence number (e.g., a logical erase block immediately after the append point 1520), while data packets 1510*d-e*, 1510*f-i* that are associated with a failed atomic write are not transferred to the logical erase block with the newly assigned sequence number.

As noted above, a sequence number 1518*a-b* may be assigned to each erase block 1540*a-c*. The sequence numbers 1518*a-b* may be stored in logical erase block headers 1519*a-b*, as illustrated in FIG. 15, or at another location on the non-volatile solid-state storage media 1502. The sequence numbers 1518*a-b* are utilized to create an ordered sequence of the logical erase blocks 1540*a-c*. The sequence numbers 1518*a-b* for each logical erase block 1540*a-c*, in one embodiment, are spaced at regular intervals. For example, a consecutive series of logical erase blocks 1540*a-c* may be assigned the following sequence numbers: 1, 65, 129, 193, 257, 321, 385 and 449. When it is determined that a new logical erase block 1540*c* is needed, the new logical erase block 1540*c* may be assigned the next available sequence number 1518*a-b* in the series of sequence numbers 1518*a-b*. Accordingly, in such an embodiment, if the last sequence number assigned to a logical erase block is the sequence number 385, a newly assigned erase block 1540*c* may be assigned the sequence number 449. Of course, in alternative embodiments, spacing between the sequence numbers 1518*a-b* may be at an interval other than 64 (such as 32) or at irregular or varying intervals. Also, the sequence numbers 1518*a-b* may be assigned in the cyclic fashion such that when the highest sequence number is utilized (given the number of bits of metadata 1535 allocated for the sequence numbers 1518*a-b*), the lowest sequence number no longer in use may be assigned to a newly identified erase block 1540*c*.

In view of this background, as illustrated in FIG. 15, during the recovery grooming operation 1589, which is intended to transfer the valid data packs 1510*a-c* from the first logical erase block 1540*a* to the third logical erase block, a second invalid shutdown 1588*b* may occur resulting in a failure of the grooming operation 1589. Accordingly, a technique for identification of such a failure would be helpful to prevent use of the invalid or partially written data 1510*a-c* saved in the third logical erase block 1540*c* or confusion as to whether the data in the first logical erase block 1540*a* or the third logical erase block 1540*c* should be utilized.

One such technique involves assigning a subsequence number 1519 (rather than a sequence number 1518*a-b* to the logical erase block 1540*c* to which the valid data 1510*a-c* will be or is intended to be transferred. As indicated above, in one embodiment, the sequence numbers 1518*a-b* are spaced at regular intervals, such as at intervals of 64 or at intervals of 32, as illustrated in FIG. 15. For example, consecutive sequence numbers may increment the most significant bits 1590*a-b* of a fixed size sequence number by a particular increment, while leaving the least significant bits 1592*a-b* unchanged. The subsequence number 1519 may be derived from a sequence number 1518*a* by incorporating the most significant bits 1590*a* of the sequence number 1518*a* from which the subsequence number 1519 is derived and altering (such as incrementing or decrementing) the least significant bits 1592*a* of the sequence number 1518*a*. As illustrated in FIG. 15, the subsequence number 1519 may incorporate the most significant bits 1590*a* of the first sequence number 1518*a* and increment the least significant bits 1592*a* of the first sequence number 1518*a*, to yield the subsequence number 1519 (e.g., 1010001000001) comprising the same high-order bits 1590*c* and incremented low-order bits 1592*c*. By assigning the subsequence number 1519 to the third logical erase block 1540*c*, the sequencing order of the erased blocks 1540*a-c* is maintained because the subsequence number 1519 is greater than the first sequence number 1518*a* from which the subsequence number 1519 is derived, and is less than the next sequence number 1518*b*. Accordingly, the subsequence number 1519 maintains an ordered sequence among logical erase blocks 1540*a-c* (e.g., the log 1103 illustrated in FIGS. 11A-C) such that an ordered sequence of storage operations completed on the storage media 1502 is preserved on the storage media 1502.

It should also be noted that a subsequence number 1519 may be derived in various ways from a sequence number 1518*a*. For example, a subsequence number 1519 could decrement the most significant bits 1590*a* of the first sequence number 1518*a* from which the subsequence number 1519 is derived and increment the least significant bits 1592*a* of the sequence number 1518*a* from which the subsequence number 1519 is derived.

In due course, all of the data packets 1510*a-c*, 1510*d-e* of the first logical erase block 1540*a* will be erased, including erase block header 1519*a*, from the storage media 1502 if the grooming operation 1589 were completed successfully. However, erasure of the data packets 1510*a-c*, 1510*d-e* and the erase block header 1519*a* of the first logical erase block 1540*a* may not occur immediately if the grooming operation 1589 is completed successfully. Moreover, if second invalid shutdown 1588*b* occurs during the grooming (e.g., transferring) of the valid data 1510*a-c* from the first logical erase block 1540*a* to the third logical erase block 1540*c*, the data packets 1510*a-c* in the third logical erase block 1540*c* could potentially be corrupt or incomplete.

Accordingly, during a power-on operation following the second invalid shutdown 1588*b*, a restart recovery process may be initiated. It may be determined that the first logical erase block 1540*a* has been assigned the first sequence number 1518*a* and the third logical erase block 1540*c* has been assigned the subsequence number 1519 derived from the first sequence number 1518*a*. As explained above, this may indicate that either the data of the first logical erase block 1540*a* was not erased or that a grooming operation was interrupted. In either case, the data packets 1510*a-c* of the third logical erase block 1540*c* are potentially corrupted or incomplete and should not be relied on as being valid. As a result, the data packets 1510*a-c*, erase block header 1519*c*, and any other data stored in the third logical erase block 1540*c* should be erased or scheduled for erasure and should be excluded from the index 1504. (As indicated previously, the index 1504 maps logical identifiers 1515 to media locations or addresses 1523 and may comprise or be based on metadata 1535 stored on the media 1502.)

Thereafter, the append point 1520 would be positioned immediately to the right of invalid data packet 1510*i*, as shown in FIG. 15. Reverse sequence scanning of the non-volatile storage media 1502 from the append point 1520 would be commenced and would identify data packets 1510*d-e* of the first logical erase block 1540*a* and data packets 1510*f-i* of the second logical erase block 1540*b* as comprising a portion of a failed atomic write operation as a result of the first invalid shutdown 1588*a*. In addition, the invalid data packets 1510*d-i* may be identified as invalid based upon the physical trim note 1591, even if subsequent storage operations at the append point 1520 indicate successful completion of an atomic storage operation (e.g., data packet 1510*j*).

The valid data packets 1510*a-c* of first logical erase block 1540*a* will be groomed 1589 to the third logical erase block 1540*c* without transferring the invalid data packets 1510*d-e* to the third logical erase block 1540*c*. In one embodiment, when the valid data packets 1510*a-c* are groomed 1589 to the third logical erase block 1540*c*, the first persistent metadata flag for each of the valid data packets 1510*a-c* is set to a second state (indicating completion of the atomic storage operation).

In view of the foregoing, it should also be observed that excluding from the forward or logical index 1504 during a restart recovery may comprise erasing each logical erase block 1540*a-b* of the non-volatile solid-state storage media 1502 comprising one or more data packets 1510*d-e*, 1510*f-i* associated with the failed atomic storage operation and transferring data packets 1510*a-c* (e.g., valid data packets) from the each logical erase block 1540*a-b* to a different location or logical erase block 1540*c* on the storage media 1502. Also, erasing each logical erase block during restart recovery may comprise assigning a subsequence number 1519 to a destination logical erase block 1540*c* configured to store transferred data packets 1510*a-c* (i.e., valid data 1510*a-c*). Further, erasing each logical erase block 1540*a-c* during a restart recovery process may comprise, in response to identifying a first logical erase block 1540*a* having a sequence number 1518*a* and a third logical erase block 1540*c* having a subsequence number 1519, grooming 1589 the first logical erase block 1540*a* and, as described above, excluding each data packet 1510*d-e* of the first logical erase block 1540*a* associated with the failed atomic storage operation from the index 1504. Again, the invalid data packets 1510*d-e* of the first logical erase block 1540*a* may immediately or eventually be erased from the media 1502 after the grooming operation 1589 is performed.

The recovery grooming operation 1589, if completed before normal input-output operations commence, in one embodiment, avoids a scenario in which data packets 1510*d-e*, 1510*f-i* associated with a failed atomic write operation could be considered valid because those data packets are removed from the media 1502 by the recovery grooming operation 1589. The following example illustrates this point.

First, a failed atomic write operation commences and is interrupted, resulting in the invalid data packets 1510*d-e*, 1510*f-i* being stored on the storage media 1502. Second, a power-on operation is performed and, through a scan, the log on the media 1502 is formulated without engaging in the recovery grooming operation 1589 such that the invalid data packets 1510*d-e*, 1510*f-i* are included in the forward index 1504. Third, a second atomic write operation is commenced and successfully completed. Finally, a reverse-sequence scan from the append point 1520 (which is positioned after the data packets associated with the second successful atomic write operation) is subsequently initiated to identify packets associated with a failed atomic write operation. In this scenario, the invalid packets 1510*d-e*, 1510*f-i* will not be identified and removed from the storage media 1502. This is because the reverse sequence scanning from the append point 1520 will encounter the packets associated with the second successful atomic write operation, and determine that the second atomic write operation was successfully completed. In certain embodiments, identifying the second successful atomic write operation may result in termination of the reverse sequence scanning and the invalid data packets 1510*d-e*, 1510*f-i* will not be identified as being associated with a failed atomic write operation. Accordingly, the invalid data packets 1510*d-e*, 1510*f-i* will not be removed, or otherwise excluded, from the forward index 1504 or from the storage media 1502.

In another embodiment, and as described above, a physical trim note 1591 may be stored on the non-volatile storage medium 1502 after initially identifying the invalid data packets during a first scan. Subsequent reconstruction operations may access the physical trim note to identify the invalid data packets 1510*d-i* despite other, subsequent storage operations (e.g., storage of valid packet 1510*j*).

The teachings of the disclosure may be further adapted to implement vectored storage operations. As described above, a vectored storage operation refers to a storage operation pertaining to one or more vectors, wherein each vector refers to a particular range or set of data. A vector may be defined in terms of a base location (e.g., starting point) and length or range. Alternatively, a vector may be defined in set notation (e.g., a set of one or more identifiers or ranges of identifiers). A vectored storage operation may, therefore, refer to a storage operation performed on each of the one or more vectors. For example, a vectored write operation may comprise writing data pertaining to each of a plurality of specified I/O vectors.

The systems and methods disclosed herein may be leveraged to implement efficient vector operations. As described above, the storage controller 124 may be configured to implement "any-to-any" associations between logical identifiers and media storage locations. These arbitrary, any-to-any associations may be enabled by, inter alia, the storage metadata 135 (e.g., indexes 604 and/or 904, described above), and the contextual, log-based data format (e.g., persistent metadata), described above. Data pertaining to noncontiguous logical identifiers (e.g., data of different, noncontiguous LID ranges) may be stored contiguously on the non-volatile storage media 322.

Figure 13B:
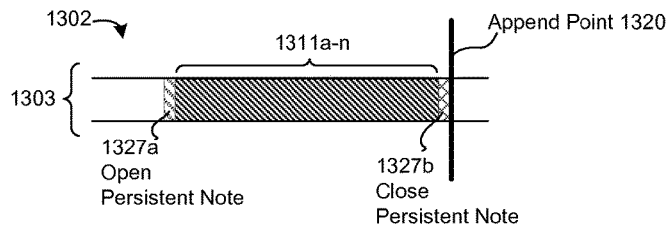
FIG. 13B is a diagram illustrating one embodiment of persistent notes for managing an atomic storage operation.

Although FIGS. 13A, 14, and 15 depict embodiments for managing atomic storage operations using, inter alia, persistent metadata flags (e.g., persistent metadata flags 1317*a*, 1317*b*, 1417*a*, and so on), the disclosure is not limited in this regard. The embodiments disclosed herein may be adapted to use other mechanisms for managing atomic storage operations. For example, in some embodiments, an atomic storage operation may comprise storing one or more persistent notes on the non-volatile storage medium (e.g., in the log). An "open" persistent note may indicate the start of an atomic storage operation, and a "close" persistent note may indicate completion of the atomic storage operation. Packets of the atomic storage operation may be stored contiguously between the "open" and "close" persistent notes. If a "close" persistent note is not found, packets after the "open" persistent note may be identified as part of a failed atomic storage operation, and may be excluded, as described above. FIG. 13B depicts one embodiment of persistent notes for managing an atomic storage operation. The persistent note 1327*a* identifies the beginning of an atomic storage operation on the non-volatile storage medium (log) 1302. Accordingly, the packets 1311*a-n* following the open persistent note 1327*a* are identified as part of an atomic storage operation. A close persistent note 1327*b* may be stored on the non-volatile storage medium 1302 in response to completion of the atomic storage operation. If an open persistent note 1327*a* is not closed with a corresponding close persistent note 1327*b*, the packets 1311*a-n* may be identified as being part of a failed atomic storage operation and excluded, as described above.

In some embodiments, the packets 1311*a-n* may comprise respective persistent metadata 1314*a-b*, which may indicate packets 1311*a-n* that are part of an atomic storage operation. Alternatively, persistent metadata flags indicating membership in an atomic storage operation may be omitted, since this information may be determined based upon the open persistent note 1327*a*. However, in some embodiments, a persistent metadata flag indicating membership in the atomic storage operation may be included (e.g., a persistent metadata flag in a first state 1317*a*). Other packets that are not part of the atomic storage operation may be interleaved with the packets 1311*a-n*. These packets may comprise respective persistent metadata flags to indicate that the packets are not part of the atomic storage operation (e.g., persistent metadata flags in a second state 1317*b*). Accordingly, when excluding packets due to a failed atomic storage operation, the interleaved packets that were not part of the atomic storage operation may be retained (not excluded).

Figure 16A:
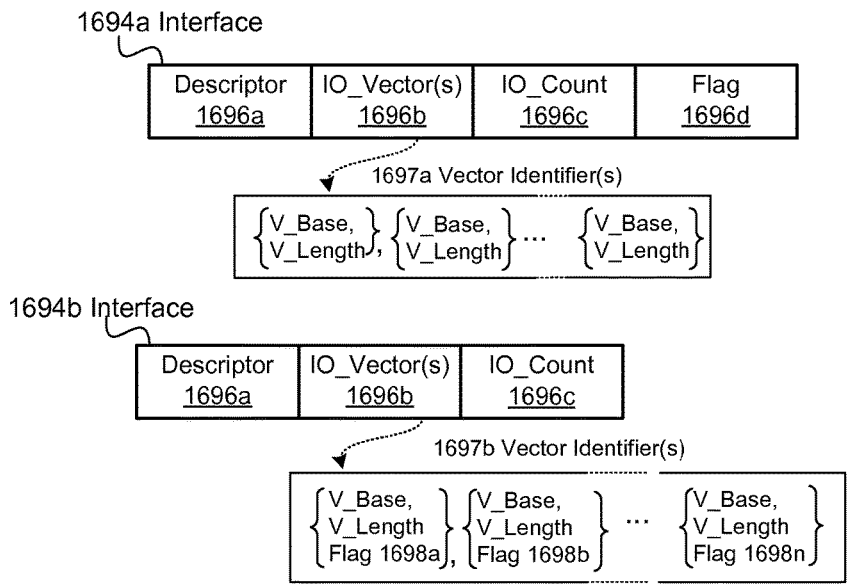
FIG. 16A depict embodiments of a vectored storage request interface.

FIG. 16A depicts exemplary interfaces 1694*a* and 1694*b* for vectored storage requests. The vectored storage requests disclosed herein may be atomic or non-atomic. An atomic, vectored storage request may comprise a request to perform one or more storage operations on one or more I/O vectors as a single atomic storage operation (all operations are completed on each I/O vectors, or none of the I/O vectors). Alternatively, a vectored storage request may be non-atomic (e.g., each vector operation may be implemented and/or complete independently). The interfaces 1694*a* and/or 1694*b* may be utilized by a storage client 116 to make vectored storage requests, including atomic storage requests (and/or other types of requests). The parameters 1696*a-d* of the interfaces 1694*a-b* may be arranged in any suitable order and/or may be provided in any suitable format. Moreover, the interfaces 1694*a-b* may include other parameters not specifically identified in FIG. 16A. The interfaces 1694*a-b* may be implemented within one or more existing interfaces (e.g., a block device interface), may be provided as extensions to an existing application program interface, and/or as part of a separate application program interface (e.g., VSL interface 332).

A descriptor parameter 1696*a* may comprise a reference and/or handle to a storage entity pertaining to a request, the descriptor 1696*a* may comprise and/or reference a file descriptor, file identifier, file name, database entity identifier, or the like. The IO_Vector parameter(s) 1696*b* may identify one or more storage operations to be performed on contiguous or noncontiguous blocks of storage media (e.g., I/O vectors). The IO_Vector(s) parameter 1696*b* may comprise and/or reference a set or list of vector identifiers 1697*a*. The vector identifiers 1697*a* may specify respective I/O vectors pertaining to the request using, for example, a base identifier, "V_Base," which may comprise a source address, source LID, or the like, and length "V_Length," which may comprise a range, extent, or other length and/or size indicator. The IO_Count 1696*c* parameter may specify the number of storage operations encapsulated within the IO_Vector 1696*b* (e.g., the number of vector identifiers 1697*a*). The flag parameter 1696*d* may identify a storage operation to be performed on the IO_Vector(s) 1696*b*. The flag parameter 1696*b* may specify any storage operation, including, but not limited to: a write, a read, an atomic write, a trim or discard request, a delete request, a format request, a patterned write request (e.g., request to write a specified pattern), a write zero request, or an atomic write operation with verification request, allocation request, or the like. The atomic write operation with verification request completes the atomic write operation and then verifies that the data of the request was successfully written to the storage media. The flag parameter 1696*d* may specify similar non-atomic storage operations. Alternatively, or in addition, the flag parameter 1696*d* may comprise one or more flags for specifying whether a particular operation is to be atomic.

The storage operation specified by the flag 1696*d* may be implemented on each of the IO_Vector(s) 1696*b*. Accordingly, the interface 1694*a* may be used to minimize the number of calls needed to perform a particular set of operations. For example, an operation to store data pertaining to several contiguous or noncontiguous ranges may be encapsulated into a single vectored storage request through the interface 1696*a*. Moreover, the use of a flag parameter 1696*d* provides flexibility such that the interface 1694*a* may be utilized for various purposes, such as atomic writes, a trim or discard request, a delete request, a format request, a patterned write request, a write zero request, or an atomic write operation with verification request.

In some embodiments, an interface 1694*b* may provide for specifying a different operation for each respective IO_Vector 1696*b*. The interface 1696*b* includes vector identifier(s) 1697*b* comprising respective flag parameters 1698*a-n*. The flag parameter(s) 1698*a-n* may specify a storage operation to perform on a particular IO_Vector 1696*b*. Accordingly, the interface 1694*b* may be configured to implement composite, vectored storage operations. As used herein, a composite, vectored storage operation refers to a storage operation in which respective, specified storage operations are performed on one or more IO_Vectors. The storage operations may differ between IO_Vectors 1696*b*. For example, the flag 1698*a* of a first IO_Vector 1696*b* may comprise a TRIM operation, the flag 1698*b* of second IO_Vector 1696*b* may comprise a write operation, and so on. The flags 1698*a-n* may specify atomic storage operations, which may be implemented in a single atomic storage operation, as described above. Atomicity may be specified in individual flags 1698*a-n*. Alternatively, or in addition, the interface 1694*b* may comprise a top-level flag parameter (not shown), which may be used to specify default and/or global storage operation parameters. For example, the top-level flag may be used to indicate that the storage operations of flags 1698*a-n* are to be performed atomically. Alternatively, or in addition, atomicity may be specified on a flag-by-flag basis and/or may be a default behavior of the interface 1694*b*.

In some embodiments, a composite, vectored atomic storage request may comprise logical and/or physical allocation operations that do not directly correspond to physical storage operations on the non-volatile storage media. For example, a composite, vectored atomic storage operation may comprise a request to allocate one or more logical identifiers (e.g., expand a file), deallocate LIDs (e.g., TRIM or delete data), and so on. An allocation request may be included as part of a composite, vectored atomic storage operation comprising an atomic write to the newly allocated portion of the file. The allocation request may not be reflected in the storage metadata 135 until the allocation, storage operation, and/or other storage operations of the request are complete. Similarly, a TRIM command may comprise modifying storage metadata 135 to indicate that data of one or more LIDs no longer needs to be preserved. Modifying the storage metadata 135 may comprise removing one or more entries from an index, invaliding one or more packets, and so on. These metadata operations may not be implemented until other operations of the request are complete (e.g., index entries may not be removed until other operations of the atomic storage request are complete). For example, the metadata operations to implement a TRIM in a composite, vectored atomic storage operation comprising one or more atomic writes may not be implemented until the write operations are complete.

Figure 16B:
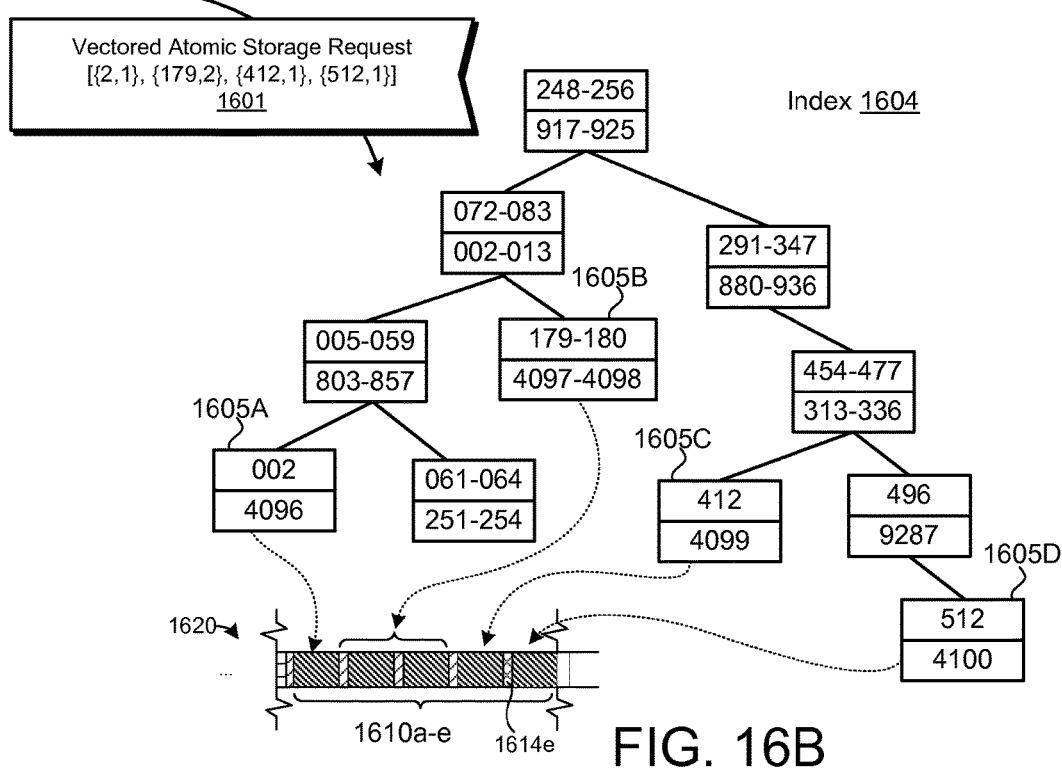
FIG. 16B depicts one example of a vectored atomic storage operation.

As described above, the contextual, log format disclosed herein (and corresponding "any-to-any" mappings between logical identifiers and media storage locations), may be leveraged to implement efficient vectored, atomic storage operations. FIG. 16B depicts a vectored, atomic storage request 1601 implemented using the write anywhere storage systems/devices and methods disclosed herein. In the FIG. 16B example, a vectored, atomic storage request 1601 may specify atomic writes to a plurality of non-contiguous I/O vectors, including, an I/O vector at LID 2, length 1, an I/O vector at LID 179 length 2, an I/O vector at LID 412 length 1, and an I/O vector at LID 512 length 1. As illustrated in the index 1604, the I/O vectors of the request 1601 correspond to different, noncontiguous ranges in the logical address space (index 1604).

The storage controller 124 may leverage the "write anywhere" features described herein, to store data of the non-contiguous I/O vectors contiguously on the non-volatile storage medium 1620. In response to the request 1601, the VSL 130 may queue the vectored storage operations in the ordered queue 344, as described above. Alternatively, if the request 1601 is not an atomic storage operation (or is being managed using an in-flight index, as described above), the ordered queue 344 may not be used. Data of the atomic storage operations may then be stored sequentially, and in respective packets 1610*a-e* on the non-volatile storage medium 1620. For clarity of illustration, in the FIG. 16B example, each LID corresponds to data of a respective data packet 1610*a-e* (e.g., each LID references the same or less data as stored in the packet format, described above). The disclosure, however, is not limited in this regard, and could be adapted to implement any fixed and/or variable mapping between LIDs and data segment size.

The sequential data storage may comprise associating media storage locations of the data packets with respective logical identifiers in the index 1604. The index 1604 may comprise entries 1605A-D representing each I/O vector. The any-to-any mappings between LIDs and media storage locations may allow data of the noncontiguous I/O vectors to be stored contiguously on the non-volatile storage media 1620; as illustrated in FIG. 16B, the entries 1605A-D may comprise respective mappings to arbitrary media storage locations on the non-volatile media 1620, such that the noncontiguous LIDs map to contiguous, sequential packets 1610*a-e*. Accordingly, the non-volatile storage controller 124 may store the noncontiguous data referenced in the vectored atomic request 1601 sequentially, in contiguous media storage locations. Moreover, the packets may comprise persistent metadata to persist the association between the data and the respective logical identifiers, such that the any-to-any mappings of entries 1605A-D can be reconstructed.

The contiguous layout of packets 1610*a-e* may facilitate tracking the vectored atomic storage request 1601. As described above, packets 1610*a-d* may comprise a persistent metadata flag in a first state indicating that the packets 1610*a-d* are part of an "open" or "incomplete" atomic storage request. The last packet 1610*e* of the operation may comprise a persistent metadata flag in a second state indicating successful completion of the vectored, atomic storage request 1601. As described above, the contiguous layout of the packets (and the corresponding flags) may allow failed atomic storage requests to be identified and "rolled back," such that data pertaining to the failed atomic storage operation is excluded from the storage metadata 135 (e.g., excluded from the index 1604). For example, if the persistent metadata flag in the second state 1614*e* is not found on the non-volatile storage media 1620, the entries 1605A-D may be removed (or omitted) from the index 1604 and the packets 1610*a*-*e* may be invalidated, as described above. The persistent metadata may be further leveraged to allow atomic storage operations to cross storage boundaries (e.g., erase block boundaries), allow TRIM and/or grooming operations, and so on, as described above.

Figure 16C:
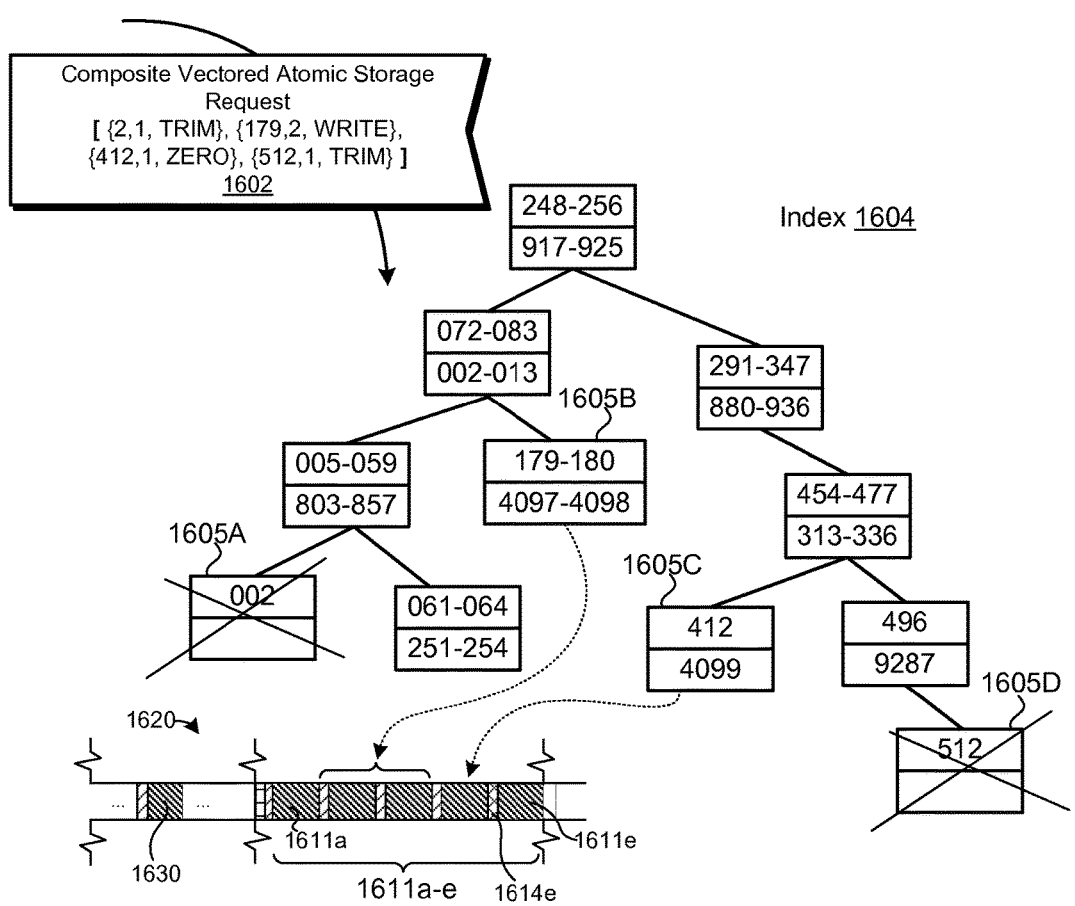
FIG. 16C depicts one example of a composite, vectored atomic storage operation.

FIG. 16C depicts one embodiment of a composite, vectored storage operation. The storage request 1602 of FIG. 16C may comprise a plurality of I/O vectors, each having a respective operation flag. The FIG. 16C example depicts atomic storage operations. However, the disclosure is not limited in this regard, and in other examples, a composite, vectored storage operation may comprise one or more non-atomic storage operations. The request 1602 specifies an atomic TRIM operation for I/O vector at LID 2, length 1, an atomic write to the I/O vector at LID 179, length 2, an atomic ZERO fill to the I/O vector at LID 412, length 1, and an atomic TRIM for the I/O vector at LID 512, length 1. In response to the request 1602, the storage controller 124 may queue the specified storage operations, and may store persistent indicators on the non-volatile storage media 610, as described above. Performing an atomic TRIM operation may comprise modifying storage metadata 135, which may comprise removing the entry 1605 from the index 1604, invalidating one or more packets comprising data associated with the entry 1605, and so on. The modifications to the storage metadata 135 may be performed after other atomic storage operations of the request 1602 are complete. Performing the atomic TRIM may further comprise storing a persistent note 1611*a* on the non-volatile storage medium 1620. The persistent note 1611*a* may indicate that data of LID 2 does not need to be preserved on the non-volatile storage medium 1620. Therefore, if the index 1604 is reconstructed from the contents of the non-volatile storage media 1620, the persistent note 1611*a* may be used to invalidate data of LID 2 (e.g., exclude entry 1605A from the index 1604), and/or invalidate one or more packets comprising the data. For example, while reconstructing the storage metadata 135 (e.g., index 1604), a packet 1630 corresponding to LID 2 may be identified, and, in response, the entry 1605A may be added to the index 1604. In the absence of the persistent note 1611*a*, the entry 1605A may remain in the index 1604 (and the packet 1630 may remain on the medium 1620), negating the TRIM operation. However, the persistent note 1611*a* on the non-volatile storage medium 1620 may indicate that the LID 2 was TRIMed and, as such, the entry 1605A may be removed from the index 1604, and the packet 1630 may be invalidated.

The persistent note 1611*a* (and other persistent notes and/or packets of the composite, vectored atomic storage request 1602) may comprise a persistent metadata flag, which, as described above, indicates that the persistent note (and/or packet) is part of an atomic storage operation. If a corresponding persistent metadata flag in a state indicative of closing the atomic storage operation is not found in packet 1611*e* (e.g., persistent metadata flag 1614*e* does not exist on the medium 1620), the TRIM of the persistent note 1611*a* (as well as other operations) may not be implemented. Accordingly, in the absence of the persistent metadata flag 1614*e* in the appropriate state (or other condition indicating closure of the atomic storage operation), the entries 1605A and 1605D may not be removed from the index 1604, and the data packet 1630 may not be invalidated.

The other storage operations of the composite, atomic storage request 1602 may proceed as described above. The "ZERO" operation may comprise associating LID 412 with a particular data pattern (e.g., zeros) by storing the data pattern in one or more packets on the non-volatile storage media 1620 and/or storing an indicator of the pattern (e.g., a persistent note), as described above. Completion of the composite, atomic storage request 1602 may comprise storing a packet (or other persistent data) comprising a persistent metadata flag indicating completion of the request 1602, as described above.

Figure 16D:
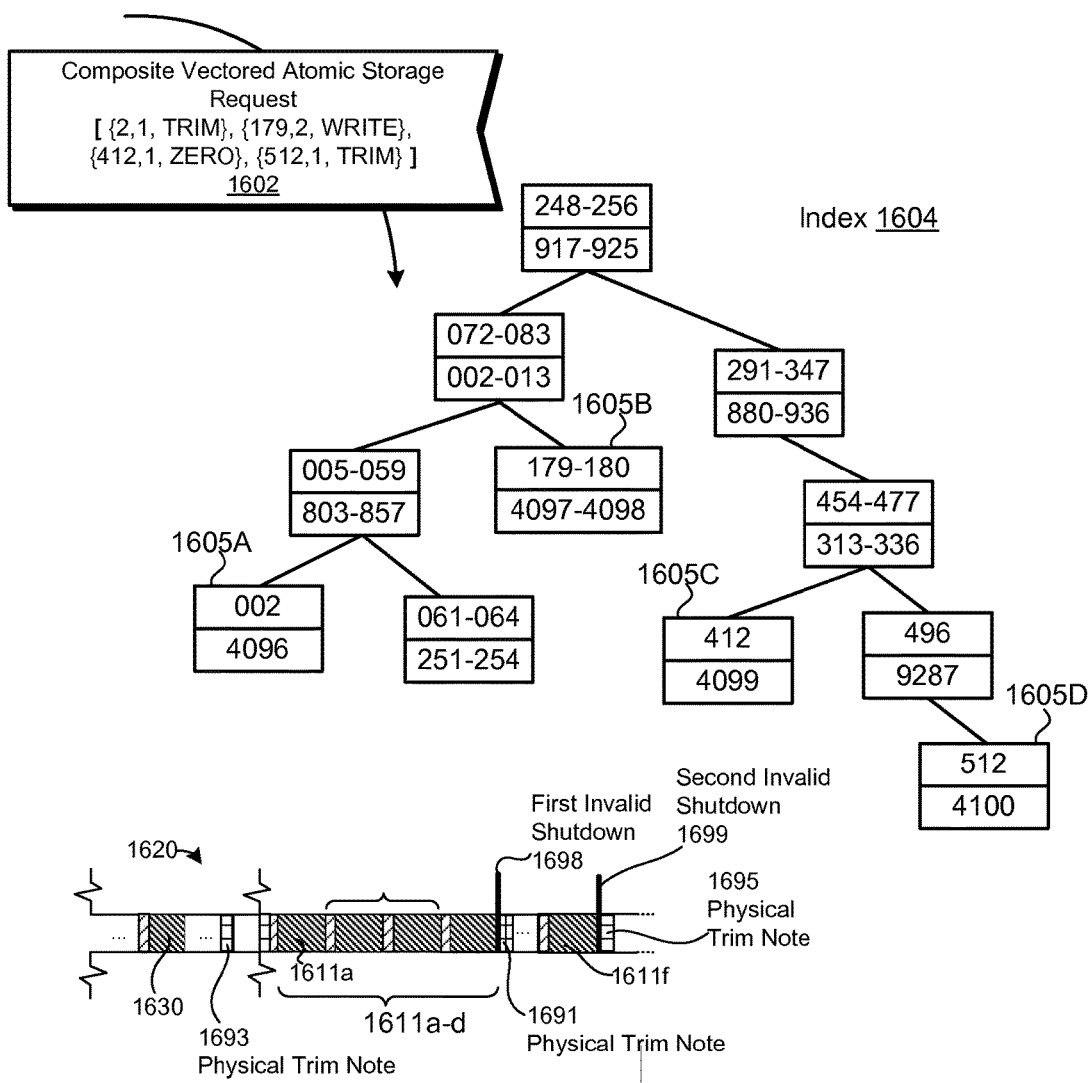
FIG. 16D depicts one example of a failed composite, vector atomic storage operation.

FIG. 16D depicts one embodiment of a restart recovery process in conjunction with the composite atomic storage operation 1602. In the FIG. 16D example, the atomic storage request 1602 fails due to a first invalid shutdown 1698 before the final packet can be stored (e.g., packet 1611*e* of FIG. 16C). In response to the invalid shutdown, the storage controller 124 may implement a restart recovery process, which may comprise a recovery module 372 performing a first scan of the non-volatile storage medium 1620. The invalid data identification module 373 may identify that the packets 1611*a*-*d* that correspond to the failed atomic storage operation 1602 based upon persistent metadata stored with the packets 1611*a*-*d*, as described above. The note storage module 373 may be configured to store a physical trim note 1691 on the non-volatile storage medium 1620, which may identify the data packets 1611*a*-*d*, as described above (e.g., by media address and sequence indicator). The first scan may complete, and the physical trim note 1691 may be stored before unlocking the non-volatile storage medium 1620 for other storage operations.

After completing the first scan and storing the physical trim note 1691, a reconstruction module 376 may perform a second scan of the non-volatile storage media to reconstruct the storage metadata 135 (e.g., the forward index 1604). The operations of the composite atomic storage operation may be excluded from the index, such that the entries 1605A and 1605D are not TRIMmed, and the entries 1605B and 1605C are unchanged (continue to reference the same media addresses). A second invalid shutdown 1699 may occur after one or more valid data packets (e.g., packet 16110 are stored on the non-volatile storage medium 1602. The second invalid shutdown 1699 may result in loss of the storage metadata 125 (index 1604).

The storage controller 124 may implement a restart recovery process in response to the second invalid shutdown 1699. The first scan of the non-volatile storage media 1602, however, due to the intervening data packet 1611*f*, the invalid data identification module 373 may not identify that the data packets 1611*a*-*d* are part of a failed atomic storage operation. Accordingly, the first scan may complete without storing a physical trim note and/or without identifying the invalid data 1611*a*-*d*. The reconstruction module 376 may perform a second scan to reconstruct the storage metadata 135 (index 1604). The reconstruction module 376 may access the physical trim note 1691 and, based upon the note 1691, may determine that the packets 1611*a*-*d* are part of the failed atomic storage request 1602. In response, the reconstruction module 376 may exclude the operations defined by the packets 1611*a*-*d*, which may comprise ignoring the operations, reversing the operations, or the like, such that the state of the storage metadata 135 (and index 1604) prior to the failed atomic storage request 1602 is maintained.

In some embodiments, the recovery module 373 may be configured to continue the first scan beyond the first non-atomic and/or valid data encountered in the log. Instead, the recovery module 372 may be configured to scan the media and/or coalesce data invalidity information from physical trim notes on the medium 1602. For example, following the second invalid shutdown 1699, the recovery module 373 may scan the media to identify the physical trim notes 1691 and 1693. The invalid data identification module 373 may extract the data identifiers from the notes 1691 and 1993 and may determine whether the data referenced thereby are still on the non-volatile storage media (e.g., by comparing respective sequence indicators, as described above). References to invalid data that is still on the non-volatile storage medium may be combined and stored in the physical trim note 1695 (by the storage module 374). The recovery module 372 may be further configured to invalidate the other physical trim notes 1691 and/or 1693 so that the notes 1691 and/or 1693 can be removed from the non-volatile storage medium 1620 (e.g., in a grooming process, as described above).

Figure 17:
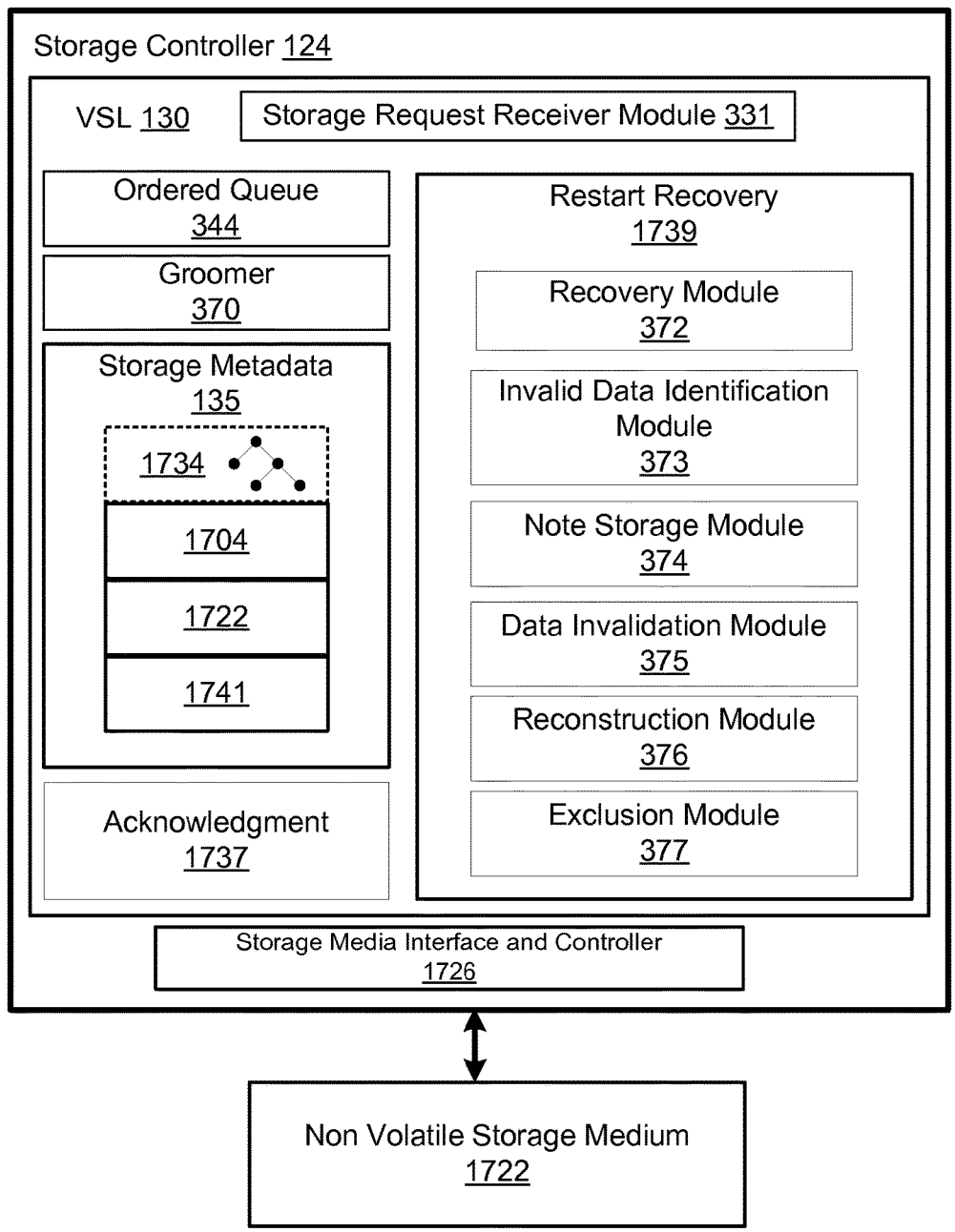
FIG. 17 illustrates an apparatus comprising storage controller and virtual storage layer.

FIG. 17 is a block diagram of a storage controller 124 configured to manage data of atomic storage operations on a non-volatile storage medium 1722. The non-volatile storage medium 1722 may comprise a solid-state storage medium, a magnetic storage medium (e.g., hard disk), or the like.

The storage controller 124 may receive storage requests from one or more storage clients (not shown) through a storage request receiver module 331, which may comprise one or more interfaces and/or APIs, as described above. The storage controller 124 may comprise an ordered queue 344, which may queue non-atomic and/or atomic storage requests and process pending requests in a sequential fashion, such as in the order the requests are received. The storage requests may comprise vectored storage requests (atomic and/or non-atomic), as described above. In some embodiments, the storage controller 124 comprises multiple ordered queues (not illustrated), such as an ordered queue for atomic storage requests and an ordered queue for non-atomic requests. As explained above, the ordered queue 433 may obviate the need for an inflight index 950 (disclosed above in connection with FIGS. 9A-E) and may avoid potential problems associated with interleaving of packets associated with different atomic write operations.

The storage controller 124 may comprise a storage media interface and controller module 1726, which may be configured to store data on the non-volatile storage medium 1722 in a contextual, log format, as described above (e.g., store data with self-describing, persistent metadata, and in a sequential, log order). The storage media interface and controller 1726 may be configured to store data of atomic storage operations with persistent atomicity and/or completion indicators, such as the persistent metadata flags 367 and/or persistent notes, described above.

The storage controller 124 may further comprise an acknowledgment module 1737 that transmits or records acknowledgment of completion of storage requests (atomic or non-atomic). The acknowledgment module 1737 may transmit acknowledgment asynchronously via a callback or other mechanism. Alternatively, an acknowledged atomic storage request may be synchronous and may comprise returning from an asynchronous function or method call. The acknowledgment module 1737 may send acknowledgment after the data has actually been stored and/or when it is reasonably certain that the data of the request will be stored, as will be explained in further detail in connection with the flowchart shown in FIG. 18.

The storage controller 124 may maintain storage metadata 135, including a logical address space 1734, forward index 1704, reverse index 1722, and/or one or more validity bitmaps 1741, as described above. The forward index 1704 may comprise "any-to-any" mappings between logical identifiers and media storage locations. The storage controller 124 may leverage the storage metadata 135 to implement a "write anywhere" storage paradigm, in which data of any logical identifier in the logical address space 1734 may be stored at any media storage location of the non-volatile storage medium 1722 (and vice versa).

The restart recovery module 1739 may be configured to detect an invalid shutdown of the storage controller 124 by, inter alia, accessing the non-volatile storage medium 1722 (e.g., accessing the non-volatile storage medium to determine whether a clean shutdown indicator was stored).

In response to detecting an invalid shutdown, the restart recovery module 1739 may be configured to implement a crash safe restart and recovery process, which may include performing a first scan of the non-volatile storage medium to identify data of failed atomic storage requests and a second scan to reconstruct the storage metadata 135.

The first scan may comprise the recovery module 372 scanning the non-volatile storage medium according to a reverse log order (starting at an append point and moving backwards through the log). The invalid data identification module 373 may be configured to identify data of invalid storage requests based upon persistent indicators stored on the non-volatile storage medium 1722, such as persistent metadata flags, persistent notes, physical trim notes, or the like, as described above. Alternatively, or in addition, the invalid data identification module may be configured to deduce a failed atomic storage operation, as described above.

In some embodiments, the recovery module 372 terminates the first scan in response to accessing valid data (e.g., data that is not part of an atomic storage operation and/or data that is part of a completed atomic storage operation). Alternatively, the recovery module 372 may be configured to continue the first scan to identify invalid data in other physical trim notes stored on the non-volatile storage medium 1722, as described above. The invalid data identification module 373 may be configured to access data identifiers of one or more physical trim notes, determine whether data referenced in the one or more physical trim notes is still on the non-volatile storage medium (e.g., using sequence indicator(s) associated with the one or more physical trim notes and sequence indicators(s) of the media storage locations referenced thereby). The invalid data identification module 373 may combine invalidity information of the one or more physical trim notes and/or may mark the one or more physical trim notes invalid in the storage metadata 135, as described above.

The note storage module 374 may be configured to store a physical trim note on the non-volatile storage medium in response to completing the first scan (and/or in response to the invalid data identification module identifying data of a failed atomic storage operation). The physical trim note may identify data of a failed atomic storage request and/or data identified in one or more other physical trim notes. The data may be identified by a media address. The data may be further identified using a sequence indicator. In some embodiments, each media address is associated with a respective sequence indicator. Alternatively, or in addition, the physical trim note itself may comprise a note sequence indicator (e.g., note sequence indicator 392).

The data invalidation module 375 may be configured to invalidate the data identified during the first scan. Invalidating the data may comprise updating the forward index 1704 (e.g., removing references to the invalid data), marking the media storage locations invalid in the reverse index 722 and/or validity bitmap(s) 1741, and so on.

The reconstruction module 376 may be configured to reconstruct portions of the storage metadata 135 in response to the first scan. As described above, reconstructing the storage metadata 135 may comprise scanning the log of contextual data stored on the non-volatile storage medium 1722. The reconstruction module 376 may be configured to map logical identifiers to corresponding media storage locations based upon the self-describing, persistent metadata stored with the data on the non-volatile storage medium 1722 (e.g., the logical interface metadata 365 of the packet format 360 of FIG. 4A).

The exclusion module 377 may be configured to exclude data of failed atomic storage operations (e.g., invalid data) from the forward index 1704. The exclusion module 377 may be configured to skip media storage locations marked invalid in the reverse index 1722 and/or validity bitmap(s) 1741. The first scan may, therefore, make the second scan more efficient by allowing the reconstruction module 486 to bypass data that is known to be invalid. The exclusion module may be further configured to remove references to the invalid data from the forward index 1704, as described above.

The exclusion module 377 may be further configured to skip and/or "roll back" operations specified in one or more failed composite storage operations. As described above, a composite and/or vectored atomic storage operation may specify one or more data operations (e.g., TRIM, ZERO, etc.). The exclusion module 377 may be configured to omit and/or roll back operations associated with failed atomic storage operations (as identified by the invalid data identification module 373 and/or invalidated by the data invalidation module 375).

As described above, the groomer module 370 may be configured to reclaim media storage location(s). The groomer 370 may be further configured to determine whether to retain a physical trim note on the non-volatile storage media 1722. The groomer 370 may erase a physical trim note in response to determining that the data referenced by the physical trim note is no longer stored on the non-volatile storage medium. The groomer may make this determination by comparing sequence indicators of a media storage location(s) identified in the physical trim note to a note sequence indicator (or media address sequence indicator(s) stored in the physical trim note). If the sequence indicators of the media storage locations are later in the log, the groomer 370 may determine that the invalid data has been removed (e.g., was overwritten or erased in a grooming operation), and the physical trim note no longer needs to be retained on the non-volatile storage medium 1722. Otherwise, the physical trim note may be retained. When the physical trim note is groomed, it may become associated with a new, updated sequence indicator. However, the physical trim note may retain its original note sequence indicator 392 and/or may retain the sequence indicators of the media addresses 394, such that accurate sequence indicator comparisons can be performed even after the physical trim note is relocated to a different storage division.

Figure 18:
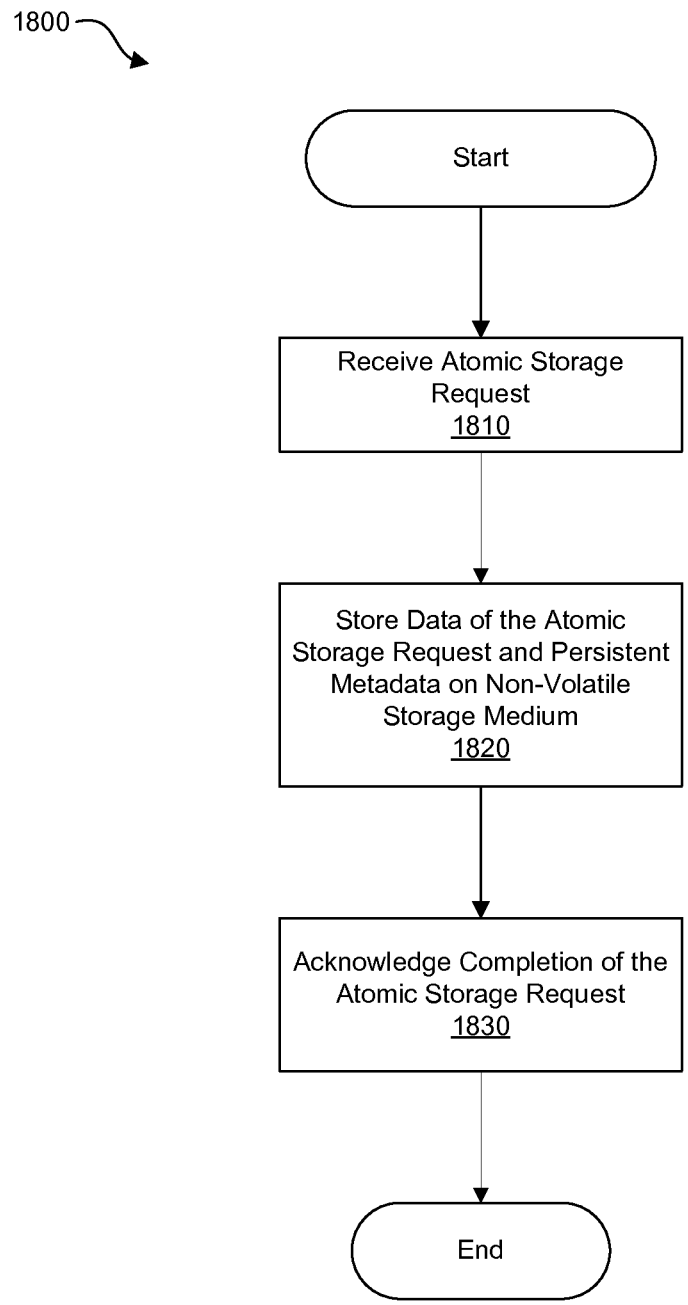
FIG. 18 comprises a flowchart illustrating a method for servicing an atomic storage request.

FIG. 18 is a flow diagram of one embodiment of a method for servicing an atomic storage request. The method 1800 may start and be initialized, which may include, but is not limited to: loading one or more machine-readable instructions from a non-transitory, machine-readable storage medium, accessing and/or initializing resources, such as a non-volatile storage device, communication interfaces, and so on.

As the method 1800 begins, an atomic storage request 1101 is received 1810, for example, at the VSL 130. The atomic storage request 1101 may be received 1810, for example, through an interface, such as the interfaces 1694a-b. The atomic storage request 1101 may involve a single storage operation or a plurality of storage operations (pertaining to one or more I/O vectors). The storage request 1101 may comprise storing data within a contiguous or noncontiguous range of logical erase blocks of the non-volatile solid-state storage device 1702. In one embodiment, the atomic storage request 1101 is received 1810 and/or processed using an ordered queue 344.

The storage controller 127 may store 1820 data of the atomic storage request and persistent metadata 1314a-d in data packets 1310a-d (or other structures, such as persistent notes) on different logical erase blocks 1340a-b of a storage media 1302, as illustrated, for example, in FIGS. 13A and 16B-C. In one embodiment, the atomic storage request 1101 may involve a plurality of storage operations, each of which may encompass storage operations in a plurality of different media storage locations. The storage controller 127 may store 1820 persistent metadata 1314 and associated user data 1312 within a packet 1310a-d (or other persistent note) on the storage media 1302 in one or more storage operations, i.e., as part of one or more operations performed on the storage media 1302. Step 1820 may comprise performing storage operations on each of a plurality of I/O vectors. The storage operations may be the same for each of the vectors and/or each vector may comprise a respective storage operation (e.g., each vector may be associated with a respective operation flag). Step 1820 may further comprise storing persistent metadata flags with data of the atomic storage request 1101, the persistent metadata flags comprising metadata flags in a first state indicating an open and/or incomplete atomic storage operation, and a persistent metadata flag in a second state indicating a completed atomic storage operation. Data of the atomic storage request 1101 may be stored sequentially in one or more contiguous packets, persistent notes, or other data structures.

The acknowledgment module 1737 may then acknowledge 1830 completion of the atomic storage request 1101 to a storage client or the like. The acknowledgment module 1737 may send acknowledgment asynchronously via a callback or other mechanism. Alternatively, the atomic storage request 1101 may be synchronous, and the acknowledgment module 1737 may transmit acknowledgment by a return from a synchronous function or method call.

In some embodiments, acknowledgment is provided as soon as it can be assured that the data of the atomic storage request 1101 will be persisted to the non-volatile storage medium 1722, but before the data is actually stored thereon. For example, the acknowledgment module 1737 may send acknowledgment upon transferring data of the atomic storage request 1101 into a buffer of the non-volatile storage medium 1722, into a write data pipeline, transferring the data to the storage controller 124 (e.g., within a protection domain of a storage controller), or the like. Alternatively, acknowledgment 1830 is performed after the data of the atomic storage request 1101 has been persisted on the non-volatile storage media 1722.

Figure 19:
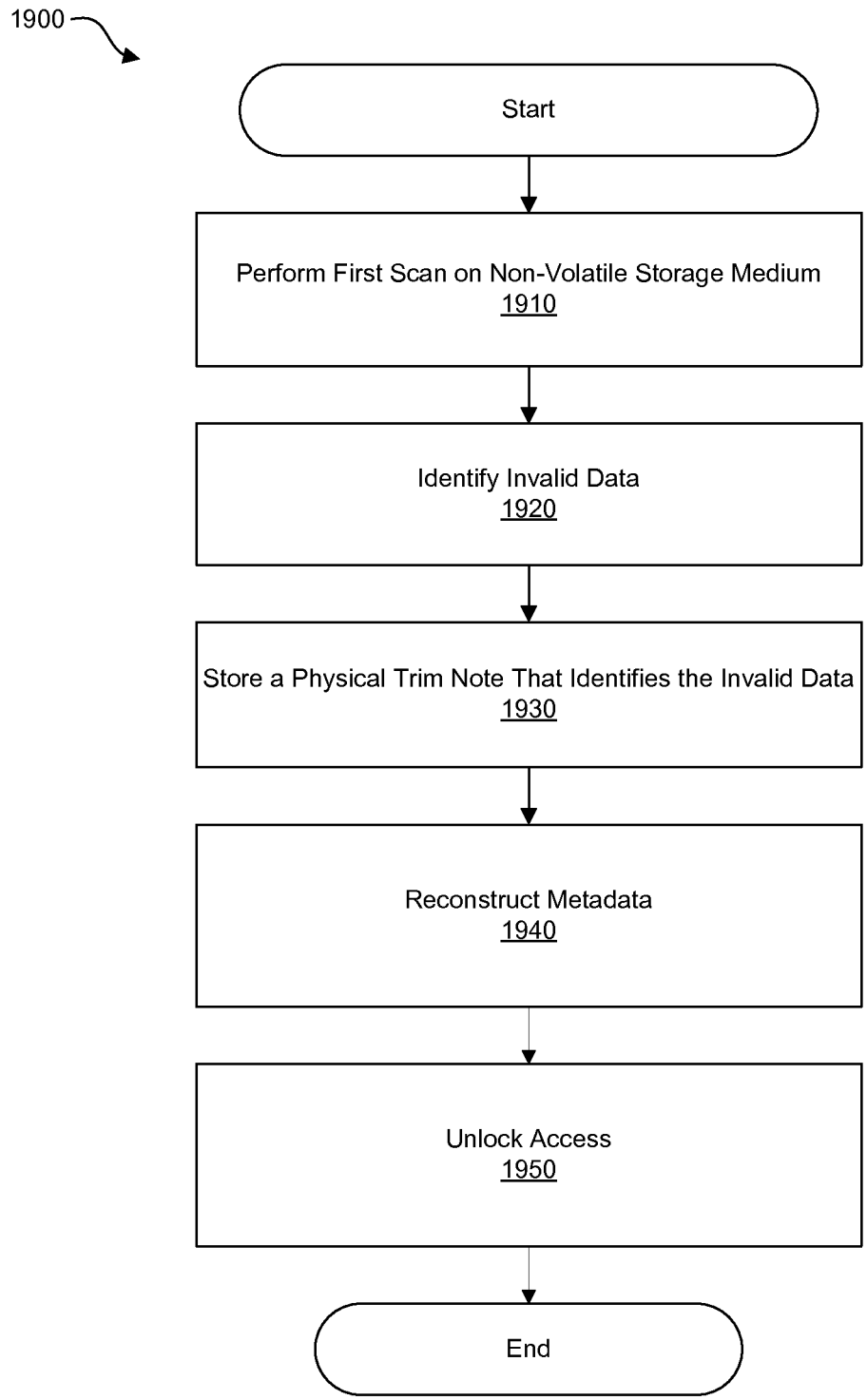
FIG. 19 illustrates a method for a restart and recovery process.

FIG. 19 illustrates a method 1900 for restart recovery from a invalid shutdown (i.e., failure of the primary power source). The method 1900 may start and be initialized, as described above.

Step 1910 may comprise the recovery module 372 performing a first scan of the non-volatile storage medium 1722. The first scan may be implemented in response to detecting an invalid shutdown, which may comprise accessing the non-volatile storage medium 1722 to determine whether the medium 1722 comprises a clean shutdown indicator. The first scan may comprise accessing data stored in a contextual, log format from append point. Step 1910 may comprise scanning in reverse log order from the append point.

Step 1910 may further comprise the storage request receiver module 331 locking access to the non-volatile storage medium 1722 and/or storage controller 124. Locking access may comprise deferring, queuing, and/or rejecting storage requests directed to the storage controller 124. The storage request receiver module 331 may lock access until the first scan is complete.

Step 1920 may comprise identifying invalid data on the non-volatile storage medium 1722. The invalid data identification module 373 may be configured to identify data of a failed atomic storage request based upon persistent metadata stored with the data (e.g., persistent metadata flags 367) and/or other persistent indicators. Alternatively, or in addition, the invalid data identification module 373 may deduce that data is part of a failed atomic storage operation, as described above. In some embodiments, the first scan of steps 1910 and 1920 terminates in response to scanning valid data (data of a completed atomic storage operation and/or data of a non-atomic operation). Alternatively, the first scan may continue, and step 1920 may further comprise combining one or more other physical trim notes on the non-volatile storage medium 1722, as described above.

Step 1930 may comprise the note storage module 374 storing a physical trim note on the non-volatile storage medium 1722. The physical trim note may identify the data of the failed atomic storage request and/or other invalid data referenced by other physical trim notes. The invalid data may be identified by respective media address(es) 394. The invalid data may be further identified by respective sequence indicators. Alternatively, or in addition, the physical trim note may comprise a separate note sequence indicator 392. The note sequence indicator 392 (and/or media address sequence indicators 394) may be retained when the physical trim note is moved to other media storage locations (e.g., in a grooming operation).

Step 1930 may further comprise a data invalidation module 375 invalidating the data identified at step 1920. As described above, invalidating the data may comprise updating storage metadata 135, such as the forward index 1704, reverse index 1722, and/or validity bitmap(s) 1741 to indicate that the media storage location(s) identified at step 1920 comprise invalid data.

Step 1940 may comprise the reconstruction module 376 reconstructing portions of the storage metadata 135 in a second scan of the non-volatile storage medium 1722, as described above. Step 1940 may further comprise an exclusion module 377 skipping and/or excluding invalid data identified and/or invalidated at steps 1920 and/or 1930. For example, the exclusion module 377 may be configured to skip media storage locations comprising data of a failed atomic storage operation. The exclusion module 377 may be further configured to exclude media addresses of the data from the forward index 1704 (e.g., excluding the media addresses from being associated with logical identifiers in the index 1704). The exclusion module 377 may be further configured to skip and/or exclude storage operations of a failed composite atomic storage operation (e.g., exclude one or more TRIM, ZERO, or other operations), as described above.

Step 1950 may comprise the storage request receiver module 331 unlocking access to the storage controller 124 and/or non-volatile storage medium 1722. In some embodiments, the storage request receiver module 331 unlocks access in response to completion of the first scan (and/or storage of the physical trim note). Alternatively, the storage request receiver module 331 may unlock access in response to completion of the second scan and/or reconstruction of the storage metadata 135.

As discussed above, a vectored storage request may comprise a request to perform one or more operations on one or more I/O vectors (e.g., sets and/or ranges within a logical address space). A portion of one or more of the I/O vectors may overlap (and/or may be logically adjacent) and/or one or more operations may negate (e.g., overlay) one or more other operations. For example, a vectored storage request may comprise a request to TRIM two I/O vectors. The I/O vectors may overlap one another (e.g., the operations may TRIM logical identifiers 256-1024 and 759-1052, respectively). The VSL 130 may identify the overlapping TRIM operations and, in response, may consolidate the requests (e.g., combine the TRIM requests into a single request to TRIM logical identifiers 256-1052). In another example, a vectored storage request may comprise requests to TRIM the same set of logical identifiers. In response, the VSL 130 may remove one or more of the overlapping I/O vectors of the request (e.g., a vectored storage request comprising multiple requests to TRIM logical identifiers 0-256 may be combined into a single TRIM request for the I/O vector 0-256). In another example, the VSL 130 may be configured to consolidate logically adjacent requests. For example, a vectored storage request may comprise requests to TRIM logical identifiers 0-256 and 257-512; the VSL 130 may consolidate these two separate I/O vectors into a single I/O vector 0-512.

The VSL 130 may be further configured to consolidate composite, vectored storage requests (e.g., requests received via the interface 1694b described above). For example, a composite, vectored storage request may comprise a TRIM followed by a write to LIDS of the same I/O vector (or a portion of the same IO vector). The VSL 130 may detect that the TRIM request is negated by the subsequent write and may, therefore, omit the TRIM operation (and/or omit the portion of the TRIM operation that is negated by the write).

The VSL 130 may be configured to consolidate storage requests by examining the I/O vectors of vectored storage requests, identifying I/O vectors for consolidation, and modifying the vectored storage request to consolidate the identified I/O vectors, as described above.

In some embodiments, the VSL 130 may be configured to consolidate different storage requests (vectored or otherwise). For example, the VSL 130 may be configured to "cache" storage requests (e.g., individual TRIM requests), identify requests that may be consolidated, and consolidate the requests, as described above. Consolidating the requests may comprise combining one or more logical identifier ranges, ignoring and/or omitting one or more negated storage requests, and so on, as described above. The VSL 130 may periodically implement the cached storage requests (e.g., flush the storage requests in the cache, consolidated or otherwise).

The VSL 130 may be configured to cache storage requests using any suitable caching and/or buffering mechanism. For example, the VSL 130 may be configured to hold storage requests for a pre-determined time period, may be configured to cache a pre-determined number of storage requests (e.g., in a FIFO, or the like). In some embodiments, the VSL 130 may cache storage requests in the ordered queue 344, described above. As new requests are received, the requests may be added to the ordered queue 344. The VSL 130 may consolidate storage requests in the ordered queue 344, as described above. The consolidation operations performed by the VSL 130 may be configured to retain ordering consistency.

In some embodiments, the VSL 130 may be configured to selectively cache and/or consolidate storage requests. For example, the VSL 130 may be configured to cache and/or consolidate storage requests of a file system storage client, but not requests of other storage clients (e.g., operating system storage client, database storage client, and so on). The configuration of the VSL 130 may be set by user configuration (e.g., a user preference), one or more request flags, or the like. Alternatively, or in addition, the VSL 130 may provide one or more interfaces for accessing the ordered queue 344 (or other request cache). Storage clients may access the ordered queue 344 (or other request cache) to consolidate storage requests, as described above. The storage clients may be restricted to consolidating storage requests issued thereby (e.g., may not be allowed to consolidate or otherwise modify storage requests of other storage clients). For example, a file system storage client may make heavy use of TRIM requests; TRIM requests may be issued for the same and/or adjacent logical identifiers in a relatively short time frame. Similarly, TRIM requests may be followed by write requests (to the same, or overlapping I/O vectors). The storage client may be configured to cache and/or consolidate I/O requests before the requests are issued to the VSL 130. Alternatively, or in addition, the file system storage client 413b may issue the requests, and may access the ordered queue 344 (or other request cache) to consolidate the requests (or allow the VSL 130 to consolidate the requests), as described above.

Figure 20:
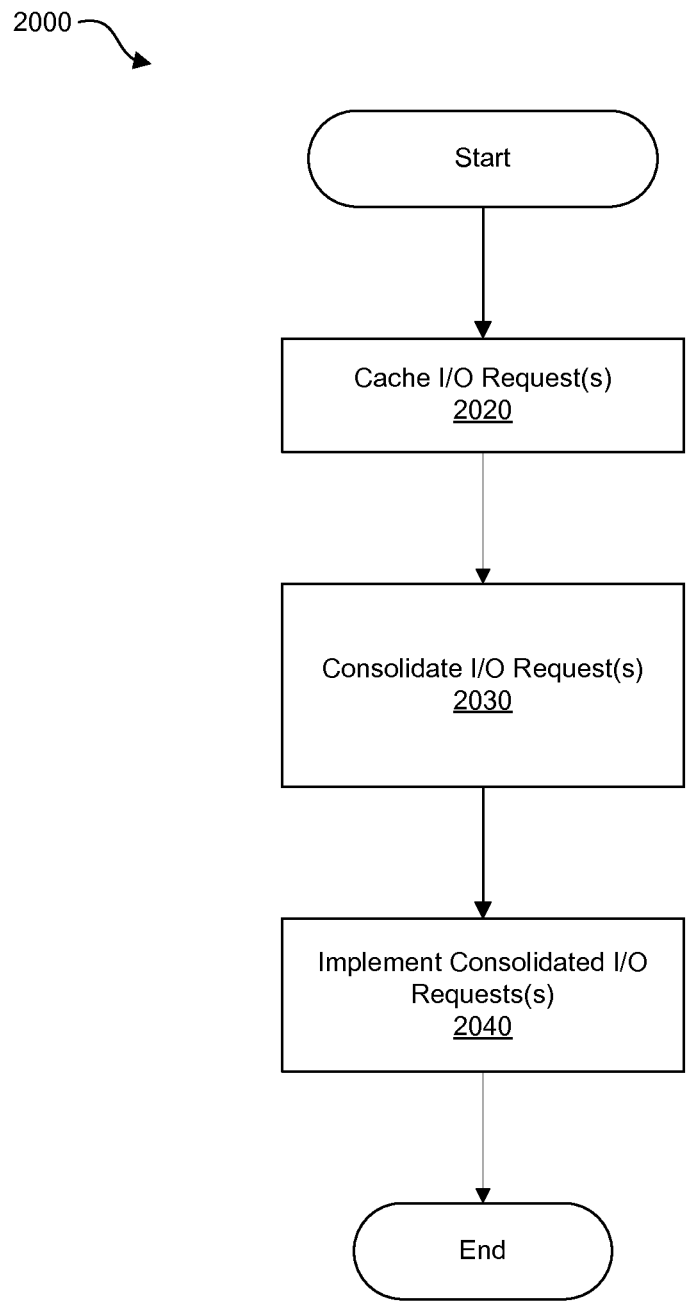
FIG. 20 illustrates a method for consolidating storage requests.

FIG. 20 is a flow diagram of one embodiment of a method 2000 for consolidating storage requests. The method 2000 starts and is initialized, as described above.

Step 2020 may comprise caching storage requests. As described above, caching storage requests may comprise queuing storage requests (e.g., adding storage requests to an ordered queue 344), buffering storage requests, holding storage requests, delaying storage requests, or the like. Step 2020 may comprise retaining an order of the storage request (and/or constituent I/O vectors or the request(s)). Accordingly, the caching of step 2020 may be configured to implement the storage requests in the same (or equivalent) order as the storage requests were received. For example, in some embodiments, the cache of step 2030 comprises an ordered queue 344 (e.g., FIFO). Storage requests may flow through the ordered queue 344 (e.g., by first-in-first-out processing). The VSL 130 (and/or module thereof), may identify and/or consolidate storage requests in the queue (e.g., at step 2030). Accordingly, one or more storage requests may be consolidated with one or more other storage requests while in the ordered queue 344. Alternatively, the caching of step 2020 may comprise receiving a single vectored storage request.

Step 2030 may comprise consolidating storage requests in the cache of step 2020. Consolidating storage requests may comprise identifying overlapping and/or logically adjacent storage requests (and/or I/O vectors), identifying storage requests that negate and/or obviate other storage requests (and/or I/O vectors), and so on. Step 2030 may further comprise modifying (e.g., consolidating) one or more storage requests, as described above. The consolidation of step 2030 may include, but is not limited to: modifying a logical identifier range and/or extent of one or more storage requests and/or I/O vectors (e.g., combining overlapping and/or logically adjacent ranges of TRIM requests), removing one or more storage requests and/or I/O vectors (e.g., removing duplicate storage requests, removing storage requests to be negated by other cached storage requests, etc.), and so on.

In some embodiments, the VSL 130 may be configured to consolidate vectored storage requests. Accordingly, the caching step 2020 may be omitted, and step 2030 may operate within individual, vectored storage requests. Alternatively, or in addition, the VSL 130 may treat some storage requests separately. For example, vectored, atomic storage requests may be treated separately from other storage requests. Accordingly, I/O vectors of a vectored, atomic storage request may be consolidated with other I/O vectors (and/or operations) in the particular request, but may not be consolidated with other storage requests.

Step 2040 may comprise implementing one or more consolidated storage requests (and/or implementing a vectored storage request comprising one or more consolidated I/O vectors). Step 2040 may be performed at a predetermined interval, may be performed in response to a trigger condition (e.g., filling a FIFO or other cache buffer, a user request, etc.), may be performed as the storage request is received (and/or consolidated), or the like. Step 2040 may further comprise acknowledging completion of the request. The request may be acknowledged after all of the consolidated I/O requests 2040 are complete. Alternatively, or in addition, step 2040 may comprise separately acknowledging completion of one or more of the consolidated requests.

Reference throughout this specification to features, advantages, or similar language does not imply that all of the features and advantages that may be realized are included any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the features, advantages, and characteristics described herein may be combined in any suitable manner in one or more embodiments. One skilled in the relevant art will recognize that the disclosed embodiments may be practiced without one or more of the specific features or advantages of a particular embodiment. In other instances, additional features and advantages may be recognized in certain embodiments that may not be present in all embodiments. These features and advantages of the disclosed embodiments will become more fully apparent from the following description and appended claims, or may be learned by the practice of the embodiments as set forth hereinafter.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the features, structures, or characteristics disclosed herein may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of the disclosed embodiments. One skilled in the relevant art will recognize, however, that the teachings of the disclosure may be practiced without one or more of the specific details, or with other methods, components, materials, and so forth. In other instances, well-known structures, materials, or operations are not shown or described in detail to avoid obscuring aspects of the disclosed embodiments.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

We claim:

1. An apparatus, comprising:
  a non-volatile storage medium; and
  a processor configured to execute atomic storage operations on the non-volatile storage medium, wherein executing an atomic operation comprises storing first persistent metadata indicating that the atomic storage operation is incomplete and, in response to completing execution of the atomic storage operation on the non-volatile storage medium, storing second persistent metadata indicating that the atomic storage operation is complete;
  wherein the processor is further configured to perform a first scan of the non-volatile storage medium, the first scan comprising:
    locking access to all of the non-volatile storage medium during the first scan,
    identifying data of a failed atomic storage operation stored on one or more storage locations of the non-volatile storage medium in response to accessing first persistent metadata pertaining to the failed atomic storage operation, and
    writing third persistent metadata on the non-volatile storage medium, the third persistent metadata configured to invalidate the identified data stored on the one or more storage locations independent of the first persistent metadata, wherein the third persistent metadata is appended to the identified data such that the third persistent metadata is written to a first storage location immediately following the one or more storage locations of the identified data, wherein the first storage location is different from a second storage location comprising the first persistent metadata; and
  wherein the processor is further configured to perform a second scan of the non-volatile storage medium, the second scan comprising:
    rebuilding an index comprising associations between data stored on the non-volatile storage medium and logical identifiers of a logical address space based on one or more of the first, second, and third persistent metadata, and
    unlocking access to the non-volatile storage medium in response to rebuilding the index.

2. The apparatus of claim 1, wherein the first scan comprises accessing data stored on the non-volatile storage medium according to a log order defined, at least in part, by sequence indicators stored on the non-volatile storage medium.

3. The apparatus of claim 1, wherein the processor is further configured to invalidate the identified data stored on the one or more storage locations of the non-volatile storage medium in an index, the index comprising associations between logical identifiers and corresponding data stored on the non-volatile storage medium.

4. The apparatus of claim 3, wherein the processor is further configured to record that the identified data stored on the one or more storage locations of the non-volatile storage medium is invalid in one or more of a reverse index and a validity bitmap.

5. The apparatus of claim 1, wherein the third persistent metadata comprises a media address of the one or more storage locations.

6. The apparatus of claim 1, wherein the processor is configured to lock access to the non-volatile storage medium during the first scan by one or more of: locking storage request execution until completion of the first scan, deferring storage request execution until completion of the first scan, queueing storage requests until completion of the first scan, and rejecting storage requests until completion of the first scan.

7. The apparatus of claim 1, wherein the processor is configured to identify the data of the failed atomic storage operation in response to determining that second metadata pertaining to the failed atomic storage operation is not stored on the non-volatile storage medium.

8. The apparatus of claim 7, wherein the processor is configured to identify the data of the failed atomic storage operation during the first scan in response to detecting a data packet stored on the non-volatile storage medium comprising the first persistent metadata pertaining to the failed atomic storage operation and failing to detect that the data packet comprises the second persistent metadata pertaining to the failed atomic storage operation stored on the non-volatile storage medium.

9. The apparatus of claim 1, wherein the first scan comprises accessing data from a head of an ordered log maintained on the non-volatile storage medium towards a tail of the log.

10. The apparatus of claim 1, wherein the second scan further comprises:
recording associations between valid data stored on the non-volatile storage medium and corresponding logical addresses in a forward map in response to accessing the valid data during the first scan; and
excluding the identified data of the failed atomic storage request from the forward map based on the third persistent metadata stored on the non-volatile storage medium irrespective of whether or not the first persistent metadata or the second persistent metadata pertaining to the failed atomic storage operation is present on the non-volatile storage medium.

11. The apparatus of claim 1, wherein the second scan further comprises:
reconstructing associations between logical identifiers of data accessed during the second scan and storage locations of the accessed data based upon one or more of the first, second, and third persistent metadata stored with the accessed data on the non-volatile storage medium; and
recording the reconstructed associations in the index.

12. The apparatus of claim 11, wherein the second scan further comprises:
excluding the identified data of the failed atomic storage request based on the third persistent metadata stored on the non-volatile storage medium.

13. The apparatus of claim 1, wherein the third persistent metadata comprises logical identifiers corresponding to the failed atomic storage operation.

14. The apparatus of claim 1, wherein the processor is configured to perform the first scan of the non-volatile storage medium in response to detecting an invalid shutdown.

15. The apparatus of claim 14, wherein the processor is configured to detect the invalid shutdown by accessing the non-volatile storage medium.

16. The apparatus of claim 1, wherein the processor is further configured to erase the third persistent metadata from the non-volatile storage medium in response to determining that the data of the failed atomic storage operation is no longer stored on the one or more storage locations of the non-volatile storage medium.

17. A method, comprising:
using a processor of a computing device to implement atomic operations on a non-volatile storage medium, wherein implementing an atomic operation comprises writing a first note indicating that the atomic operation is incomplete and, in response to completing the atomic operation, writing a second note indicating that the atomic operation is complete;
using the processor of the computing device to perform a first scan of the non-volatile storage medium, comprising:
blocking execution of storage requests on all of the non-volatile storage medium during the first scan,
detecting data of a failed atomic storage operation stored on one or more storage locations of the non-volatile storage medium in response to accessing a first note indicating that the failed atomic storage operation is incomplete and determining that a second note indicating that the failed atomic operation is complete was not written on the non-volatile storage medium, and
writing a third note on the non-volatile storage medium in response to the detecting, wherein the third note is written separately from the first note and is configured to invalidate the detected data of the failed atomic storage operation independent of the first note, the third note comprising a media address of the detected data, wherein the third note is appended to the detected data such that the third note is written to a first storage location immediately following the one or more storage locations of the detected data, wherein the first storage location is different from a second storage location comprising the first note, and
using the processor of the computing device to perform a second scan of the non-volatile storage medium, the second scan comprising:
accessing persistent metadata stored on the non-volatile storage device,
recording translation entries in a memory of the computing device, the translation entries configured to associate media addresses of data stored on the non-volatile storage medium with respective logical identifiers of the data,
excluding a translation entry corresponding to the detected data of the failed atomic storage operation based on the third note written on the non-volatile storage medium during the first scan, and
unlocking access to the non-volatile storage medium in response to completing the second scan.

18. The method of claim 17, wherein the second scan of the non-volatile storage medium comprises accessing the persistent metadata stored on the non-volatile storage medium in a log order, the log order determined by sequence indicators stored on storage divisions of the non-volatile storage medium.

19. The method of claim 17, wherein detecting the data of the failed atomic storage operation further comprises:

accessing the first note pertaining to the failed atomic operation stored on the non-volatile storage medium; and determining that the second note pertaining to the failed atomic operation is not stored on the non-volatile storage medium.

20. The method of claim 17, wherein detecting data of the failed atomic storage operation further comprises:

determining that one or more data packets comprising the detected data of the failed atomic storage operation stored on the non-volatile storage medium include the first note; and completing the first scan of the non-volatile storage medium without accessing a data packet that includes the second note pertaining to the failed atomic operation.

21. A system, comprising:

means for performing atomic storage operations on a non-volatile storage medium, wherein performing an atomic storage operation comprises storing first persistent metadata indicating that the atomic storage operation is incomplete and second persistent metadata indicating that the atomic storage operation is complete in response to completing the atomic storage operation on the non-volatile storage medium;

means for performing a scan of the non-volatile storage medium, comprising:

means for locking access to all of the non-volatile storage medium during the scan;

means for accessing first persistent metadata pertaining to a particular atomic storage operation stored at one or more storage addresses of the non-volatile storage medium during the scan;

means for determining that the particular atomic storage operation is incomplete in response to failing to access second persistent metadata pertaining to the particular atomic storage operation during the scan; and means for storing third persistent metadata on the non-volatile storage medium in response to the determining, the third persistent metadata configured to invalidate data corresponding to the particular atomic storage operation independent of the first persistent metadata, wherein the third persistent metadata is appended to the data corresponding to the particular atomic storage operation such that the third persistent metadata is stored at a first storage address immediately following the one or more storage addresses of the data corresponding to the particular atomic storage operation, wherein the first storage address is different from a second storage address of the first persistent metadata; and means for performing a second scan of the non-volatile storage medium, comprising:

means for rebuilding an index comprising associations between data stored on the non-volatile storage medium and logical identifiers of a logical address space based on one or more of the first, second, and third persistent metadata; and means for unlocking access to the non-volatile storage medium in response to rebuilding the index.

\* \* \* \* \*